(12) United States Patent
Lu et al.

(10) Patent No.: US 10,887,590 B2
(45) Date of Patent: ***Jan. 5, 2021

(54) IMAGE PROCESSING DEVICE AND METHOD

(71) Applicant: Sony Corporation, Tokyo (JP)

(72) Inventors: Shuo Lu, Tokyo (JP); Masaru Ikeda, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/502,041

(22) Filed: Jul. 3, 2019

(65) Prior Publication Data

US 2019/0327468 A1 Oct. 24, 2019

Related U.S. Application Data

(63) Continuation of application No. 15/624,457, filed on Jun. 15, 2017, now Pat. No. 10,419,756, which is a (Continued)

(30) Foreign Application Priority Data

Apr. 6, 2012 (JP) ................................. 2012-087307
Jun. 22, 2012 (JP) ................................. 2012-140463

(51) Int. Cl.
*H04N 19/117* (2014.01)
*H04N 19/86* (2014.01)
*H04N 19/44* (2014.01)

(52) U.S. Cl.
CPC ........... *H04N 19/117* (2014.11); *H04N 19/44* (2014.11); *H04N 19/86* (2014.11)

(58) Field of Classification Search
USPC ................................................... 375/240.29
See application file for complete search history.

(56) References Cited

U.S. PATENT DOCUMENTS 8,855,434 B2   10/2014   Sato
9,712,822 B2   7/2017    Han et al.
(Continued)

FOREIGN PATENT DOCUMENTS

JP   2008-205534 A   9/2008
JP   2013-524715 A   6/2013
(Continued)

OTHER PUBLICATIONS

Office Action dated Jan. 7, 2020, in Japanese Patent Application No. 2019-004087, 5 pages.
(Continued)

*Primary Examiner* — Behrooz M Senfi
(74) *Attorney, Agent, or Firm* — Xsensus, LLP

(57) ABSTRACT

An image processing device and method capable of suppressing block noise.
A β LUT_input calculation unit and a clipping unit calculate β LUT_input that is a value input to an existing β generation unit and an extended β generation unit. When the value of β LUT_input qp from the clipping unit is equal to or less than 51, the existing β generation unit calculates β using the LUT defined in the HEVC method and supplies the calculated β to a filtering determination unit. When the value of β LUT_input qp from the clipping unit is larger than 51, the extended β generation unit calculates extended β and supplies the calculated β to the filtering determination unit. The device can be applied to an image processing device, for example.

18 Claims, 63 Drawing Sheets

Related U.S. Application Data continuation of application No. 14/382,970, filed as application No. PCT/JP2013/059135 on Mar. 27, 2013, now abandoned.

(56) References Cited

U.S. PATENT DOCUMENTS

| | | | |
|---|---|---|---|
| 9,973,763 B2* | 5/2018 | Ikeda | H04N 19/80 |
| 9,998,766 B2* | 6/2018 | Ikeda | H04N 19/117 |
| 10,080,015 B2* | 9/2018 | Ikeda | H04N 19/176 |
| 10,419,756 B2* | 9/2019 | Lu | H04N 19/86 |
| 10,536,694 B2* | 1/2020 | Ikeda | H04N 19/117 |
| 2004/0013310 A1 | 1/2004 | Suino et al. | |
| 2004/0101059 A1 | 5/2004 | Joch et al. | |
| 2008/0199090 A1 | 8/2008 | Tasaka et al. | |
| 2009/0003435 A1 | 1/2009 | Cho et al. | |
| 2011/0110603 A1 | 5/2011 | Ikai | |
| 2011/0188581 A1* | 8/2011 | Choi | H04N 19/00 375/240.24 |
| 2011/0194614 A1 | 8/2011 | Norkin et al. | |
| 2011/0243222 A1 | 10/2011 | Choi et al. | |
| 2012/0207227 A1 | 8/2012 | Tsai et al. | |
| 2013/0028531 A1 | 1/2013 | Sato | |
| 2013/0113880 A1 | 5/2013 | Zhao et al. | |
| 2013/0136371 A1 | 5/2013 | Ikai et al. | |
| 2013/0182762 A1 | 7/2013 | Seregin et al. | |
| 2013/0182764 A1 | 7/2013 | Narroschke et al. | |
| 2013/0251050 A1* | 9/2013 | Ikeda | H04N 19/436 375/240.29 |
| 2013/0259141 A1 | 10/2013 | Van Der Auwera et al. | |
| 2013/0259142 A1* | 10/2013 | Ikeda | H04N 19/182 375/240.29 |
| 2014/0369428 A1 | 12/2014 | Park et al. | |

FOREIGN PATENT DOCUMENTS

| | | |
|---|---|---|
| JP | 2014-506438 A | 3/2014 |
| JP | 2014-535238 A | 12/2014 |
| WO | 2012/119540 A1 | 9/2012 |
| WO | 2013/066133 A1 | 5/2013 |

OTHER PUBLICATIONS

Advanced video coding for generic audiovisual services, Series H: Audiovisual and Multimedia Systems, Infrastructure of audiovisual services—Coding of moving video, International Telecommunication Union, ITU-T Recommendation H.264, May 2003, pp. 150-153 with cover pages.
Japanese Office Action dated Dec. 27, 2018, issued in corresponding Japanese Patent Application 2017-181118.
Office Action issued in Japanese Patent Application 2016-116150 dated Jul. 10, 2018.
Office Action issued in Japanese Patent Application 2016-240350 dated Jul. 10, 2018.
Office Action issued in Japanese Patent Application 2016-240351 dated Jul. 10, 2018.
Notification of Reason for Refusal issued in Japanese Patent Application 2017-181118 dated Jul. 2018.
An, J., et al., "CE12 Subtest1: Improved Deblocking Filter", Joint Collaborative Team on Video Coding (JCT-VC) of ITU-T SG16 WP3 and ISO/IEC JTC1/SC29/WG11, JCTVC-E079, Mediatek Inc., 10 Pages total, (Mar. 16-23, 2011).
Bross, B., et al., "High Efficiency Video Coding (HEVA) Text Specification Draft 7", Joint Collaborative Team on Video Coding (JCT-VC) of ITU-T SG16 WP3 and ISO/IEC JTC1/SC29/WG11, JCTVC-1103_d2, Editor, 17 Pages total, (Apr. 27-May 7, 2012).
Bross, B., et al., "High Efficiency Video Coding (HEVA) Text Specification Draft 7", Joint Collaborative Team on Video Coding (JCT-VC) of ITU-T SG16 WP3 and ISO/IEC JTC1/SC29/WG11, JCTVC-H1003, Editor, 11 Pages total, (Feb. 1-10, 2012).
Telecommunication Standardization Sector of ITU, "Infrastructure of Audiovisual Services", Series H: Audiovisual and Multimedia Systems, 15 Pages total, (Jan. 2012).
Office Action dated Apr. 19, 2018 in Japanese Patent Application No. 2016-240350.
Office Action dated Apr. 19, 2018 in Japanese Patent Application No. 2016-240351.
Office Action dated Apr. 24, 2018 in Japanese Patent Application No. 2016-116150.
Benjamin Bross, et al., "High efficiency video coding (HEVC) text specification draft 7", Joint Collaborative Team on Video Coding (JCT-VC) of ITU-T SG16 WP3 and ISO/IEC JTC1/SC29/WG11, JCTVC-11003 _d9, 2012, 28 pages.
Office Action dated Nov. 16, 2017 in Japanese Patent Application No. 2016-240350.
Office Action dated Nov. 16, 2017 in Japanese Patent Application No. 2016-240351.
Benjamin Bross. et al., "High Efficiency Video Coding (HEVC) Text Specification Draft 6", Joint Collaborative Team on Video Coding (JCT-VC) of ITU-T SG16 WP3 and ISO/IEC JTC1/SC29/WG11, JCTVC-H1003, Feb. 1-10, 2012, pp. 17, 60-63, 83, 142-155 and 194 and Cover page.
Japanese Office Action dated Aug. 8, 2017 in Patent Application No. 2016-116150.
Benjamin Bross, "High Efficiency Video Coding (HEVC) Text Specification Draft 6", Joint Collaborative Team on Video Coding (JCT-VC), of ITU-T SG16 WP3 and ISO/IEC JTC1/SC29/WG11, Document: JCTVC-H1003, 8th Meeting: San Jose, CA, USA, Feb. 1-10, 2012, pp. 147-154 and cover pages.
"Advanced Video Coding for Generic Audiovisual Services", ITU-T H.264, Series H: Audiovisual and Multimedia Systems, Infrastructure of Audiovisual Services—Coding of Moving video, Jan. 2012, pp. 196-207 and cover pages.
Benjamin Bross, "High Efficiency Video Coding (HEVC) Text Specification Draft 7", Joint Collaborative Team on Video Coding (JCT-VC), of ITU-T SG16 WP3 and ISO/IEC JTC1/SC29/WG11, Document: JCTVC-11003_d2, 9th Meeting, Geneva, CH, Apr. 27-May 7, 2012, 12 pages.
Jicheng An, et al., "CE 8 subtest1: Improved deblocking filter", MediaTek Inc., Joint Collaborative Team on Video Coding (JCT-VC) of ITU-T SG16 WP3 and ISO/IEC JTC1/SC29/WG11 No. :m18915, 4th Meeting: Daegu, Korea, JCTVC-D163, Jan. 20-28, 2011, 9 pages.
Tomoo Yamakage, et al., "CE8.1: Deblocking parameter adjustment for 1-input ALF", Toshiba Corporation, Media Tek Inc. and Qualcomm, Joint Collaborative Team on Video Coding (JCT-VC) of ITU-T SG16 WP3 and ISO/IEC JTC1/SC29/WG11 No. m19711, 5th Meeting: Geneva, JCTVC-E193, Mar. 16-23, 2011, 5 pages.
Andrew Norkin, et al., "Development of HEVC deblocking filter", Ericsson, Joint Collaborative Team on Video Coding (JCT -VC) of ITU-T SG16 WP3 and ISO/IEC JTC1/SC29/WG11 No. m19154, 4th Meeting: Daegu, KR, JCTVC-D377, Jan. 20-28, 2011, 5 pages.
Tomoo Yamakage, et al., "CE12: Deblocking filter parameter adjustment in slice level", Toshiba Corporation and Qualcomm, Joint Collaborative Team on Video Coding (JCT-VC) of ITU-T SG16 WP3 and ISO/IEC JTC1/SC29/WG11 No. m20561 6th Meeting: Torino, JCTVC-F143_rl, Jul. 14-22, 2011, 4 pages.
Mattias Narroschke, et al., "Decisions for deblocking", Panasonic Corporation, Joint Collaborative Team on Video Coding (JCT-VC) of ITU-T SG16 WP3 and ISO/IEC JTC1/SC29/WG11 No. m19777, 5th Meeting: Geneva, CH, JCTVC-E251, Mar. 16-23, 2011, 11 pages.
Benjamin Bross, et al., "High efficiency video coding (HEVC) text specification draft 6", Editor, Joint Collaborative Team on Video Coding (JCT-VC), of ITU-T SG16 WP3 and ISO/IEC JTC1/SC29/ WG11, JCTVC-H1003, Output Document of JCT-VC, 7th Meeting: Geneva, CH, Nov. 21-30, 2011, 259 pages.
Japanese Office Action dated Apr. 14, 2016 in Patent Application No. 2014-509126.
Office Action dated Feb. 4, 2017 in Chinese Patent Application No. 201380017807.X.
Bross, B., et al., "High efficiency video coding (HEVC) text specification draft 7", Joint Collaborative Team on Video Coding

(56) References Cited

OTHER PUBLICATIONS (JCT-VC) of ITU-T SG16 WP3 and ISO/IEC JTC1/SC29/WG11, Document: JCTVC-I1003 d2, Apr. 27-May 7, 2012, 277 pp.
Chinese Office Action dated Sep. 16, 2019, issued in corresponding Chinese Patent Application No. 201710709435.7.
Office Action dated Jun. 30, 2020, in corresponding to Japanese patent application No. 2019-004087, 2 pages.
ITU-T, "Advanced video coding for generic audiovisual services", ITU-T Recommendation H.264, May 2003, pp. 150-153 total 7 pages.

* cited by examiner

FIG. 7

| QP | 0 | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|---|
| β | 0 | 0 | 0 | 0 | 0 | 0 | 0 | 0 | 0 | 0 | 0 | 0 | 0 | 0 | 0 | 0 | 6 | 7 | 8 |
| Tc | 0 | 0 | 0 | 0 | 0 | 0 | 0 | 0 | 0 | 0 | 0 | 0 | 0 | 0 | 0 | 0 | 0 | 0 | 1 |
| QP | 19 | 20 | 21 | 22 | 23 | 24 | 25 | 26 | 27 | 28 | 29 | 30 | 31 | 32 | 33 | 34 | 35 | 36 | 37 |
| β | 9 | 10 | 11 | 12 | 13 | 14 | 15 | 16 | 17 | 18 | 20 | 22 | 24 | 26 | 28 | 30 | 32 | 34 | 36 |
| Tc | 1 | 1 | 1 | 1 | 1 | 1 | 1 | 1 | 2 | 2 | 2 | 2 | 3 | 3 | 3 | 3 | 4 | 4 | 4 |
| QP | 38 | 39 | 40 | 41 | 42 | 43 | 44 | 45 | 46 | 47 | 48 | 49 | 50 | 51 | 52 | 53 | | | |
| β | 38 | 40 | 42 | 44 | 46 | 48 | 50 | 52 | 54 | 56 | 58 | 60 | 62 | 64 | | | | | |
| Tc | 5 | 5 | 6 | 6 | 7 | 8 | 9 | 9 | 10 | 10 | 11 | 11 | 12 | 12 | 13 | 13 | | | |

FIG. 8

| QP | 0 | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|---|
| β | 0 | 0 | 0 | 0 | 0 | 0 | 0 | 0 | 0 | 0 | 0 | 0 | 0 | 0 | 0 | 0 | 0 | 0 | 0 |
| QP | 19 | 20 | 21 | 22 | 23 | 24 | 25 | 26 | 27 | 28 | 29 | 30 | 31 | 32 | 33 | 34 | 35 | 36 | 37 |
| β | 9 | 10 | 11 | 12 | 13 | 14 | 15 | 16 | 17 | 18 | 20 | 22 | 24 | 26 | 28 | 30 | 32 | 34 | 36 |
| QP | 38 | 39 | 40 | 41 | 42 | 43 | 44 | 45 | 46 | 47 | 48 | 49 | 50 | 51 | 52 | 53 | ... | $qp_{max}$ | |
| β | 38 | 40 | 42 | 44 | 46 | 48 | 50 | 52 | 54 | 56 | 58 | 60 | 62 | 64 | β(52) | β(53) | ... | β($qp_{max}$) | |

A

| QP | 0 | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|---|
| β | 0 | 0 | 0 | 0 | 0 | 0 | 0 | 0 | 0 | 0 | 0 | 0 | 0 | 0 | 0 | 0 | 6 | 7 | 8 |
| NEW β | 0 | 0 | 0 | 0 | 0 | 0 | 0 | 0 | 0 | 0 | 0 | 0 | 0 | 0 | 0 | 0 | 6 | 7 | 8 |
| QP | 19 | 20 | 21 | 22 | 23 | 24 | 25 | 26 | 27 | 28 | 29 | 30 | 31 | 32 | 33 | 34 | 35 | 36 | 37 |
| β | 9 | 10 | 11 | 12 | 13 | 14 | 15 | 16 | 17 | 18 | 20 | 22 | 24 | 26 | 28 | 30 | 32 | 34 | 36 |
| NEW β | 9 | 10 | 11 | 12 | 13 | 14 | 15 | 16 | 17 | 18 | 22 | 26 | 30 | 34 | 38 | 42 | 46 | 50 | 54 |
| QP | 38 | 39 | 40 | 41 | 42 | 43 | 44 | 45 | 46 | 47 | 48 | 49 | 50 | 51 | | | | | |
| β | 38 | 40 | 42 | 44 | 46 | 48 | 50 | 52 | 54 | 56 | 58 | 60 | 62 | 64 | | | | | |
| NEW β | 58 | 62 | 66 | 70 | 74 | 78 | 82 | 86 | 90 | 94 | 98 | 102 | 106 | 110 | | | | | |

B

A

| QP | 0 | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|---|
| $t_C$ | 0 | 0 | 0 | 0 | 0 | 0 | 0 | 0 | 0 | 0 | 0 | 0 | 0 | 0 | 0 | 0 | 0 | 0 | 1 |
| ADJUSTMENT AMOUNT | | | | | | | | | | | | | | | | | | | |

| QP | 19 | 20 | 21 | 22 | 23 | 24 | 25 | 26 | 27 | 28 | 29 | 30 | 31 | 32 | 33 | 34 | 35 | 36 | 37 |
|---|---|---|---|---|---|---|---|---|---|---|---|---|---|---|---|---|---|---|---|
| $t_C$ | 1 | 1 | 1 | 1 | 1 | 1 | 1 | 1 | 2 | 2 | 2 | 2 | 3 | 3 | 3 | 3 | 4 | 4 | 4 |
| ADJUSTMENT AMOUNT | | | | | | | | | +1 | +1 | +1 | | +1 | | | −1 | | −1 | −1 |

| QP | 38 | 39 | 40 | 41 | 42 | 43 | 44 | 45 | 46 | 47 | 48 | 49 | 50 | 51 | 52 | 53 | | | |
|---|---|---|---|---|---|---|---|---|---|---|---|---|---|---|---|---|---|---|---|
| $t_C$ | 5 | 5 | 6 | 6 | 7 | 8 | 9 | 9 | 10 | 10 | 11 | 11 | 12 | 12 | 13 | 13 | | | |
| ADJUSTMENT AMOUNT | −1 | −1 | −1 | −1 | −1 | | | | | | | | | | | | | | |

| QP | 0 | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|---|
| β | 0 | 0 | 0 | 0 | 0 | 0 | 0 | 0 | 0 | 0 | 0 | 0 | 0 | 0 | 0 | 0 | 6 | 7 | 8 |
| QP | 19 | 20 | 21 | 22 | 23 | 24 | 25 | 26 | 27 | 28 | 29 | 30 | 31 | 32 | 33 | 34 | 35 | 36 | 37 |
| β | 9 | 10 | 11 | 12 | 13 | 14 | 15 | 16 | 17 | 18 | 20 | 22 | 24 | 26 | 28 | 30 | 32 | 34 | 36 |
| QP | 38 | 39 | 40 | 41 | 42 | 43 | 44 | 45 | 46 | 47 | 48 | 49 | 50 | 51 | 52 | 53 | | | |
| β | 38 | 40 | 42 | 44 | 46 | 48 | 50 | 52 | 54 | 56 | 58 | 60 | 62 | 64 | | | | | |

CONVENTIONAL METHOD

PRESENT TECHNIQUE
36 + β_offset *2

FIG. 33

| QP | 0 | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|---|
| tc | 0 | 0 | 0 | 0 | 0 | 0 | 0 | 0 | 0 | 0 | 0 | 0 | 0 | 0 | 0 | 0 | 0 | 0 | 1 |
| QP | 19 | 20 | 21 | 22 | 23 | 24 | 25 | 26 | 27 | 28 | 29 | 30 | 31 | 32 | 33 | 34 | 35 | 36 | 37 |
| tc | 1 | 1 | 1 | 1 | 1 | 1 | 1 | 1 | 2 | 2 | 2 | 3 | 3 | 3 | 3 | 3 | 4 | 4 | 4 |
| QP | 38 | 39 | 40 | 41 | 42 | 43 | 44 | 45 | 46 | 47 | 48 | 49 | 50 | 51 | 52 | 53 | | | |
| tc | 5 | 5 | 6 | 6 | 7 | 8 | 9 | 9 | 10 | 10 | 11 | 11 | 12 | 12 | 13 | 13 | | | |

PRESENT TECHNIQUE: 4+ tc_offset *1

CONVENTIONAL METHOD

*FIG. 46*

| if(!disable_deblocking_filter_flag) { | |
|---|---|
| dblk_offset_div2 | se(v) |
| } | |

*FIG. 52*

| | |
|---|---|
| if(!disable_deblocking_filter_flag) { | |
|     beta_offset_div2 | se(v) |
|     diff_beta_tc_div2 | se(v) |
| } | |

IMAGE PROCESSING DEVICE AND METHOD

CROSS-REFERENCE TO RELATED APPLICATIONS

The present application is a Continuation of U.S. Ser. No. 15/624,457, filed Jun. 15, 2017, which is a Continuation of U.S. Ser. No. 14/382,970, filed Sep. 4, 2014, which is the National Stage of PCT/JP2013/059135, filed Mar. 27, 2013, and is based upon and claims the benefit of priority under 35 U.S.C. § 120 for Japanese Patent Application No. 2012-140463, filed Jun. 22, 2012, and Japanese Patent Application No. 2012-087307, filed Apr. 6, 2012, the entire contents of each are incorporated herein by reference.

TECHNICAL FIELD

The present disclosure relates to an image processing device and method, and in particular, to an image processing device and method capable of suppressing block noise.

BACKGROUND ART

In recent years, a device has been widespread which digitally treats image information and which, in order to transmit and accumulate the information with high efficiency in this case, performs compression encoding of an image by adopting an encoding method in which compression is performed by orthogonal transform, such as a discrete cosine transform, and motion compensation using the redundancy unique to image information. Examples of the encoding method include an MPEG (Moving Picture Experts Group) or H.264 and MPEG-4 Part 10 (Advanced Video Coding; hereinafter, referred to as H.264/AVC) and the like.

In addition, currently, in order to further improve the encoding efficiency than H.264/AVC, standardization of an encoding method called HEVC (High Efficiency Video Coding) has been developed by JCTVC (Joint Collaboration Team-Video Coding) that is a joint standardization group of ITU-T and ISO/IEC. For the HEVC standard, Committee draft that is a first draft specification has been issued in February, 2012 (for example, refer to Non-patent Document 1).

In the draft of the HEVC at present, a deblocking filter, an adaptive loop filter, and an adaptive offset filter are adopted as in-loop filters, and there are two parameters of a deblocking filter including a parameter $\beta$ and a parameter Tc. The parameter $\beta$ has 52 values of 0 to 51, and is fixed to 64 for an input larger than 51. The parameter Tc has 54 values of 0 to 53, and is fixed to 13 for an input larger 53.

The range of a quantization parameter QP that can be used in the HEVC is 0 to 51, but the range of the offset of the parameter of the deblocking filter is −26 to 26. Therefore, theoretically, the input range of the LUT (Look Up Table) of the parameter of the deblocking filter is 0 to 77.

CITATION LIST

Non-Patent Document

Non-Patent Document 1: Benjamin Bross, Woo-Jin Han, Jens-Rainer Ohm, Gary J. Sullivan, Thomas Wiegand, "High efficiency video coding (HEVC) text specification draft 6", JCTVC-H1003 ver20, 2012.2.17

SUMMARY OF THE INVENTION

Problems to be Solved by the Invention

However, since the quantization parameter QP that is an actual input of the parameter of the deblocking filter to the LUT is 0 to 51, the offset value is not used to the maximum.

In addition, as described above, even if 64 that is the maximum value of the parameter $\beta$ and 13 that is the maximum value of the parameter Tc in the HEVC are used, there have been cases where block noise is visible remains in some sequences.

The present disclosure has been made in view of such a situation, and it is possible to suppress block noise.

Solutions to Problems

An image processing device of a first aspect of the present disclosure includes: a decoding unit that generates an image by decoding an encoded stream; and a filter unit that performs filtering of a filter using a parameter, which is obtained by extending a range of a filter parameter for controlling the filter so as to increase a filter strength, with a block boundary of the image generated by the decoding unit as a target.

The range of the filter parameter is extended so as to increase the filter strength of the filter in a state of being consistent with an existing range.

The range of the filter parameter is adjusted so as to be continuous in an existing portion and an extended portion.

The range of the filter parameter is extended by adding a new filter parameter.

The filter parameter is a threshold value used when determining whether or not to perform the filtering.

The filter is a deblocking filter, and the filter parameter is a parameter used when determining whether or not the deblocking filter is required or when determining strength selection.

The range of the filter parameter is extended in a linear shape.

An inclination of the linear shape is adjustable.

The range of the filter parameter is extended in a curved line.

The filter is a deblocking filter, and the filter parameter is a parameter used when determining strength selection of the deblocking filter or used in clipping when performing filtering of the filter.

The filter unit can perform filtering of the filter using a parameter, which is extended by updating a table using an inclination of a computational expression that expresses the filter parameter, with a block boundary of the image generated by the decoding unit as a target.

The filter unit can perform filtering of the filter using a parameter, which is extended by adding an offset of the filter parameter to the filter parameter, with a block boundary of the image generated by the decoding unit as a target.

The filter parameter can include two types of parameters that use a common offset, and a parameter calculation unit that calculates the two types of parameters using the common offset can be further provided.

The filter parameter can include two types of parameters, and a first parameter calculation unit, which calculates a first filter parameter using an offset of a first parameter, and a second parameter calculation unit, which calculates a second filter parameter using the offset of the first parameter, a difference between the first and second filter parameters, and an offset of the second parameter, can be further provided.

The filter is a deblocking filter.

The filter is an adaptive offset filter.

The decoding unit can decode the encoded stream in a processing unit having a hierarchical structure.

An image processing method of an image processing device of the first aspect of the present disclosure includes: generating an image by decoding an encoded stream; and performing filtering of a filter using a parameter, which is obtained by extending a range of a filter parameter for controlling the filter so as to increase a filter strength, with a block boundary of the generated image as a target.

An image processing device of a second aspect of the present disclosure includes: a filter unit that performs filtering of a filter using a parameter, which is obtained by extending a range of a filter parameter for controlling the filter so as to increase a filter strength, with a block boundary of a locally decoded image as a target; an encoding unit that generates an encoded stream by encoding the image using the image subjected to the filtering of the filter by the filter unit; and a transmission unit that transmits the encoded stream generated by the encoding unit.

An image processing method of an image processing device of the second aspect of the present disclosure includes: performing filtering of a filter using a parameter, which is obtained by extending a range of a filter parameter for controlling the filter so as to increase a filter strength, with a block boundary of a locally decoded image as a target; generating an encoded stream by encoding the image using the image subjected to the filtering of the filter; and transmitting the generated encoded stream.

In the first aspect of the present disclosure, the encoded stream is decoded to generate an image. Then, with the block boundary of the generated image as a target, filtering of the filter is performed using a parameter obtained by extending the range of the filter parameter for controlling the filter so as to increase the filter strength.

In addition, in the second aspect of the present disclosure, with block boundary of the locally decoded image as a target, filtering of the filter is performed using a parameter obtained by extending the range of the filter parameter for controlling the filter so as to increase the filter strength. Then, an encoded stream is generated by encoding the image using the image subjected to the filtering of the filter, and the generated encoded stream is transmitted.

In addition, the image processing device described above may be an independent device, or may be an internal block that configures one image encoding device or image decoding device.

Effects of the Invention

According to the first aspect of the present disclosure, it is possible to decode an image. In particular, it is possible to suppress block noise.

According to the second aspect of the present disclosure, it is possible to encode an image. In particular, it is possible to suppress block noise.

BRIEF DESCRIPTION OF DRAWINGS

FIG. 7 is a diagram showing the values of parameters $\beta$ and Tc corresponding to a quantization parameter Q in the HEVC method.

FIG. 8 is a diagram showing the relationship between a quantization parameter QP and the parameter $\beta$ in a first extension method of the present technique.

FIG. 32 is a diagram illustrating an example of the parameter β in a third extension method of the present technique.

FIG. 33 is a diagram illustrating an example of the parameter Tc in the third extension method of the present technique.

FIG. 46 is a diagram showing an example of syntax.

FIG. 52 is a diagram showing an example of syntax.

MODE FOR CARRYING OUT THE INVENTION

Modes for carrying out the present disclosure (hereinafter referred to as the embodiments) will be described below. The description will be made in the following order.
1. Overview of device and operation
2. Explanation of a conventional method
3. First embodiment (first extension method)
4. Second embodiment (second extension method)
5. Third embodiment (third extension method)
6. Fourth embodiment (fourth extension method)
7. Fifth embodiment (first offset transmission method)
8. Sixth embodiment (second offset transmission method)
9. Seventh embodiment (multi-view image encoding/multi-view image decoding device)
10. Eighth embodiment (hierarchical image encoding/hierarchical image decoding device)
11. Ninth embodiment (computer)
12. Applications
13. Applications of scalable encoding 1. Overview of Device and Operation

[Configuration Example of an Image Encoding Device]

Figure 1:
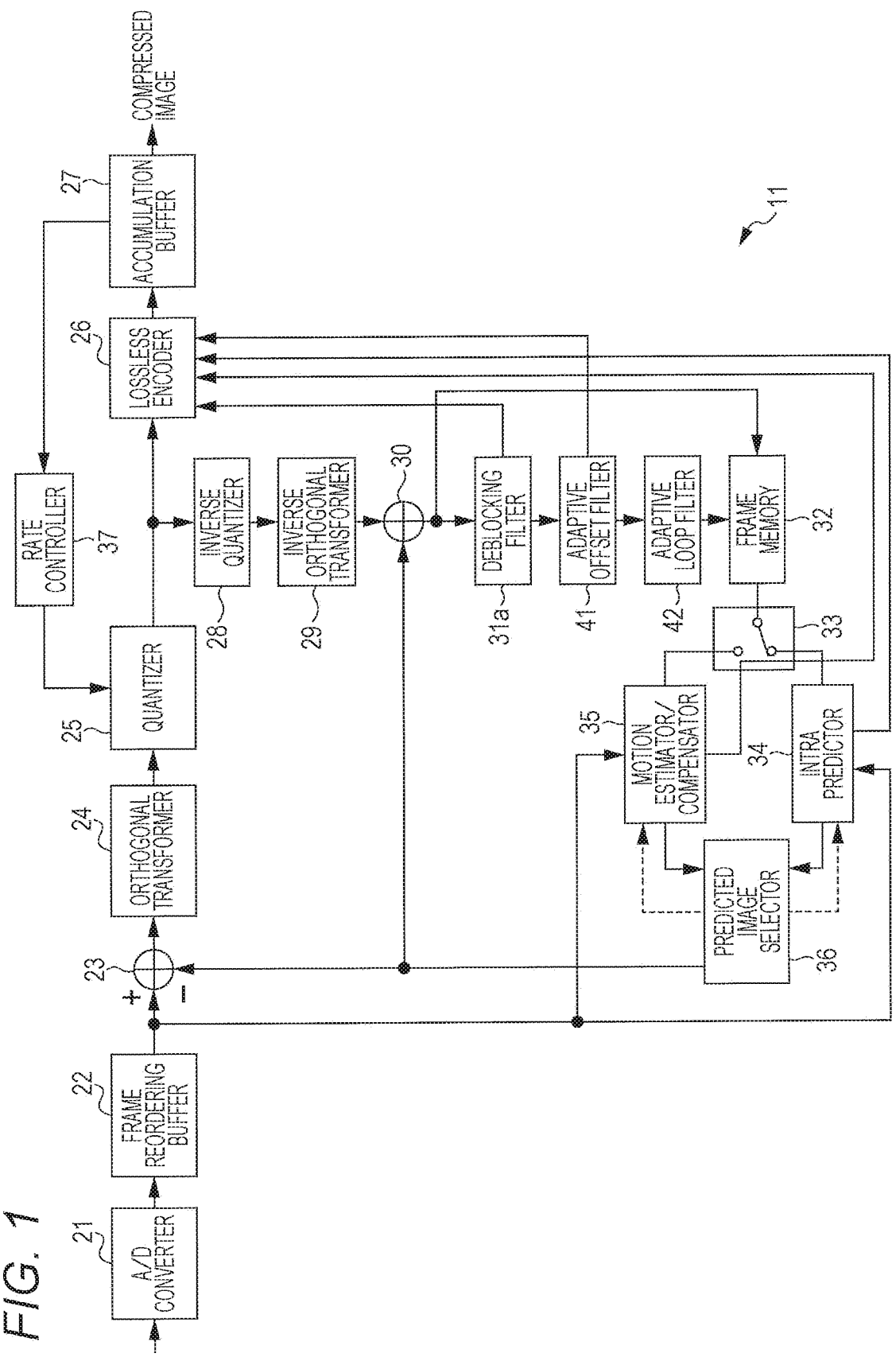
FIG. 1 is a block diagram showing a typical example structure of an image encoding device.

FIG. 1 shows the configuration of an embodiment of an image encoding device as an image processing device to which the present disclosure is applied.

An image encoding device 11 shown in FIG. 1 encodes image data using a prediction process. Here, as an encoding method, for example, an HEVC (High Efficiency Video Coding) method or the like is used.

In addition, in the HEVC method, a coding unit (CU) is defined. The CU is also referred to as a coding tree block (CTB), and is a partial region of an image of the picture unit that plays the same role as a macro block in the H.264/AVC method. The latter is fixed to the size of 16×16 pixels, while the size of the former is not fixed and is designated in image compression information in each sequence.

For example, in a sequence parameter set (SPS) included in the encoded data to be output, the maximum size (LCU (Largest Coding Unit)) and the minimum size (SCU (Smallest Coding Unit)) of the CU are defined.

Within each LCU, division into the CU having a smaller size can be performed by setting split-flag=1 in a range not less than the size of the SCU. The CU having a size of 2N×2N is divided into CUs having a size of N×N, which are one level below, when the value of split_flag is "1".

In addition, the CU is divided into a prediction unit (PU), which is a region (partial region of an image of the picture unit) to be subjected to an intra or inter prediction process, and is divided into a transform unit (TU), which is a region (partial region of an image of the picture unit) to be subjected to an orthogonal transform process. At present, in the HEVC method, it is possible to use orthogonal transform of 16×16 and 32×32 in addition to 4×4 and 8×8.

The image encoding device 11 of FIG. 1 includes an A/D (Analog/Digital) converter 21, a frame reordering buffer 22, an arithmetic operation unit 23, an orthogonal transformer 24, a quantizer 25, a lossless encoder 26, and an accumulation buffer 27. The image encoding device 11 also includes an inverse quantizer 28, an inverse orthogonal transformer 29, an arithmetic operation unit 30, a deblocking filter 31a, a frame memory 32, a selector 33, an intra predictor 34, a motion estimator/compensator 35, a predicted image selector 36, and a rate controller 37.

In addition, the image encoding device 11 includes an adaptive offset filter 41 and an adaptive loop filter 42 between a deblocking filter 31a and a frame memory 32.

The A/D converter 21 performs A/D conversion on input image data, outputs the image data to the frame reordering buffer 22, and stores the image data therein.

A frame reordering buffer 22 reorders the frames of the image stored in display order into the frame order for encoding in accordance with a GOP (Group of Picture) structure. The frame reordering buffer 22 supplies the image, in which the frames have been reordered, to an arithmetic operation unit 23. In addition, the frame reordering buffer 22 also supplies the image, in which the frames have been reordered, to an intra predictor 34 and a motion estimator/compensator 35.

The arithmetic operation unit 23 subtracts a predicted image supplied from the intra predictor 34 or the motion estimator/compensator 35 via the predicted image selector 36 from an image read from the frame reordering buffer 22, and outputs resulting difference information to the orthogonal transformer 24.

For example, in the case of an image on which intra coding is performed, the arithmetic operation unit 23 subtracts a predicted image supplied from the intra predictor 34 from an image read from the frame reordering buffer 22. In addition, for example, in the case of an image on which inter coding is performed, the arithmetic operation unit 23 subtracts a predicted image supplied from the motion estimator/compensator 35 from an image read from the frame reordering buffer 22.

The orthogonal transformer 24 performs an orthogonal transform, such as a discrete cosine transform or a Karhunen-Loeve transform, on the difference information supplied from the arithmetic operation unit 23, and supplies the transform coefficient to a quantizer 25.

The quantizer 25 quantizes the transform coefficient output from the orthogonal transformer 24. The quantizer 25 supplies the quantized transform coefficient to a lossless encoder 26.

The lossless encoder 26 performs lossless encoding, such as variable length coding and arithmetic coding, on the quantized transform coefficient.

The lossless encoder 26 acquires a parameter, such as information indicating an intra prediction mode, from the intra predictor 34, and acquires a parameter, such as information indicating an inter prediction mode or motion vector information, from the motion estimator/compensator 35.

The lossless encoder 26 encodes the quantized transform coefficient, and also encodes each parameter (syntax element) acquired and sets the result as a part of the header information of encoded data (multiplexes the result). The lossless encoder 26 supplies the encoded data obtained by encoding to an accumulation buffer 27 to accumulate the encoded data.

For example, in the lossless encoder 26, a lossless encoding process, such as variable length coding or arithmetic coding, is performed. As the variable length coding, CAVLC (Context-Adaptive Variable Length Coding) and the like can be mentioned. As the arithmetic coding, CABAC (Context-Adaptive Binary Arithmetic Coding) and the like can be mentioned.

The accumulation buffer 27 temporarily holds the encoded stream (data) supplied from the lossless encoder 26, and outputs the held encoded data to, for example, a downstream recording device (not shown) or a transmission path, as an encoded image at a predetermined timing. That is, the accumulation buffer 27 is also a transmission unit to transmit the encoded stream.

In addition, the transform coefficient quantized by the quantizer 25 is also supplied to an inverse quantizer 28. The inverse quantizer 28 performs inverse quantization of the quantized transform coefficient using a method corresponding to the quantization of the quantizer 25. The inverse quantizer 28 supplies the obtained transform coefficient to an inverse orthogonal transformer 29.

The inverse orthogonal transformer 29 performs inverse orthogonal transform on the supplied transform coefficient by a method corresponding to the orthogonal transform process by the orthogonal transformer 24. The output obtained by the inverse orthogonal transform (restored difference information) is supplied to the arithmetic operation unit 30.

The arithmetic operation unit 30 adds the predicted image supplied from the intra predictor 34 or the motion estimator/compensator 35 via the predicted image selector 36 to the result of the inverse orthogonal transform, that is, the restored difference information supplied from the inverse orthogonal transformer 29 to obtain a locally decoded image (decoded image).

For example, when the difference information corresponds to an image on which intra coding is performed, the arithmetic operation unit 30 adds the predicted image supplied from the intra predictor 34 to the difference information. In addition, for example, when the difference information corresponds to an image on which inter coding is performed, the arithmetic operation unit 30 adds the predicted image supplied from the motion estimator/compensator 35 to the difference information.

A decoded image that is the addition result is supplied to the deblocking filter 31a and the frame memory 32.

The deblocking filter 31a suppresses block distortion of the decoded image by appropriately performing deblocking filtering. The deblocking filter 31a has parameters $\beta$ and Tc calculated based on the quantization parameter QP. The parameters $\beta$ and Tc are threshold values (parameters) used in determination regarding the deblocking filter. $\beta$ and Tc, which are parameters that the deblocking filter 31a has, are extended from $\beta$ and Tc that are defined in the HEVC method.

In addition, the deblocking filter 31a can be disabled by the instruction of the user, and ON/OFF information regarding whether or not to perform the deblocking filter is input to the deblocking filter 31a by operating an operation unit (not shown) or the like by the user. In addition, the default of each offset of the parameters $\beta$ and Tc described above is 0. However, when the default of each offset of the parameters $\beta$ and Tc described above is a value other than 0, the user inputs the value to the deblocking filter 31a by operating an operation unit (not shown) or the like. The ON/OFF information (also referred to as DisableDeblockingFilter flag information) of the deblocking filter and each offset of the parameters β and Tc is encoded as a parameter of the deblocking filter by the lossless encoder 26, and is transmitted to an image decoding device 51 shown in FIG. 3 to be described later.

The deblocking filter 31a performs deblocking filtering on the image from the arithmetic operation unit 30 using the ON/OFF information and the offset described above and β and Tc, which are parameters extended from β and Tc defined in the HEVC method. The deblocking filter 31a supplies the filtering result to the adaptive offset filter 41. In addition, the detailed configuration of the deblocking filter 31a will be described later with reference to FIG. 14.

The adaptive offset filter 41 performs an offset filtering (SAO: Sample adaptive offset) process for mainly suppressing ringing on the image after the filtering of the deblocking filter 31a.

Types of offset filters are a total of nine types including two types of band offset, six types of edge offset, and no offset. The adaptive offset filter 41 performs filtering on the image after the filtering of the deblocking filter 31a using an offset value for each quad-tree structure, in which the type of the offset filter is determined for each divided region, and each divided region. The adaptive offset filter 41 supplies the image after filtering to the adaptive loop filter 42.

In addition, in the image encoding device 11, an offset value for each quad-tree structure and divided region is calculated by the adaptive offset filter 41, and is used. The calculated offset value for each quad-tree structure and divided region is encoded as an adaptive offset parameter by the lossless encoder 26, and is transmitted to the image decoding device 51 shown in FIG. 3 to be described later.

The adaptive loop filter 42 performs an adaptive loop filter (ALF: AdaptiveLoop Filter) process on the image after the filtering of the adaptive offset filter 41 in a processing unit using a filter coefficient. In the adaptive loop filter 42, as the filter, for example, a two-dimensional Wiener filter is used. Undoubtedly, it is also possible to use filters other than the Wiener filter. The adaptive loop filter 42 supplies a filtering result to the frame memory 32.

In addition, although not shown in the example of FIG. 1, in the image encoding device 11, the filter coefficient is calculated by the adaptive loop filter 42 so that a residual error between each processing unit and the original image from the frame reordering buffer 22 is minimized and is used. The calculated filter coefficient is encoded as an adaptive loop filter parameter by the lossless encoder 26, and is transmitted to the image decoding device 51 shown in FIG. 3 to be described later.

The frame memory 32 outputs the accumulated reference image to the intra predictor 34 or the motion estimator/compensator 35 through a selector 33 at a predetermined timing.

For example, in the case of an image on which intra coding is performed, the frame memory 32 supplies the reference image to the intra predictor 34 through the selector 33. In addition, for example, when inter coding is performed, the frame memory 32 supplies the reference image to the motion estimator/compensator 35 through the selector 33.

When the reference image supplied from the frame memory 32 is an image on which intra coding is performed, the selector 33 supplies the reference image to the intra predictor 34. In addition, when the reference image supplied from the frame memory 32 is an image on which inter coding is performed, the selector 33 supplies the reference image to the motion estimator/compensator 35.

The intra predictor 34 performs intra prediction (intra-frame prediction) for generating a predicted image using pixel values within the screen. The intra predictor 34 performs intra prediction in a plurality of modes (intra prediction modes).

The intra predictor 34 generates predicted images in all intra prediction modes, evaluates each predicted image, and selects an optimal mode. Once the optimal intra prediction mode is selected, the intra predictor 34 supplies the predicted image generated in the optimal mode to the arithmetic operation unit 23 or the arithmetic operation unit 30 through a predicted image selector 36.

In addition, as described above, the intra predictor 34 appropriately supplies a parameter, such as intra prediction mode information indicating the adopted intra prediction mode, to the lossless encoder 26.

The motion estimator/compensator 35 performs motion estimation for an image, on which inter coding is performed, using an input image supplied from the frame reordering buffer 22 and the reference image supplied from the frame memory 32 through the selector 33. In addition, the motion estimator/compensator 35 performs a motion compensation process according to the motion vector detected by motion estimation, thereby generating a predicted image (inter-predicted image information).

The motion estimator/compensator 35 generates predicted images by performing an inter prediction process in all of the candidate inter prediction modes. The motion estimator/compensator 35 supplies the generated predicted images to the arithmetic operation unit 23 or the arithmetic operation unit 30 through the predicted image selector 36.

In addition, the motion estimator/compensator 35 supplies a parameter, such as inter prediction mode information indicating the adopted inter prediction mode or motion vector information indicating the calculated motion vector, to the lossless encoder 26.

The predicted image selector 36 supplies an output of the intra predictor 34 to the arithmetic operation unit 23 or the arithmetic operation unit 30 in the case of an image on which intra coding is performed, and supplies an output of the motion estimator/compensator 35 to the arithmetic operation unit 23 or the arithmetic operation unit 30 in the case of an image on which inter coding is performed.

A rate controller 37 controls the rate of the quantization operation of the quantizer 25 based on the compressed image accumulated in the accumulation buffer 27 such that overflow or underflow does not occur.

[Operation of the Image Encoding Device]

Figure 2:
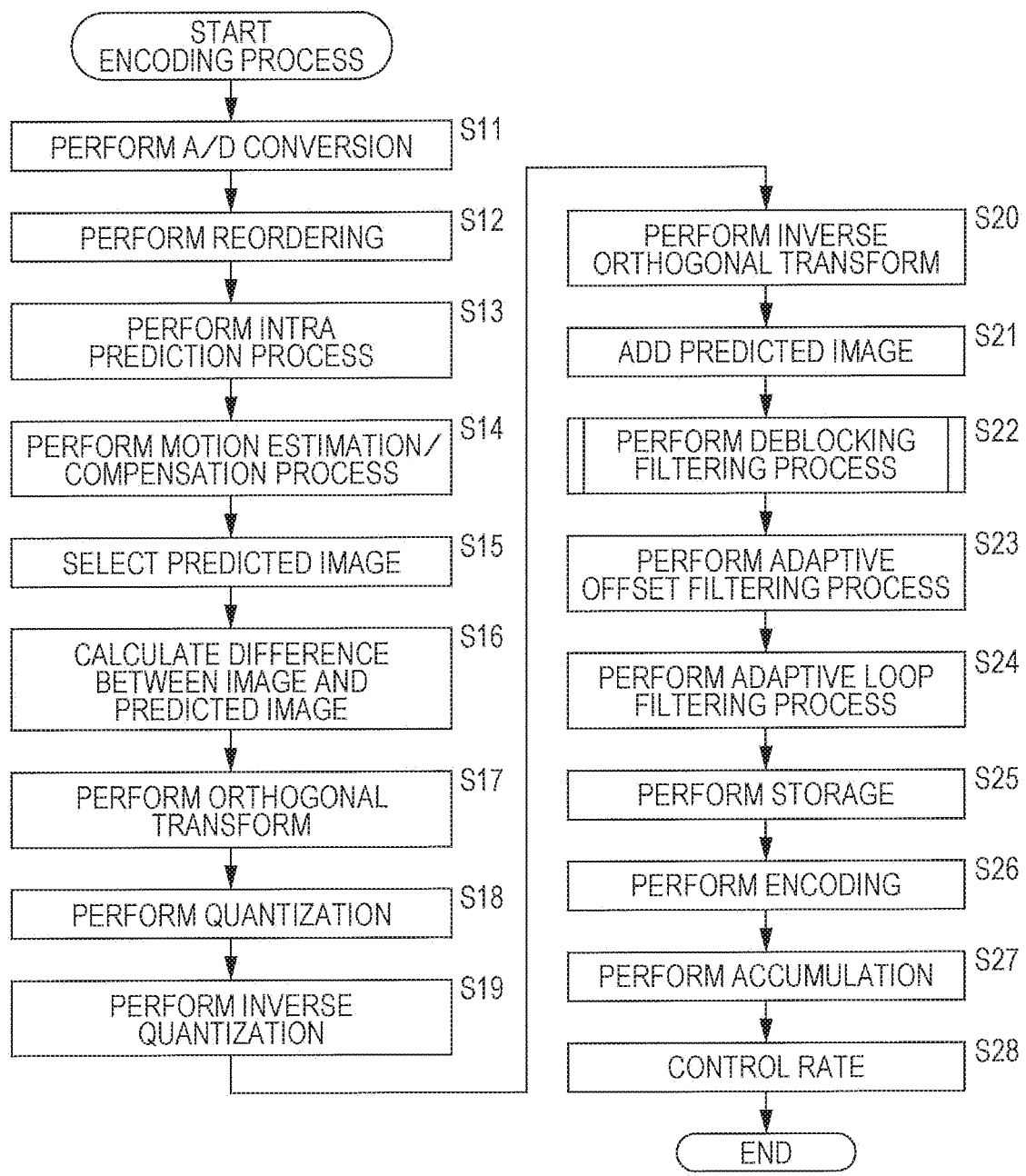
FIG. 2 is a flowchart illustrating an example of the flow of the encoding process.

The flow of the encoding process performed by the above image encoding device 11 will be described with reference to FIG. 2.

In step S11, the A/D converter 21 performs A/D conversion on an input image. In step S12, the frame reordering buffer 22 stores the image obtained by the A/D conversion and reorders respective pictures in display order into encoding order.

When the image e processed, which is supplied from the frame reordering buffer 22, is an image of a block that is to be subjected to intra processing, a decoded image to be referred to is read from the frame memory 32 and is supplied to the intra predictor 34 through the selector 33.

In step S13, based on these images, the intra predictor 34 performs intra prediction of pixels of the block to be processed in all of the candidate intra prediction modes. In addition, as a decoded pixel to be referred to, a pixel that is not filtered by the deblocking filter 31a is used.

By this processing, intra prediction is performed in all of the candidate intra prediction modes, and cost function values are calculated for all of the candidate inter prediction modes. Then, an optimal intra prediction mode is selected based on the calculated cost function values, and a predicted image generated by intra prediction in the optimal intra prediction mode and the cost function value are supplied to the predicted image selector 36.

When the image to be processed, which is supplied from the frame reordering buffer 22, is an image that is to be subjected to inter processing, an image to be referred to is read from the frame memory 32 and is supplied to the motion estimator/compensator 35 through the selector 33. In step S14, the motion estimator/compensator 35 performs motion estimation/compensation processing based on these images.

By this processing, motion estimation processing is performed in all of the candidate inter prediction modes, and cost function values are calculated in all of the candidate inter prediction modes. Based on the calculated cost function values, an optimal inter prediction mode is determined. Then, a predicted image generated in the optimal inter prediction mode and the cost function value are supplied to the predicted image selector 36.

In step S15, the predicted image selector 36 determines either the optimal intra prediction mode or the optimal inter prediction mode as an optimal prediction mode based on the respective cost function values output from the intra predictor 34 and the motion estimator/compensator 35. Then, the predicted image selector 36 selects the predicted image in the determined optimal prediction mode, and supplies it to the arithmetic operation units 23 and 30. The predicted image is used in the operations of steps S16 and S21 to be described later.

In addition, the selection information of the predicted image is supplied to the intra predictor 34 or the motion estimator/compensator 35. When the predicted image in the optimal intra prediction mode is selected, the intra predictor 34 supplies information indicating the optimal intra prediction mode (that is, a parameter regarding intra prediction) to the lossless encoder 26.

When the predicted image in the optimal inter prediction mode is selected, the motion estimator/compensator 35 outputs information indicating the optimal inter prediction mode and information corresponding to the optimal inter prediction mode (that is, a parameter regarding motion estimation) to the lossless encoder 26. As the information corresponding to the optimal inter prediction mode, motion vector information, reference frame information, and the like can be mentioned.

In step S16, the arithmetic operation unit 23 calculates a difference between the image reordered in step S12 and the predicted image selected in step S15. The predicted image is supplied from the motion estimator/compensator 35 to the arithmetic operation unit 23 through the predicted image selector 36 in the case of inter prediction, and from the intra predictor 34 to the arithmetic operation unit 23 through the predicted image selector 36 in the case of intra prediction.

The data amount of difference data is reduced compared with that of the original image data. Therefore, it is possible to compress the amount of data compared with a case of encoding an image as it is.

In step S17, the orthogonal transformer 24 performs an orthogonal transform of the difference information supplied from the arithmetic operation unit 23. Specifically, an orthogonal transform, such as a discrete cosine transform or a Karhunen-Loeve transform, is performed, and the transform coefficient is supplied.

In step S18, the quantizer 25 quantizes the transform coefficient. In the quantization, the rate is controlled as explained by the processing of step S28 to be described later.

The difference information quantized as described above is locally decoded as follows. That is, in step S19, the inverse quantizer 28 performs inverse quantization of the transform coefficient quantized by the quantizer 25 with characteristics corresponding to the characteristics of the quantizer 25. In step S20, the inverse orthogonal transformer 29 performs an inverse orthogonal transform of the transform coefficient, which has been inversely quantized by the inverse quantizer 28, with characteristics corresponding to the characteristics of the orthogonal transformer 24.

In step S21, the arithmetic operation unit 30 generates a locally decoded image (image corresponding to the input to the arithmetic operation unit 23) by adding the predicted image input through the predicted image selector 36 to the locally decoded difference information.

In step S22, the deblocking filter 31a performs deblocking filtering on the image output from the arithmetic operation unit 30. The deblocking filtering process will be described in detail with reference to FIG. 23. In this case, parameters β and Tc extended from β and Tc defined in the HEVC method are used as threshold values of determination regarding the deblocking filter. The image after filtering from the deblocking filter 31a is output to the adaptive offset filter 41.

In addition, the ON/OFF information used in the deblocking filter 31a and each offset of the parameters β and Tc, which have been input by operating an operation unit (not shown) or the like by the user, are supplied to the lossless encoder 26 as parameters of the deblocking filter.

In step S23, the adaptive offset filter 41 performs adaptive offset filtering. By this processing, filtering is performed on the image after the filtering of the deblocking filter 31a using an offset value for each quad-tree structure, in which the type of the offset filter is determined for each divided region, and each divided region. The image after filtering is supplied to the adaptive loop filter 42.

In addition, the determined offset value for each quad-tree structure and divided region is supplied to the lossless encoder 26 as an adaptive offset parameter.

In step S24, the adaptive loop filter 42 performs adaptive loop filtering on the image after the filtering of the adaptive offset filter 41. For example, filtering is performed on the image after the filtering of the adaptive offset filter 41 in a processing unit using a filter coefficient, and the filtering result is supplied to the frame memory 32.

In step S25, the frame memory 32 stores the filtered image, in addition, images not filtered by the deblocking filter 31a, the adaptive offset filter 41, and the adaptive loop filter 42 are also supplied from the arithmetic operation unit 30 to the frame memory 32 and are stored.

On the other hand, the transform coefficient quantized in step S18 described above is also supplied to the lossless encoder 26. In step S26, the lossless encoder 26 encodes the quantized transform coefficient output from the quantizer 25 and each parameter that is supplied. That is, a difference image is compressed by lossless encoding, such as variable length coding or arithmetic coding. Here, as parameters encoded, there are a parameter of a deblocking filter, a parameter of an adaptive offset filter, a parameter of an adaptive loop filter, a quantization parameter, motion vector information or reference frame information, prediction mode information, and the like.

In step S27, the accumulation buffer 27 accumulates the encoded difference image (that is, an encoded stream) as a compressed image. The compressed image accumulated in the accumulation buffer 27 is appropriately read and is transmitted to the decoding side through the transmission path.

In step S28, the rate controller 37 controls the rate of the quantization operation of the quantizer 25 based on the compressed image accumulated in the accumulation buffer 27 such that overflow or underflow does not occur.

The encoding process ends when the processing in step S28 ends.

[Configuration Example of an Image Decoding Device]

Figure 3:
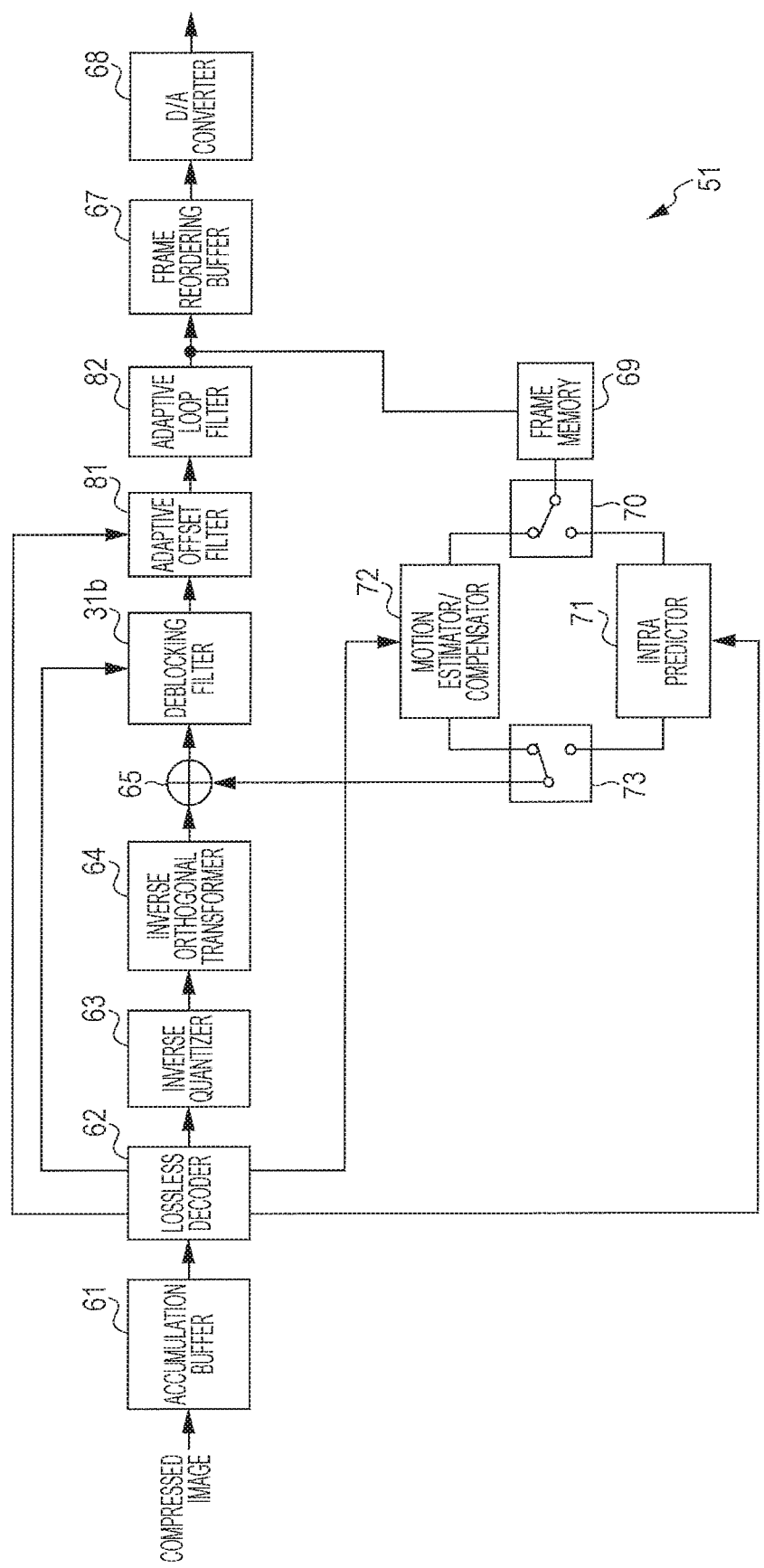
FIG. 3 is a block diagram showing a typical example structure of an image decoding device.

FIG. 3 shows the configuration of an embodiment of an image decoding device as an image processing device to which the present disclosure is applied. The image decoding device 51 shown in FIG. 3 is a decoding device corresponding to the image encoding device 11 shown in FIG. 1.

It is assumed that the encoded s earn (data), which is encoded by the image encoding device 11, is transmitted to the image decoding device 51 corresponding to the image encoding device 11 through a predetermined transmission path and is decoded.

As shown in FIG. 3, the image decoding device 51 includes an accumulation buffer 61, a lossless decoder 62, an inverse quantizer 63, an inverse orthogonal transformer 64, an arithmetic operation unit 65, a deblocking filter 31b, a frame reordering buffer 67, and a D/A converter 68. The image decoding device 51 also includes a frame memory 69, a selector 70, an intra predictor 71, a motion estimator/compensator 72, and a selector 73.

In addition, the image decoding device 51 includes an adaptive offset filter 81 and an adaptive loop filter 82 between a deblocking filter 31b and a frame reordering buffer 67 and a frame memory 69.

An accumulation buffer 61 is also a receiving unit that receives the transmitted encoded data. The accumulation buffer 61 receives and accumulates the transmitted encoded data. The encoded data has been encoded by the image encoding device 11. A lossless decoder 62 decodes the encoded data read from the accumulation buffer 61 at a predetermined timing using a method corresponding to the encoding method of the lossless encoder 26 shown in FIG. 1.

The lossless decoder 62 supplies a parameter, such as information indicating the decoded intra prediction mode, to a predictor 71, and supplies a parameter, such as information indicating the inter prediction mode or motion vector information, to a motion estimator/compensator 72. In addition, the lossless decoder 62 supplies the decoded parameter of the deblocking filter to the deblocking filter 31b, and supplies the decoded adaptive offset parameter to the adaptive offset filter 81.

The inverse quantizer 63 performs inverse quantization of coefficient data (quantization coefficient) obtained by the decoding of the lossless decoder 62 using a method corresponding to the quantization method of the quantizer 25 shown in FIG. 1. That is, the inverse quantizer 63 performs inverse quantization of the quantization coefficient in the same method as the inverse quantizer 28 shown in FIG. 1 using the quantization parameter supplied from the image encoding device 11.

The inverse quantizer 63 supplies the inverse-quantized coefficient data, that is, an orthogonal transform coefficient, to an inverse orthogonal transformer 64. The inverse orthogonal transformer 64 performs an inverse orthogonal transform of the orthogonal transform coefficient using a method corresponding to the orthogonal transform method of the orthogonal transformer 24 shown in FIG. 1, thereby obtaining decoded residual data corresponding to residual data before the orthogonal transform in the image encoding device 11.

The decoded residual data obtained by the inverse orthogonal conversion is supplied to the arithmetic operation unit 65. In addition, a predicted image is supplied to the arithmetic operation unit 65 from the intra predictor 71 or the motion estimator/compensator 72 via the selector 73.

The arithmetic operation unit 65 adds the decoded residual data and the predicted image to obtain decoded image data corresponding to image data before the predicted image is subtracted by the arithmetic operation unit 23 in the image encoding device 11. The arithmetic operation unit 65 supplies the decoded image data to the deblocking filter 31b.

The deblocking filter 31b suppresses block distortion of the decoded image by appropriately performing deblocking filtering. The deblocking filter 31b is configured in basically the same manner as the deblocking filter 31a shown in FIG. 1. That is, the deblocking filter 31b has parameters β and Tc calculated based on the quantization parameter. The parameters β and Tc are threshold values used in determination regarding the deblocking filter. β and Tc, which are parameters that the deblocking filter 31b has, are extended from β and Tc that are defined in the HEVC method.

In addition, the ON/OFF information of the deblocking filter and each offset of the parameters β and Tc, which have been encoded by the image encoding device 11, are received as parameters of the deblocking filter by the image decoding device 51, are decoded by the lossless decoder 62, and are used by the deblocking filter 31b.

The deblocking filter 31b performs deblocking filtering on the image from the arithmetic operation unit 30 using the ON/OFF information and the offset described above and β and Tc, which are parameters extended from β and Tc defined in the HEVC method. The deblocking filter 31b supplies the filtering result to the adaptive offset filter 81. In addition, the detailed configuration of the deblocking filter 31b will be described later with reference to FIG. 14.

The adaptive offset filter 81 performs an offset filtering (SAO) for mainly suppressing ringing on the image after the filtering of the deblocking filter 31b.

The adaptive offset filter 81 performs filtering on the image after the filtering of the deblocking filter 31b using an offset value for each quad-tree structure, in which the type of the offset filter is determined for each divided region, and each divided region. The adaptive offset filter 81 supplies the image after filtering to the adaptive loop filter 82.

In addition, an offset value for each quad-tree structure and divided region is calculated by the adaptive offset filter 41 of the image encoding device 11, and is encoded and transmitted as an adaptive offset parameter. The offset value for each quad-tree structure and divided region that has been encoded by the image encoding device 11 is received as an adaptive offset parameter by the image decoding device 51, is decoded by the lossless decoder 62, and is used by the adaptive offset filter 81.

The adaptive loop filter 82 performs filtering on the image after the filtering of the adaptive offset filter 81 in a processing unit using a filter coefficient, and supplies the filtering result to the frame memory 69 and the frame reordering buffer 67.

In addition, although not shown in the example of FIG. 3, in the image decoding device 51, a filter coefficient is calculated for each LUC by the adaptive loop filter 42 of the image encoding device 11, and a filter coefficient encoded and transmitted as an adaptive loop filter parameter is decoded by the lossless decoder 62 and is used.

The frame reordering buffer 67 performs image reordering. Specifically, the frames reordered into the encoding order by the frame reordering buffer 22 in FIG. 1 are reordered into the original display order. The D/A converter 68 performs a D/A conversion on the image supplied from the frame reordering buffer 67, and outputs the converted image to a display (not shown) to display the image.

In addition, the output of the adaptive loop filter 82 is supplied to a frame memory 69.

The frame memory 69, a selector 70, the intra predictor 71, the motion estimator/compensator 72, and a selector 73 correspond to the frame memory 32, the selector 33, the intra predictor 34, the motion estimator/compensator 35, and the predicted image selector 36 of the image encoding device 11, respectively.

The selector 70 reads an inter-processed image and an image, which is to be referred to, from the frame memory 69 and supplies these images to the motion estimator/compensator 72. In addition, the selector 70 reads an image used for intra prediction from the frame memory 69 and supplies the image to the intra predictor 71.

Information indicating the intra prediction mode, which is obtained by decoding the header information, or the like is appropriately supplied from the lossless decoder 62 to the intra predictor 71. Based on the information, the intra predictor 71 generates a predicted image from the reference image acquired from the frame memory 69, and supplies the generated predicted image to the selector 73.

Information obtained by decoding the header information (prediction mode information, motion vector information, reference frame information, a flag, various parameters, and the like) is supplied from the lossless decoder 62 to the motion estimator/compensator 72.

Based on the information supplied from the lossless decoder 62, the motion estimator/compensator 72 generates a predicted image from the reference image acquired from the frame memory 69, and supplies the generated predicted image to the selector 73.

The selector 73 selects the predicted image generated by the motion estimator/compensator 72 or the intra predictor 71, and supplies the selected predicted image to the arithmetic operation unit 65.

[Operation of the Image Decoding Device]

Figure 4:
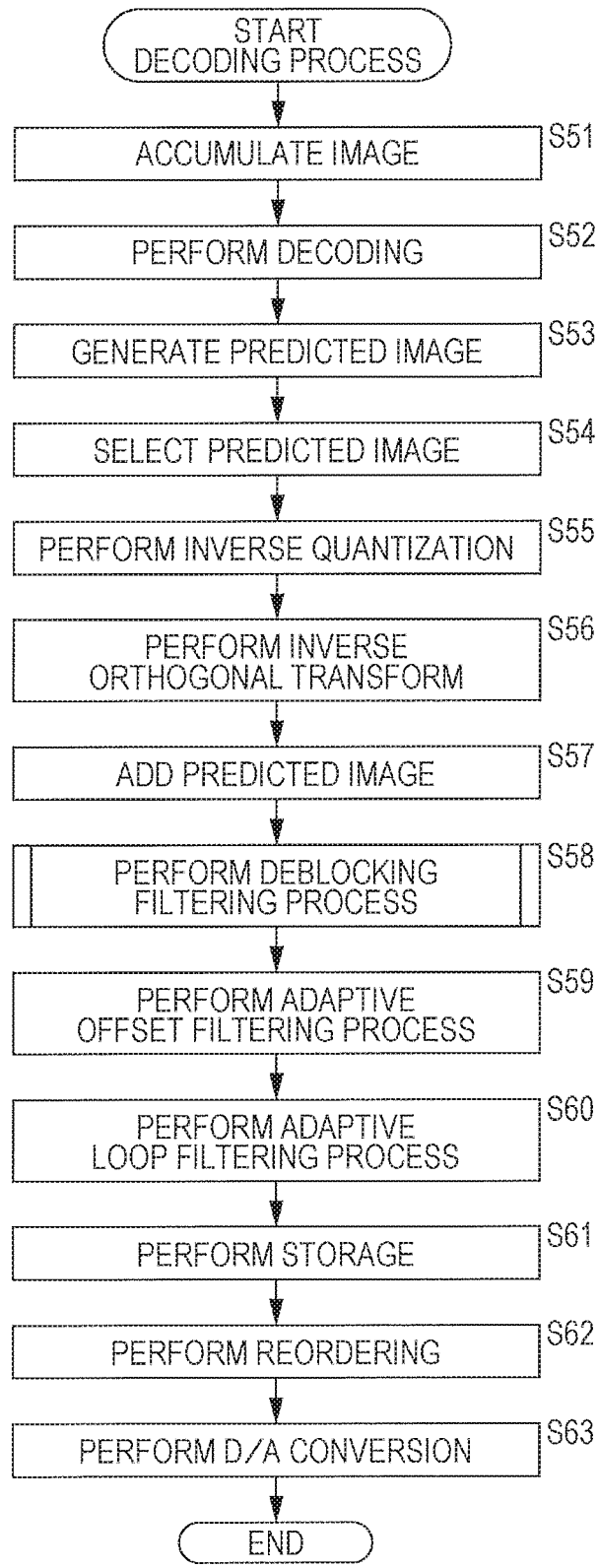
FIG. 4 is a flowchart illustrating an example of the flow of the decoding process.

An example of the flow of the decoding process performed by the above image decoding device 51 will be described with reference to FIG. 4.

When decoding processing is started, in step S51, the accumulation buffer 61 receives and accumulates a transmitted encoded stream (data). In step S52, the lossless decoder 62 decodes the encoded data supplied from the accumulation buffer 61. An I picture, a P picture, and a B picture encoded by the lossless encoder 26 shown in FIG. 1 are decoded.

Prior to the decoding of the pictures, parameter information, such as motion vector information, reference frame information, and prediction mode information (intra prediction mode or inter prediction mode), is also decoded.

When the prediction mode information is intra prediction mode information, the prediction mode information is supplied to the intra predictor 71. When the prediction mode information is inter prediction mode information, the prediction mode information and corresponding motion vector information and the like are supplied to the motion estimator/compensator 72. In addition, the parameter of the deblocking filter and the adaptive offset parameter are also decoded and supplied to the deblocking filter 31b and the adaptive offset filter 81, respectively.

In step S53, the intra predictor 71 or the motion estimator/compensator 72 performs a predicted image generation process corresponding to the prediction mode information supplied from the lossless decoder 62.

That is, when the intra prediction mode information is supplied from the lossless decoder 62, the intra predictor 71 generates an intra-predicted image in the intra prediction mode. When the inter prediction mode information is supplied from the lossless decoder 62, the motion estimator/compensator 72 performs a motion estimation/compensation process in the inter prediction mode to generate an inter-predicted image.

By this processing, the predicted image (intra-predicted image) generated by the intra predictor 71 or the predicted image (inter-predicted image) generated by the motion estimator/compensator 72 is supplied to the selector 73.

In step S54, the selector 73 selects a predicted image. That is, the predicted image generated by the intra predictor 71 or the predicted image generated by motion estimator/compensator 72 is supplied. Accordingly, the supplied predicted image is selected and supplied to the arithmetic operation unit 65, and is added to the output of the inverse orthogonal transformer 64 in step S57 to be described later.

In step S52 described above, the transform coefficient decoded by the lossless decoder 62 is also supplied to the inverse quantizer 63. In step S55, the inverse quantizer 63 performs inverse quantization of the transform coefficient decoded by the lossless decoder 62 with characteristics corresponding to the characteristics of the quantizer 25 shown in FIG. 1.

In step S56, the inverse orthogonal transformer 29 performs an inverse orthogonal transform of the transform coefficient, which has been inversely quantized by the inverse quantizer 28, with characteristics corresponding to the characteristics of the orthogonal transformer 24 shown in FIG. 1. As a result, difference information corresponding to the input of the orthogonal transformer 24 (output of the arithmetic operation unit 23) shown in FIG. 1 is decoded.

In step S57, the arithmetic operation unit 65 adds the predicted image, which is selected in the processing in step S54 described above and is input through the selector 73, to the difference information. As a result, the original image is decoded.

In step S58, the deblocking filter 31b performs deblocking filtering on the image output from the arithmetic operation unit 65. The deblocking filtering process will be described in detail with reference to FIG. 23. In this case, parameters β and Tc extended from β and Tc defined in the HEVC method are used as threshold values of determination regarding the deblocking filter. The image after filtering from the deblocking filter 31b is output to the adaptive offset filter 81. In addition, in the deblocking filtering process, ON/OFF information that is a parameter of the deblocking filter supplied from the lossless decoder 62 and each offset of the parameters β and Tc are also used.

In step S59, the adaptive offset filter 81 performs adaptive offset filtering. By this processing, filtering is performed on the image after the filtering of the deblocking filter 31b using an offset value for each quad-tree structure, in which the type of the offset filter is determined for each divided region, and each divided region. The image after filtering is supplied to the adaptive loop filter 82.

In step S60, the adaptive loop filter 82 performs adaptive loop filtering on the image after the filtering of the adaptive offset filter 81. The adaptive loop filter 82 performs filtering on the input image in a processing unit using a filter coefficient calculated for each processing unit, and supplies the filtering result to the frame reordering buffer 67 and a frame memory 69.

In step S61, the frame memory 69 stores the filtered image.

In step S62, the frame reordering buffer 67 performs reordering of the image after the adaptive loop filter 82. That is, the frames reordered for encoding by the frame reordering buffer 22 of the image encoding device 11 are reordered in order of the original display.

In step S63, the D/A converter 68 performs D/A conversion of the image from the frame reordering buffer 67. This image is output to a display (not shown), so that the image is displayed.

The decoding process ends when the processing in step S63 ends.

2. Explanation of a Conventional Method

[Parameters of a Deblocking Filter in the AVC Method]

Next, parameters of the deblocking filter in the AVC method be described. In the AVC method, as parameters for determining whether or not a deblocking filter is required, there are $\alpha$ and $\beta$. These values are determined according to the quantization parameter QP.

Figure 5:
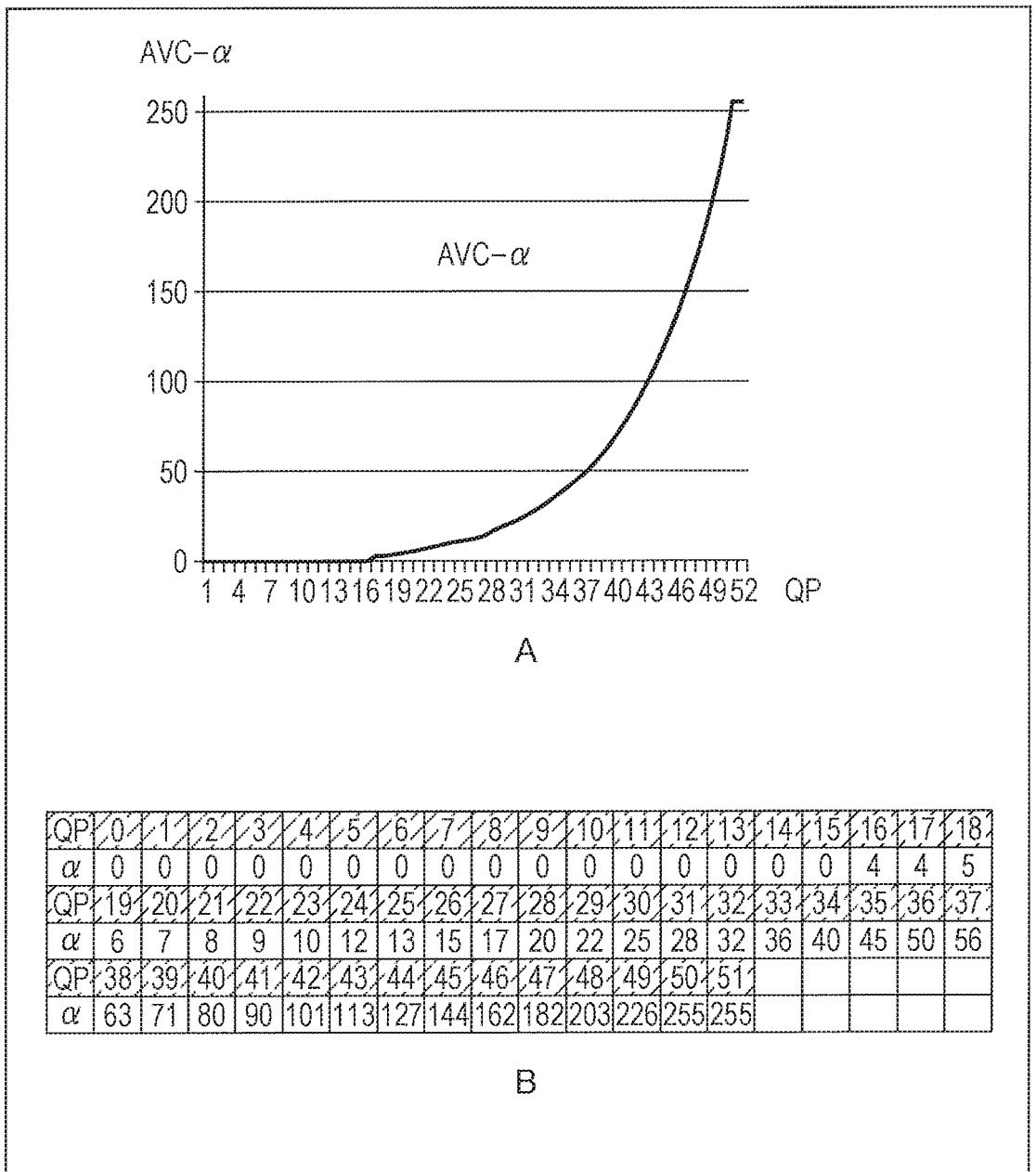
FIG. 5 is a diagram showing the value and graph of a parameter $\alpha$ of a deblocking filter in the AVC method.

A of FIG. 5 is a graph showing the relationship bet Teen the parameter $\alpha$ and the quantization parameter QP, and B of FIG. 5 is a table showing the relationship between the parameter $\alpha$ and the quantization parameter QP. The parameter $\alpha$ is optimized by fine adjustment based on the following Expression (1).

[Mathematical Formula 1]

$$\alpha(qp) = 0.8 * \left(2^{\frac{qp}{6}} - 1\right) \quad (1)$$

The parameter $\alpha$ can take the values of 0 to 255 for the quantization parameter QP of 0 to 51.

Figure 6:
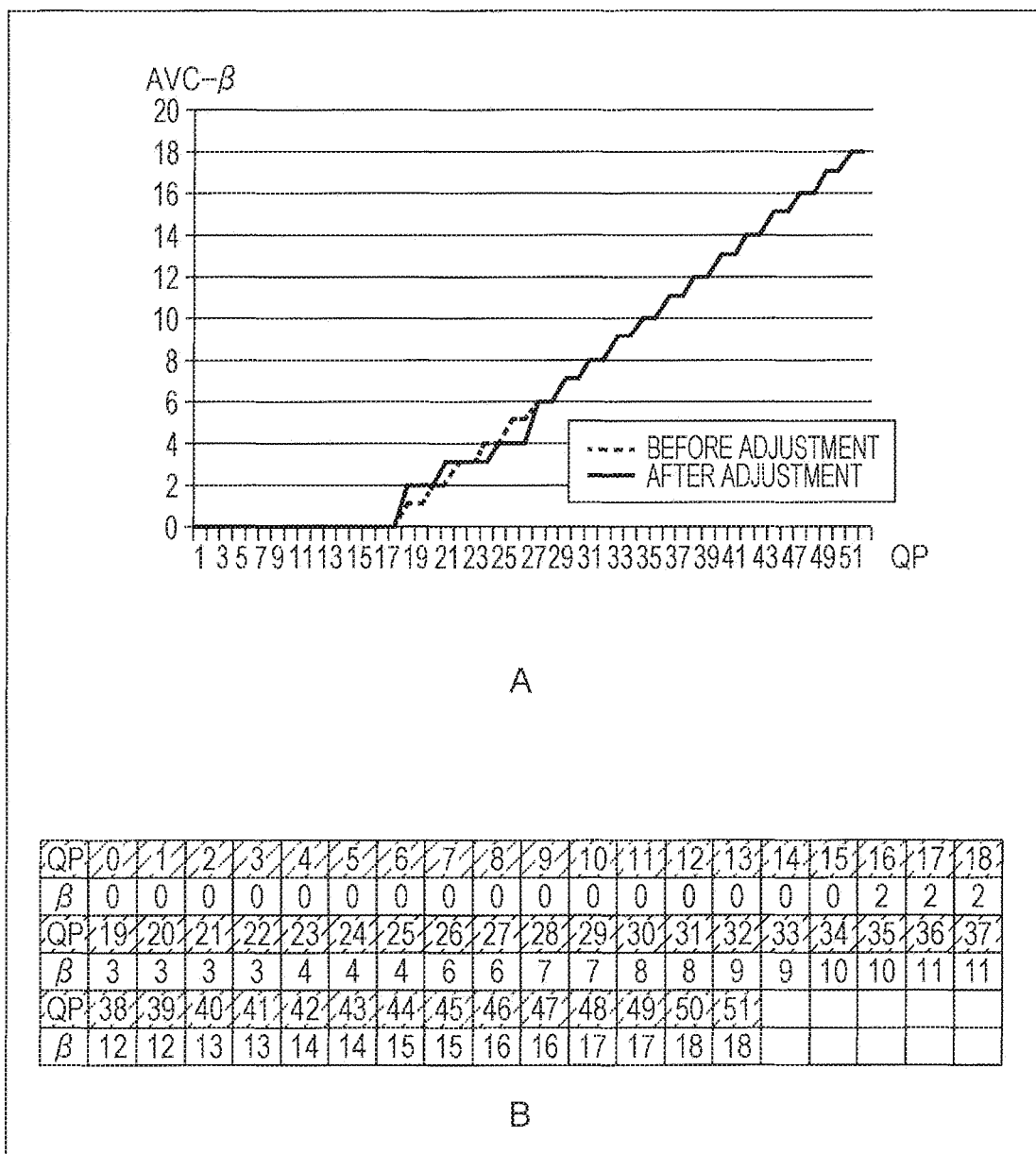
FIG. 6 is a diagram showing the value and graph of a parameter $\beta$ of a deblocking filter in the AVC method.

A of FIG. 6 is a graph showing the relationship between the parameter $\beta$ and the quantization parameter QP, and B of FIG. 6 is a table showing the relationship between the parameter $\beta$ and the quantization parameter QP. The parameter $\beta$ is optimized by fine adjustment based on the following Expression (2). A dotted line in A of FIG. 6 shows Expression (2), and a solid line shows a value shown in B of FIG. 6 after fine adjustment of Expression (2).

[Mathematical Formula 2]

$$\beta(qp) = \text{round}(0.5*qp-7) \quad (2)$$

The parameter $\beta$ can take the values of 0 to 18 for the quantization parameter QP of 0 to 51.

[Parameters of a Deblocking Filter in the HEVC Method]

As parameters corresponding to $\alpha$ and $\beta$ in the AVC method, parameters and Tc are used in the HEVC method.

The parameters $\beta$ and Tc are filter parameters used in determination regarding the deblocking filter. Specifically, the parameter $\beta$ is a threshold value used in determination regarding whether or not a deblocking filter is required and determination of strength selection, and is a parameter for adjusting the strength of the deblocking filter. The parameter Tc is a threshold value used in determination of strength selection, and is a parameter for adjusting the strength of the deblocking filter. In addition, the parameter Tc is a value that is also used in clipping during filtering. The parameters $\beta$ and Tc are values set according to the quantization parameter QP, as shown in FIG. 7. FIG. 7 is a diagram showing the values of the parameters $\beta$ and Tc corresponding to the quantization parameter QP.

The parameter $\beta$ has 52 values of 0 to 51, and is fixed to 64 for an input larger than 51. The parameter Tc has 54 values of 0 to 53, and is fixed to 13 for an input larger than 53.

Here, the range of the quantization parameter QP that can be used in the HEVC method is 0 to 51, but the range of the offset of the parameter of the deblocking filter is -26 to 26. Therefore, theoretically, the input range of the LUT (Look Up Table) of the parameter of the deblocking filter is 0 to 77.

However, since the quantization parameter QP that is an actual input of the parameter of the deblocking filter to the LUT is 0 to 51, the offset value is not used to the maximum.

In addition, as described above, even if 64 that is the maximum value of the parameter $\beta$ and 13 that is the maximum value of the parameter Tc in the HEVC method are used, there have been cases where block noise that is visible remains in some sequences.

Therefore, in the present technique, in order to increase the strength of the deblocking filter, the parameters $\beta$ and Tc are extended, and the extended parameters $\beta$ and Tc are used in the deblocking filter. That is, in the deblocking parameters obtained by extending the range of filter parameters (parameters $\beta$ and Tc) for controlling the filter so as to increase the filter strength are used.

In addition, the extension herein refers to extending the parameter range for an existing parameter range with the parameter range in the AVC method and the parameter range in ver20 of the HEVC method, which is described in Non-patent Document 1, as the existing parameter range. In addition, in the present technique, the parameter range is extended so as to increase the filter strength against the noise, since there is a case where the noise is left with the existing parameters.

3. First Embodiment (First Extension Method)

[Extension of the Parameter $\beta$]

FIG. 8 is a diagram showing the relationship between the quantization parameter QP and the parameter $\beta$ in the present technique. In addition, in the table shown in FIG. 8, a thick frame portion is an extended portion by the present technique.

As shown in the thick frame of FIG. 8, the parameter $\beta$ ($\beta(52)$ to $\beta(qp_{max})$) corresponding to the quantization parameter QP (52 to $qp_{max}$) is extended (added). In addition, the following explanation will be given with $qp_{max}$ as 77, for example. However, the value can be set, and is not limited to 77.

The value of the parameter $\beta$ to be extended can be set as a function of the quantization parameter, and there are two methods of setting the parameter $\beta$. The first $\beta$ setting method is a method of setting the value of the parameter $\beta$ as a linear function (linear shape) of the quantization parameter QP. The second $\beta$ setting method is a method of setting the value of the parameter $\beta$ as an exponential function (curve) of the quantization parameter QP.

In the case of the exponential function, it is possible to increase a change rather than the linear function.

[First $\beta$ Setting Method: Example of the Linear Function]

In the HEVC method, the parameter $\beta$ is expressed as a linear function of the quantization parameter QP, as shown in $0 \leq qp \leq 51$ in the following Expression (3).

Theerefore, as the first β setting method, also for the extended portion, the parameter β is set as a linear function of the quantization parameter QP, as shown in $52 \leq qp \leq pq_{max}$ in Expression (3).

[Mathematical Formula 3]

$$\beta(qp) = \begin{cases} 0, & qp \in [0, 15] \\ qp - 10, & qp \in [16, 28] \\ 2*qp - 38, & qp \in [29, 51] \\ k*qp + b, & qp \in [52, qp_{max}], \end{cases} \quad (3)$$
$$qp_{max} \geq 52,$$
$$\beta(52) \geq 64$$
$$\beta(qp_{max}) \leq 255$$

Here, k and b can be adjusted. The inclination k is larger than 0, and b can be calculated by making the boundary between the existing portion and the extended portion continuous.

In addition, also for the extended portion, when extension is performed as the straight line in the HEVC method, as shown in the following Expression (4), the inclination k=2 and b=−38.

[Mathematical Formula 4]

$$\beta(qp) = \begin{cases} 0, & 0 \leq qp \leq 15 \\ qp - 10, & 16 \leq qp \leq 28 \\ qp*2 - 38, & 29 \leq qp \leq 51 \\ qp*2 - 38, & 52 \leq qp \leq qp_{max} \end{cases} \quad (4)$$

Figure 9:
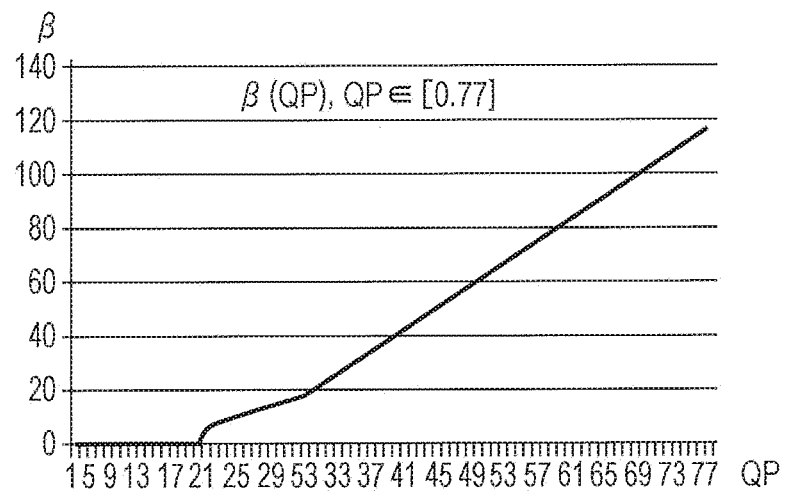
FIG. 9 is a diagram showing the values and graph of the quantization parameter QP and the parameter $\beta$ in the case of extension as a linear function of k=2.

A of FIG. 9 is a graph showing the relationship between the parameter β and the quantization parameter QP when extension is performed as a linear function of k=2. B of FIG. 9 is a table showing the values of the parameter β and the quantization parameter QP when extension is performed as a linear function of k=2. In addition, in the table shown in B of FIG. 9, a thick frame portion is an extended portion by the present technique. In this case, the parameter β can take the values of 0 to 116 for the quantization parameter QP of 0 to 77.

In addition, the inclination of the linear function can be changed. For example, for the extended portion, a linear function when extension is performed by making the inclination larger than that of the straight line in the HEVC method, that is, in the case of the inclination k=4 and b=−140 is expressed by the following Expression (5).

[Mathematical Formula 5]

$$\beta(qp) = \begin{cases} 0, & 0 \leq qp \leq 15 \\ qp - 10, & 16 \leq qp \leq 28 \\ qp*2 - 38, & 29 \leq qp \leq 51 \\ qp*4 - 140, & 52 \leq qp \leq qp_{max} \end{cases} \quad (5)$$

Here, the reason for the inclination k=4 is that qp*2=qp<<1 (shifted by 1 bit to the left) in the case of the inclination k=2. On the other hand, in the case of the inclination k=4, qp*2=qp<<2 (shifted by 2 bits to the left). Therefore, taking the calculation by software into consideration, this is suitable at the time of mounting. In addition, in the case of the inclination k=4, b=−140 is set in order to make the boundary between the existing portion and the extended portion into a continuous function.

Figure 10:
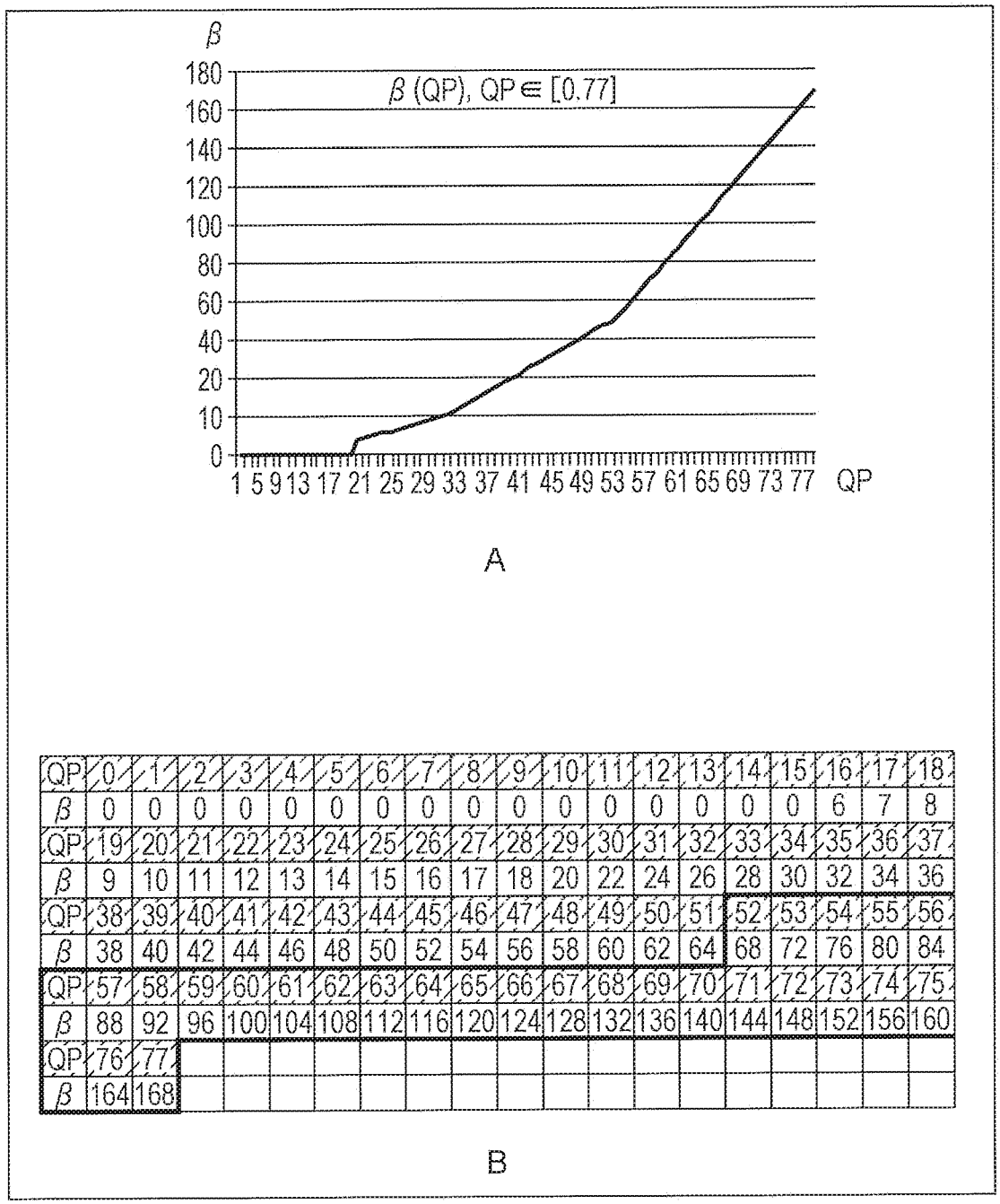
FIG. 10 is a diagram showing the values and graph of the quantization parameter QP and the parameter $\beta$ in the case of extension as a linear function of k=4.

A of FIG. 10 is a graph showing the relationship between the parameter β and and the quantization parameter QP when extension is performed by making the inclination larger than that of the straight line in the HEVC method, that is, extension is performed as a linear function of the inclination k=4. B of FIG. 10 is a table shoving the values of the parameter 13 and the quantization parameter QP when extension is performed as a linear function of k=4. In addition, in the table shown in B of FIG. 10, a thick frame portion is an extended portion by the present technique. In this case, the parameter β can take the values of 0 to 168 for the quantization parameter QP of 0 to 77.

In addition, for the extended portion, a linear function when extension is performed by making the inclination larger than that of the straight line in the HEVC method, that is, in the case of the inclination k=8 and b=−344 is expressed by the following Expression (6).

[Mathematical Formula 6]

$$\beta(qp) = \begin{cases} 0, & 0 \leq qp \leq 15 \\ qp - 10, & 16 \leq qp \leq 28 \\ qp*2 - 38, & 29 \leq qp \leq 51 \\ qp*8 - 344, & 52 \leq qp \leq qp_{max} \end{cases} \quad (6)$$

Here, the reason for the inclination k=8 is that qp*8=qp<<3 (shifted by 3 bits to the left) in the case of the inclination k=8. Therefore, taking the calculation by software into consideration, this is suitable at the time of mounting. In addition, in the case of the inclination k=8, b=−344 is set in order to make the boundary between the existing portion and the extended portion into a continuous function.

In addition, in the above explanation, the examples of the inclination k=2, 4, and 8 have been described as more suitable examples. However, as long as k>0, the present invention is not limited to the inclination k=2, 4, and 8.

Figure 11:
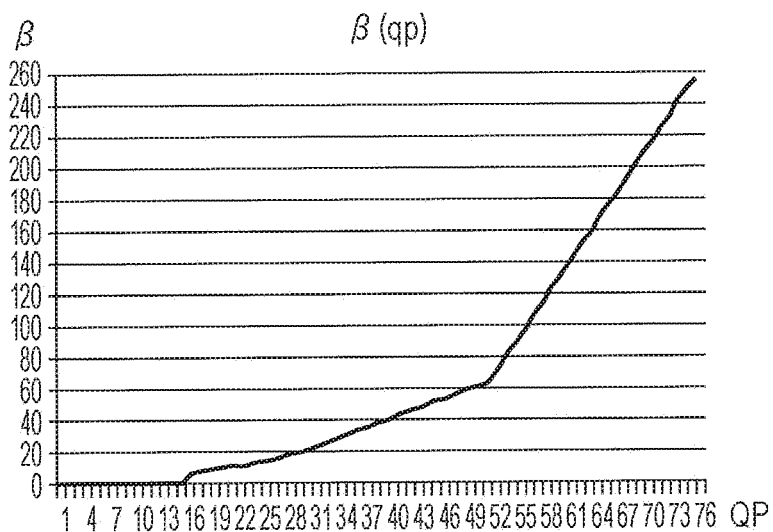
FIG. 11 is a diagram showing the values and graph of the quantization parameter QP and the parameter $\beta$ in the case of extension as a linear function of k=8.

A of FIG. 11 is a graph showing the relationship between the parameter β and the quantization parameter QP when extension is performed by making the inclination larger than that of the straight line in the HEVC method, that is, extension is performed as a linear function of the inclination k=8. B of FIG. 11 is a table showing the values of the parameter β and the quantization parameter QP when extension is performed as a linear function of k=4. In addition, in the table shown in B of FIG. 11, a thick frame portion is an extended portion by the present technique. In this case, the parameter β can take the values of 0 to 255 for the quantization parameter QP of 0 to 75. In addition, for example, when the quantization parameter QP is 76, 77, or the like and β is larger than 255, β=255 is set.

[Second β Setting Method: Example of the Exponential Function]

Next, as a second β setting method, for an extended portion, the parameter β is set as an exponential function of the quantization parameter QP, as shown in $52 \leq qp \leq pq_{max}$ in the following Expression (7).

[Mathematical Formula 7]

$$\beta(qp) = \begin{cases} 0, & qp \in [0, 15] \\ qp - 10, & qp \in [16, 28] \\ 2*qp - 38, & qp \in [29, 51] \\ \text{round}\left[k*\left(2^{\frac{qp+a}{x}} - 1\right) + b\right], & qp \in [52, qp_{max}], \end{cases} \quad (7)$$

$$qp_{max} \geq 52,$$
$$\beta(52) \geq 64,$$
$$\beta(qp_{max}) \leq 255$$

Here, the exponential function of Expression (7) based on the value of the parameter α in the deblocking filter of the AVC method of Expression (1) described above.

For example, in the case of k=0.8, x=6, a=−13, and b=0 shown in the following Expression (8), a coefficient (k, x, a, b) is calculated by using a value, which is not in the HEVC, among the parameters α in the deblocking filter of the AVC method. Specifically, when QP is 38, the parameter α in the ANT is 63. This is close to 64 that is the value of the parameter β in the HEAT when the QP is 51. Therefore, for the parameter β of QP of 52 or higher, in order to apply the parameter α in the ANT of QP of 39 or higher, the coefficient (k, x, a, b) is calculated so that the boundary between the existing portion and the extended portion is continuous.

[Mathematical Formula 8]

$$\beta(qp) = \begin{cases} 0, & 0 \leq qp \leq 15 \\ qp - 10, & 16 \leq qp \leq 28 \\ qp*2 - 38, & 29 \leq qp \leq 51 \\ 0.8*\left(2^{\frac{qp-13}{6}} - 1\right), & 52 \leq qp \leq qp_{max} \quad \beta(qp) \leq 255 \end{cases} \quad (8)$$

Figure 12:
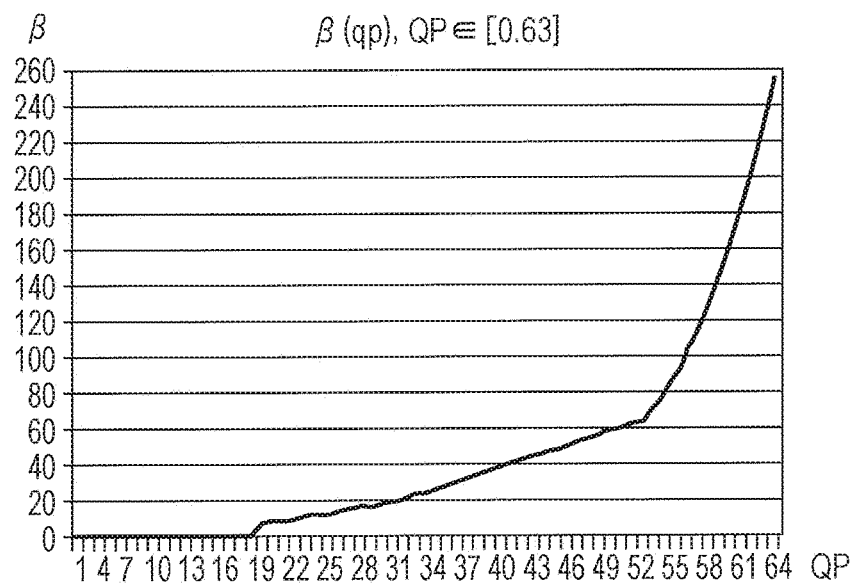
FIG. 12 is a diagram showing the values and graph of the quantization parameter QP and the parameter $\beta$ in the case of extension as an exponential function.

A of FIG. 12 is a graph showing the relationship between the parameter β and the quantization parameter QP when extension is performed as an exponential function of k=0.8, x=6, a=−13, and b=0. B of FIG. 12 is a table showing the values of the parameter β and the quantization parameter QP when extension is performed as an exponential function of k=0.8, x=6, a=−13, and b=0. In addition, in the table shown in B of FIG. 12, a thick frame portion is an extended portion by the present technique. In this case, the parameter β can take the values of 0 to 255 for the quantization parameter QP of 0 to 63. In addition, for example, when the quantization parameter QP is 64 to 77 or the like and β is larger than 255, β=255 is set.

Since the parameter β is extended as described above, it is possible to increase the strength of the deblocking filter.

[Tc Setting Method]

The parameter Tc in the HEVC method may be applied as it is. However, as in the approximate expression shown in the following Expression (9), the parameter Tc can also be extended as a function in the HEVC method.

[Mathematical Formula 9]

$$Tc(qp) = \max(\text{round}(0.5*qp - 13.5), 1),$$

$$qp \in [53, Tcqp_{max}] \quad (9)$$

In addition, in practice, similar to β in the AVC method, the parameter Tc is optimized by fine adjustment based on Expression (9) described above.

Figure 13:
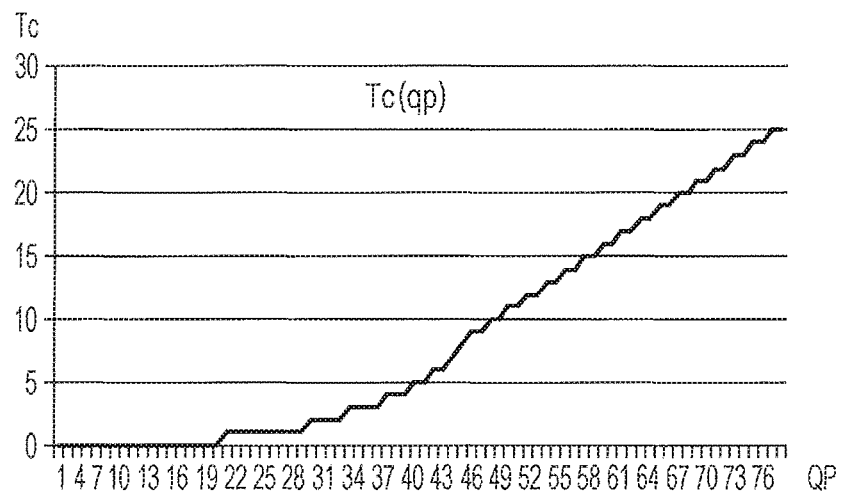
FIG. 13 is a diagram showing the values and graph of the quantization parameter QP and the parameter Tc in the first extension method of the present technique.

A of FIG. 13 is a graph showing the relationship between the parameter Tc and the quantization parameter QP when extension is performed using a function in the HEVC method. B of FIG. 13 is a table showing the values of the parameter Tc and the quantization parameter QP when extension is performed using a function in the HEVC method. In addition, in the table shown in B of FIG. 13, a thick frame portion is an extended portion by the present technique. In this case, the parameter Tc can take the values of 1 to 25 for the quantization parameter QP of 0 to 77.

Since the parameter Tc is extended as described above, it is possible to further increase the strength of the deblocking filter.

[Example of the Configuration of the Deblocking Filter]

Next, the details of the deblocking filter 31a in the image encoding device shown in FIG. 1 and the deblocking filter 31b in the image decoding device shown in FIG. 3 will be described. In addition, since the deblocking filter 31a in the image encoding device shown in FIG. 1 and the deblocking filter 31b in the image decoding device shown in FIG. 3 have basically the same configuration and operation, the following explanation will be collectively given as a deblocking filter 31.

Here, only the following point is a difference between the deblocking filters 31a and 31b. That is, in the case of the deblocking filter 31a, ON/OFF information regarding whether or to perform a deblocking filter and each offset of the parameters β and Tc are input through an operation unit (not shown). On the other hand, in the case of the deblocking filter 31b, ON/OFF information regarding whether or not to perform a deblocking filter and each offset of the parameters β and Tc, which have been encoded by the image encoding device 11, are received, and are input after being decoded by the lossless decoder 62.

Figure 14:
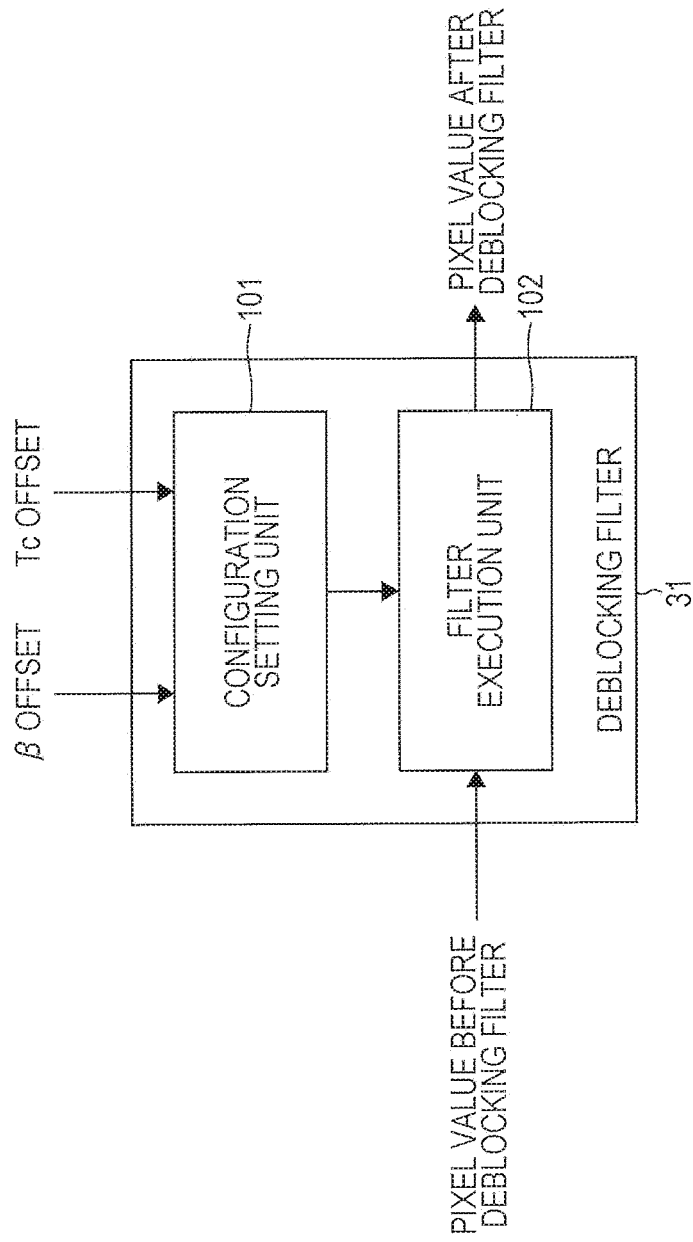
FIG. 14 is a block diagram showing an example of the configuration of a deblocking filter to which the present technique is applied.

FIG. 14 is a block diagram showing an example of the configuration of the deblocking filter.

In the example shown in FIG. 14, the deblocking filter 31 is configured to include a configuration setting unit 101 and a filter execution unit 102.

The configuration setting unit 101 receives, for example, the ON/OFF information, the value of the β offset, and the value of the Tc offset that are input from an operation unit (or the lossless decoder 62) that is not shown in the diagram, and performs configuration setting in the deblocking filter 31. As the configuration setting, offset of the deblocking filter, ON/OFF of the deblocking filter, derivation of the boundary between the TU and the PU, derivation of the BS (Boundary Filtering Strength) Value, and the like are performed. The configuration setting unit 101 supplies the set information to the filter execution unit 102.

A pixel value before the deblocking filter from arithmetic operation unit 30 (or the arithmetic operation unit 65) is supplied to the filter execution 102. The filter execution unit 102 calculates the quantization parameter QP, which is used to generate parameters, based on the information set by the configuration setting unit 101, generates the parameters β and Tc, and determines whether or not filtering is required or the filter strength. Then, the filter execution unit 102 performs filtering based on the determined filter strength or the determination result regarding whether or not filtering is required. The filter execution unit 102 supplies a pixel value after the deblocking filter to the downstream adaptive offset filter 41 (or the adaptive offset filter 81).

In addition, the filter execution unit 102 performs the above-described processing on each of the luminance boundary and the color difference boundary.

[Example of the Configuration of the Filter Execution Unit at the Luminance Boundary]

Figure 15:
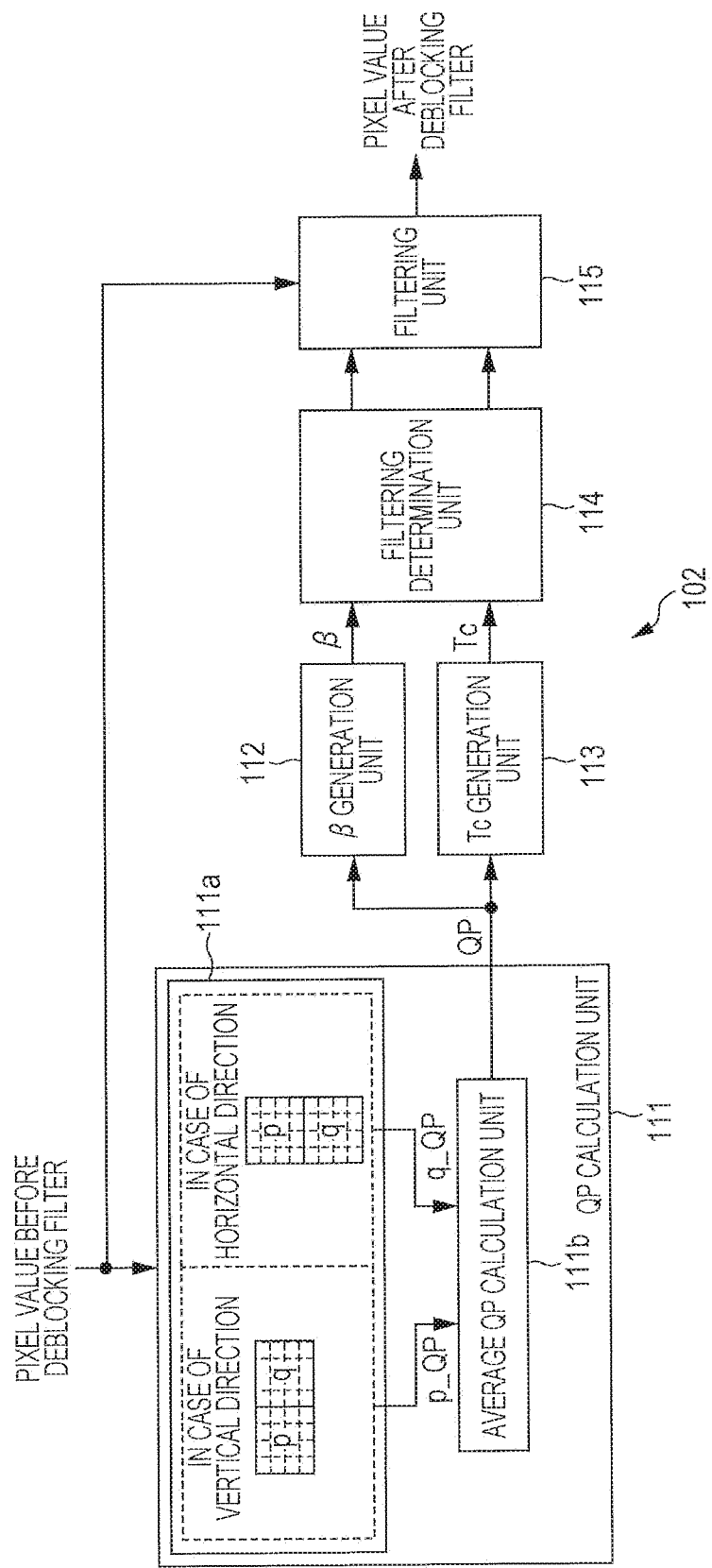
FIG. 15 is a block diagram showing an example of the configuration of a filter execution unit that performs filtering of the luminance boundary.

FIG. 15 is a block diagram showing an example of the configuration of the filter execution unit that performs filtering of the luminance boundary.

In the example shown in FIG. 15, the filter execution unit 102 is configured to include a QP calculation unit 111, a β generation unit 112, a Tc generation unit 113, a filtering determination unit 114, and a filtering unit 115.

The pixel value before the deblocking filter from the upstream stage is input to a QP acquisition unit 111a and the filtering unit 115.

The QP calculation unit 111 is configured to include the QP acquisition unit 111a and an average QP calculation unit 111b, and receives the pixel value before the deblocking filter from the upstream stage and calculates the quantization parameter QP that is used to generate the parameters β and Tc. The QP calculation unit 111 supplies the calculated quantization parameter QP to the β generation unit 112 and the Tc generation unit 113.

The QP acquisition unit 111a acquires quantization parameters p_QP and q_QP of two regions (adjacent to the boundary), which share the boundary to be processed, from the input pixel value before the deblocking filter. For example, when the boundary is in a vertical direction, the quantization parameter p_QP of a region p adjacent to the left side of the boundary is acquired, and the quantization parameter q_QP of a region q adjacent to the right side of the boundary is acquired. In addition, for example, when the boundary is in a horizontal direction, the quantization parameter p_QP of a region p adjacent to the upper side of the boundary is acquired, and the quantization parameter q_QP of a region q adjacent to the lower side of the boundary is acquired.

In addition, for example, in the image encoding device 11, the quantization parameter QP from the quantizer 25 is stored in a memory (not shown) together with the motion vector information or the prediction mode information. In addition, in the image decoding device 51, the quantization parameter QP decoded by the lossless decoder 62 is stored in a memory (not shown) together with the motion vector information or the prediction mode information. The QP acquisition unit 111a acquires the quantization parameter QP from the memory storing it in that manner.

The QP acquisition unit 111a supplies the acquired quantization parameters p_QP and q_QP to the average QP calculation unit 111b.

The average QP calculation unit 111b calculates an average of the quantization parameters p_QP and q_QP from the QP acquisition unit 111a, and supplies the average to the β generation unit 112 and the Tc generation unit 113 as the quantization parameter QP that is used to generate the parameters β and Tc.

The β generation unit 112 generates the parameter β according to the quantization parameter QP from h average QP calculation unit 111b, and supplies the generated parameter β to the filtering determination unit 114.

The Tc generation unit 113 generates the parameter Tc according to the quantization parameter QP from the average QP calculation unit 111b, and supplies the generated parameter Tc to the filtering determination unit 114.

The filtering determination unit 114 determines filtering using the parameter β from the β generation unit 112, the parameter Tc from the Tc generation unit 113, and the like. That is, the filtering determination unit 114 determines whether or not filtering is required using the parameter β from the β generation unit 112 and the like. In addition, the filtering determination unit 114 determines the filter strength using the parameter β from the β generation 112, the parameter Tb from the Tc generation unit 113, and the like. The filtering determination unit 114 supplies the determined filtering information to the filtering unit 115. In this case, the parameters β and Tc are also supplied to the filtering unit 115. For example, the parameter Tc is used for clipping in the filtering unit 115.

When the filtering determination unit 114 determines that filtering is to be performed, the filtering unit 115 performs filtering on the input pixel value before the deblocking filter with the filter strength determined by the filtering determination unit 114. The filtering unit 115 outputs the pixel value after the deblocking filter to the downstream stage.

In addition, when the filtering determination unit 114 determines that filtering is not to be performed, the filtering unit 115 outputs the input pixel value before the deblocking filter, as a pixel value after the deblocking filter, to the downstream stage at is (without performing filtering).

[Example of the Configuration of the β Generation Unit]

Figure 16:
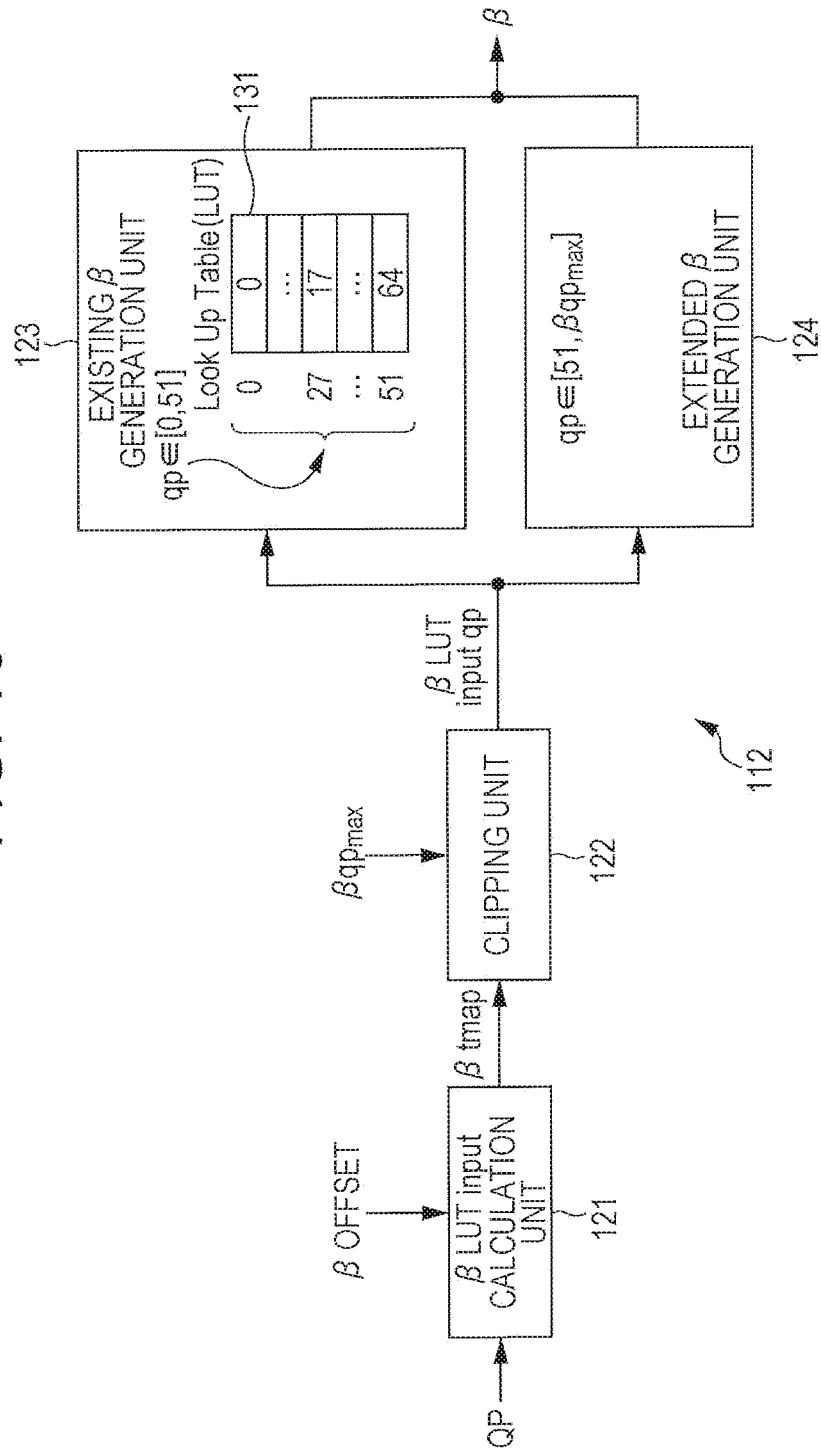
FIG. 16 is a block diagram showing an example of the configuration of a $\beta$ generation unit.

FIG. 16 is a block diagram showing an example of the configuration of the β generation unit.

In the example shown in FIG. 16, the β generation unit 112 is configured to include a β LUT_input calculation unit 121, a clipping unit 122, an existing β generation unit 123, and an extended β generation unit 124.

The quantization parameter QP from the average QP calculation unit 111b is supplied to the β LUT_input calculation unit 121. The value of the β offset of the information set by the configuration setting unit 101 is supplied to the β LUT_input calculation unit 121. In addition, $\beta qp_{max}$ that is the maximum value of the quantization parameter used to generate β, of the information set by the configuration setting unit 101, is supplied to the clipping unit 122.

The β LUT_input calculation unit 121 and the clipping unit 122 calculate β LUT_input that is a value input to the existing β generation unit 123 and the extended β generation unit 124.

That is, the β LUT_input calculation unit 121 calculates Pimp by adding the value of the β offset and the quantization parameter QP from the average QP calculation unit 111b, and supplies the calculated βtmp to the clipping unit 122.

The clipping unit 122 clips βtmp from the β LUT_input calculation unit 121 in the range [0, $\beta qp_{max}$] of the value set by the configuration setting unit 101. The clipping unit 122 supplies Pimp after clipping to the existing β generation unit 123 and the extended β generation unit 124 as β LUT_input qp.

The existing β generation unit 123 has an LUT (Look Up Table) 131 defined in the HEVC method. When the value of β LUT_input qp from the clipping unit 122 is equal to or less than 51, the existing β generation unit 123 calculates β using the LUT 131 and supplies the calculated β to the filtering determination unit 114.

When the value of β LUT_input qp from the clipping unit 122 is larger than 51, the extended β generation unit 124 calculates extended β and supplies the calculated β to the filtering determination unit 114.

Figure 17:
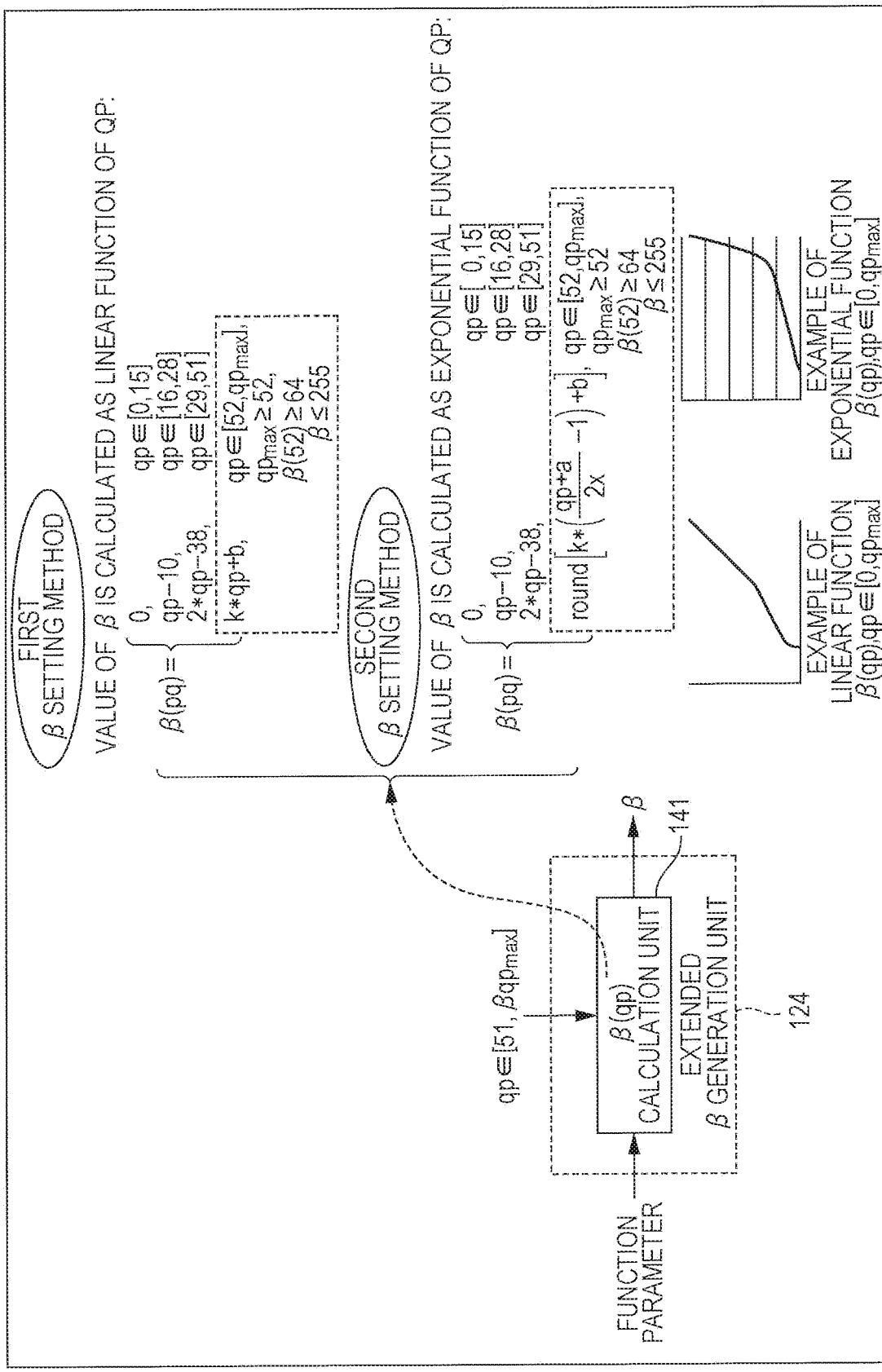
FIG. 17 is a block diagram showing an example of the configuration of an extended $\beta$ generation unit.

For example, as shown in FIG. 17, the extended β generation unit 124 is configured to include a β (qp) calculation unit 141. The β (qp) calculation unit 141 generates β dynamically using a function expression (a linear function or an exponential function) shown by the dotted line, in which function parameters are set in advance, when qp of [51, $\beta qp_{max}$] is input.

As a first β setting method, the extended β generation unit 124 generates β0 dynamically using the linear function in the case of 52≤qp≤pq$_{max}$ in Expression (3) described above. That is, in this case, the value of β is calculated as a linear function of QP. In addition, k and b are set as function parameters. In this case, k and b may be transmitted to the decoding side by the syntax.

As a second β setting method, the extended β generation unit 124 generates β dynamically using the exponential function in the case of 52≤qp≤pq$_{max}$ in Expression (7) described above. That is, in this case, the value of β is calculated as an exponential function of QP. In addition, k, h, x, and a are set as function parameters. In this case, k, h, x, and a may be transmitted to the decoding side by the syntax.

Figure 18:
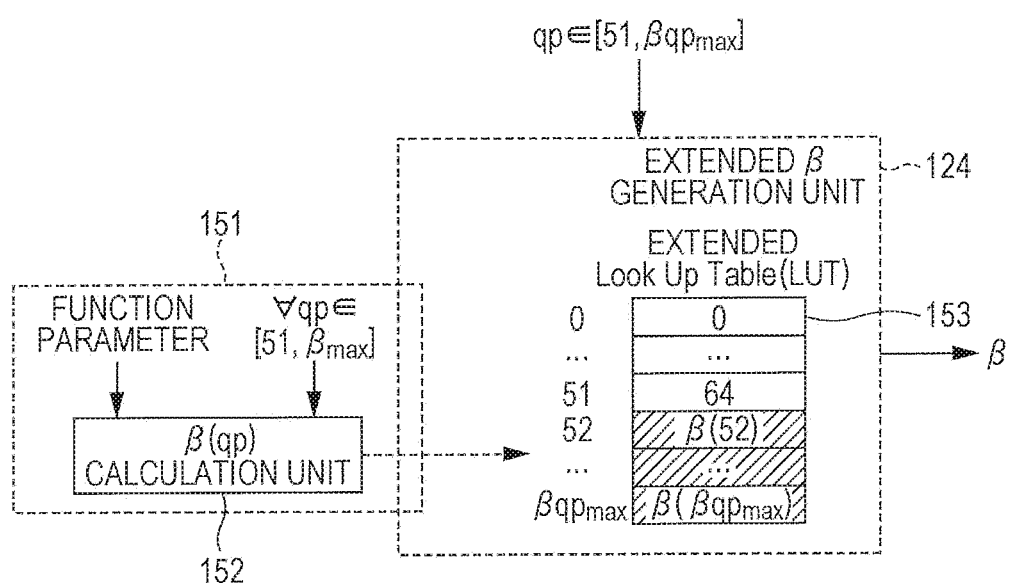
FIG. 18 is a block diagram showing another example of the configuration of the extended $\beta$ generation unit.

In addition, for example, as shown in FIG. 18, the extended β generation unit 124 is configured to have an extended LUT (Look Up Table) 153. In addition, in the example shown in FIG. 18, the extended LUT 153 is shown so as to include an existing LUT 131 portion. However, only a shaded portion is an extended portion. The extended LUT 153 is stored after a β (qp) calculation unit 152 provided in another computer 151 or the like receives arbitrary qp of [0, βqp$_{max}$] and calculates β in advance using a function expression (a linear function or an exponential function) in which function parameters are set.

The extended β generation unit 124 calculates β using the extended LUT 153 when qp of [51, βqp$_{max}$] is input.

As described above, when configuring the extended β generation unit 124, it is possible to select whether to give the extended β by the definition expression (function expression) or by LUT.

[Example of the Configuration of the Tc Generation Unit]

Figure 19:
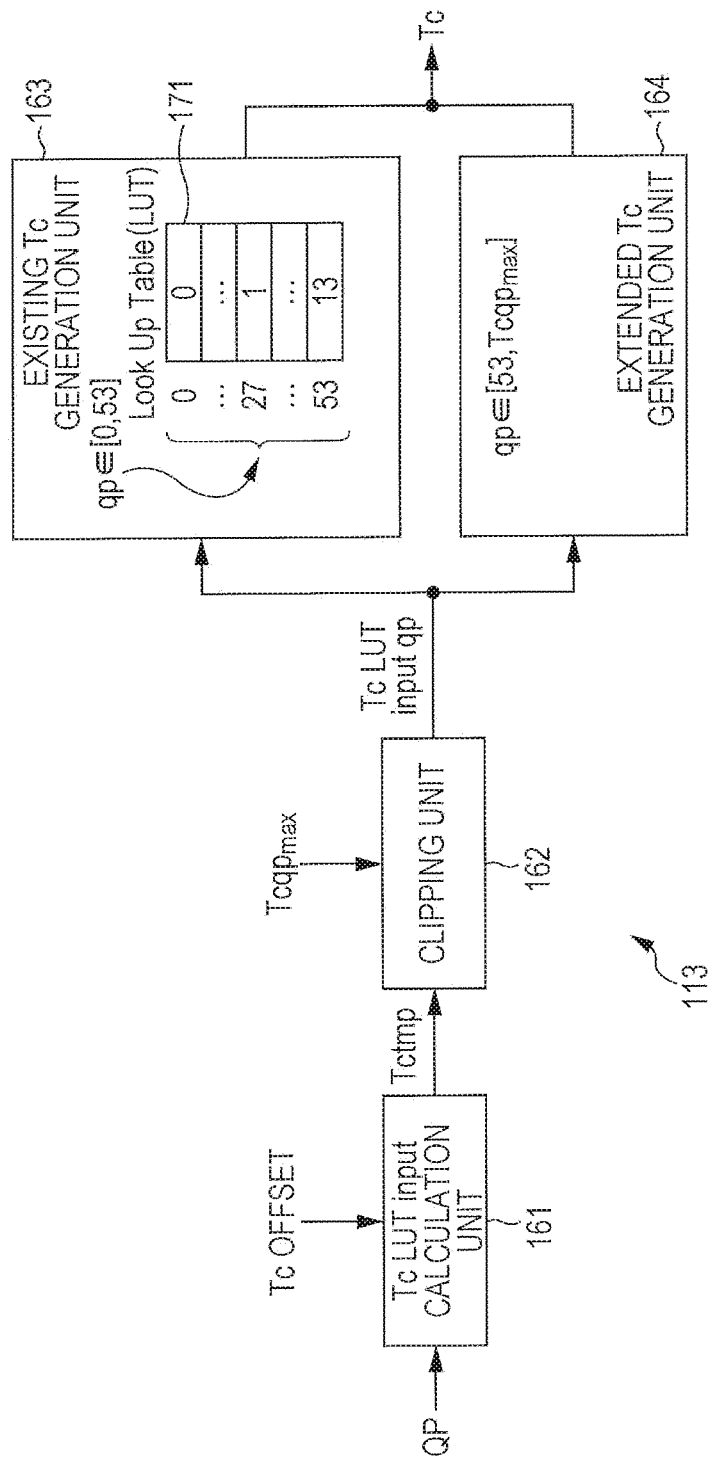
FIG. 19 is a block diagram showing an example of the configuration of a Tc generation unit.

FIG. 19 is a block diagram showing an example of the configuration of the Tc generation unit.

In the example shown in FIG. 19, the Tc generation unit 113 is configured to include a Tc_LUT_input calculation unit 161, a clipping unit 162, an existing Tc generation unit 163, and an extended Tc generation unit 164.

The quantization parameter QP from the average QP calculation unit 111b is supplied to the Tc_LUT_input calculation unit 161. The value of Tc offset of the information set by the configuration setting unit 101 is supplied to the Tc_LUT_input calculation unit 161. In addition, Tc_qp$_{max}$ that is a maximum value of the quantization parameter used to generate Tc of the information set by the configuration setting unit 101, is supplied to the clipping unit 162.

The Tc_LUT_input calculation unit 161 and the clipping unit 162 calculate Tc_LUT_input that is a value input to the existing Tc generation unit 163 and the extended Tc generation unit 164.

That is, the Tc_LUT_input calculation unit 161 calculates Tctmp by adding the value of the Tc offset and the quantization parameter QP from the average QP calculation unit 111b, and supplies the calculated Tctmp to the clipping unit 162.

The clipping unit 162 clips Tctmp from the Tc_LUT_input calculation unit 161 in the range [0, Tc_qp$_{max}$] of the value set by the configuration setting unit 101. The clipping unit 162 supplies Tctmp after clipping to the existing Tc generation unit 163 and the extended Tc generation unit 164 as Tc_LUT_input qp.

The existing Tc generation unit 163 has an LUT (Look Up Table) 171 defined in the HEVC method. When the value of Tc_LUT_input qp from the clipping unit 162 is equal to or less than 53, the existing Tc generation unit 163 calculates Tc using the LUT 171 and supplies the calculated Tc to the filtering determination unit 114.

When the value of Tc_LUT_input qp from the clipping unit 122 is larger than 53, the extended Tc generation unit 164 calculates extended Tc and supplies calculated Tc to the filtering determination unit 114.

Figure 20:
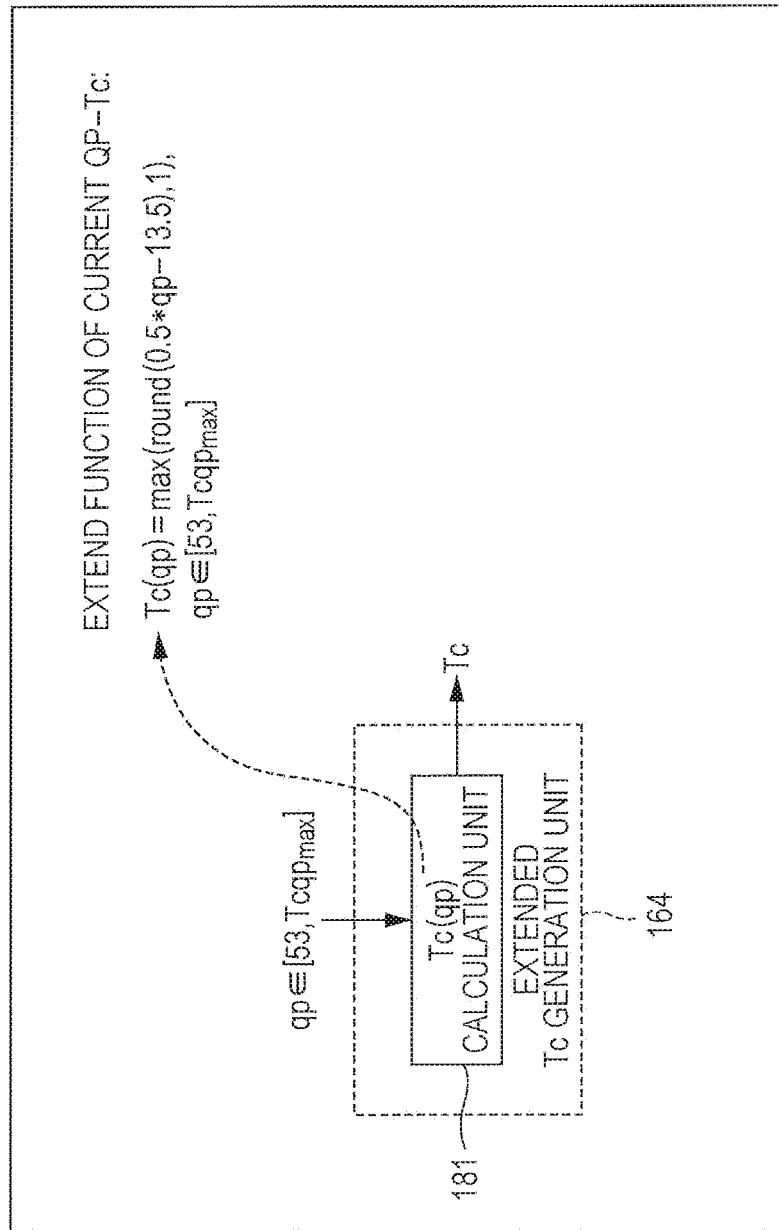
FIG. 20 is a block diagram showing an example of the configuration of an extended Tc generation unit.

For example, as shown in FIG. 20, the extended Tc generation unit 164 is configured to include a Tc (qp) calculation unit 181. The Tc (qp) calculation unit 181 generates Tc dynamically using Expression (9) described above, which is obtained by extending the existing function of QP-Tc, when qp of [53, Tc_qp$_{max}$] is input.

Figure 21:
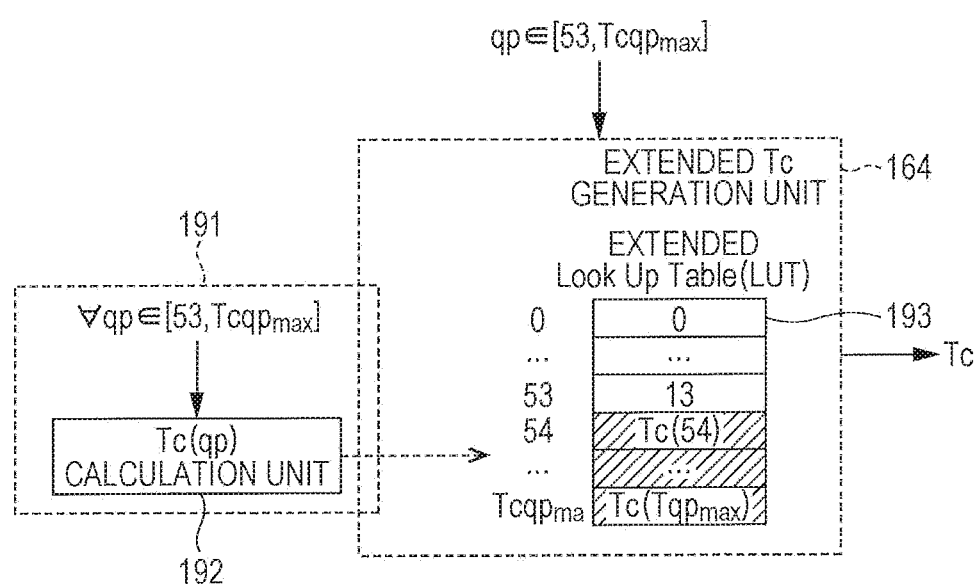
FIG. 21 is a block diagram showing another example of the configuration of the extended Tc generation unit.

In addition, for example, as shown in FIG. 21, the extended Tc generation unit 164 is configured to have an extended LUT (Look Up Table) 193. In addition, in the example shown in FIG. 21, the extended LUT 193 is shown so as to include an existing LUT 171 portion. However, only a shaded portion is an extended portion. The extended LUT 193 is stored after a Tc (qp) calculation unit 192 provided in another computer 191 or the like receives arbitrary qp of [53, Tc_qp$_{max}$] and calculates Tc using the extended function.

The extended Tc generation unit 164 calculates Tc using the extended LUT 193 when qp of [53, Tc_qp$_{max}$] is input.

As described above, when configuring the extended Tc generation unit 164, it is possible to select whether to give the extended Tc by the definition expression (function expression) or by LUT

[Example of the Configuration of the Filter Execution Unit at the Color Difference Boundary]

Figure 22:
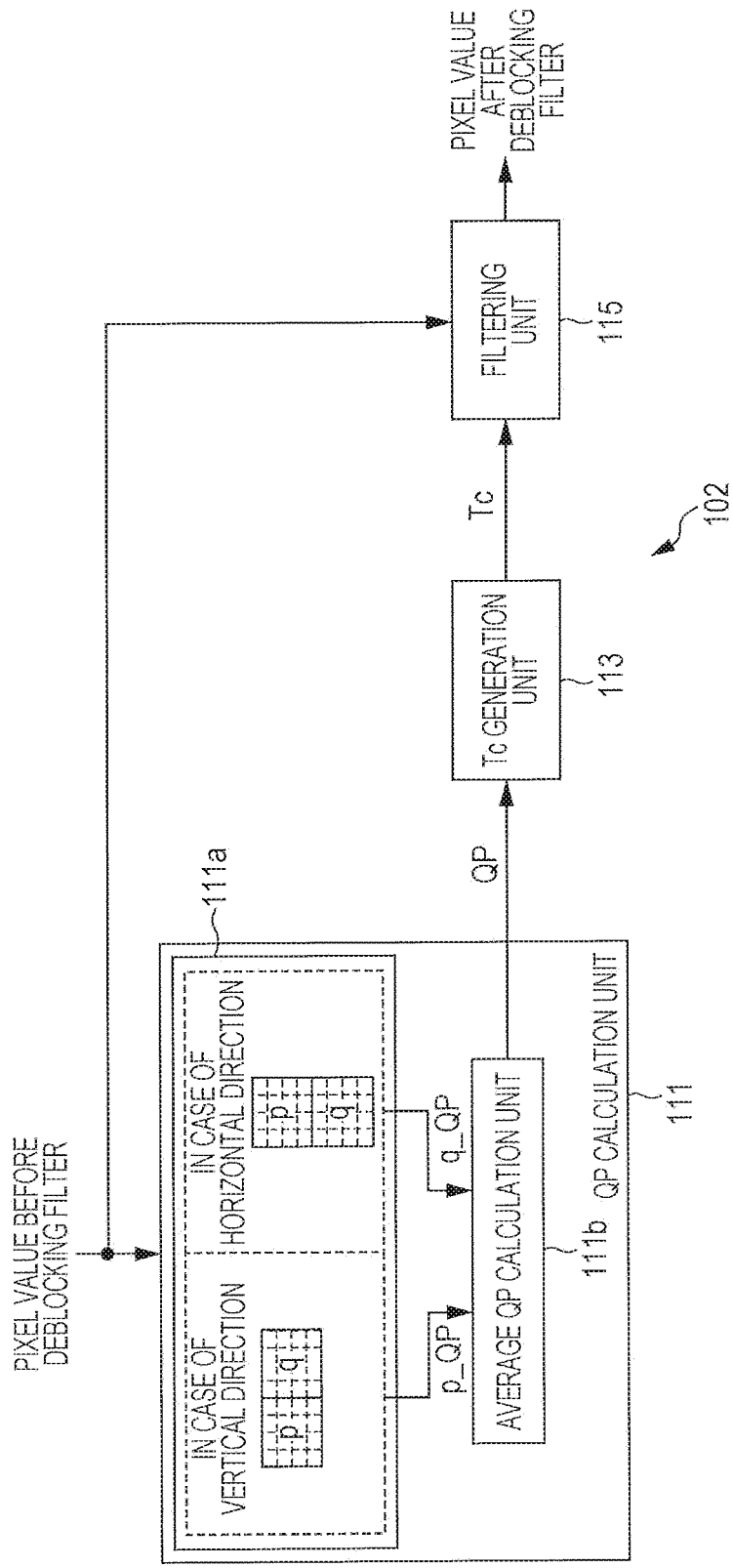
FIG. 22 is a block diagram showing an example of the configuration of a filter execution unit that performs filtering of the color difference boundary.

FIG. 22 is a block diagram showing an example of the configuration of the filter execution unit that performs filtering of the color difference boundary.

The filter execution unit 102 shown in FIG. 22 is different from the filter execution unit 102 shown in FIG. 15 only in that the β generation unit 112 and the filtering determination unit 114 are removed. The filter execution unit 102 shown in FIG. 22 is the same as the filter execution unit 102 shown in FIG. 15 in that the QP calculation unit 111, the Tc generation unit 113, and the filtering unit 115 are included. Since the common units are repeated, explanation thereof will be omitted.

That is, in the case of the color difference boundary, filtering determination is not performed, and the filtering unit 115 performs filtering using the parameter Tc from the Tc generation unit 113. For example, the parameter Tc is used for clipping.

[Operation of the Deblocking Filter]

Figure 23:
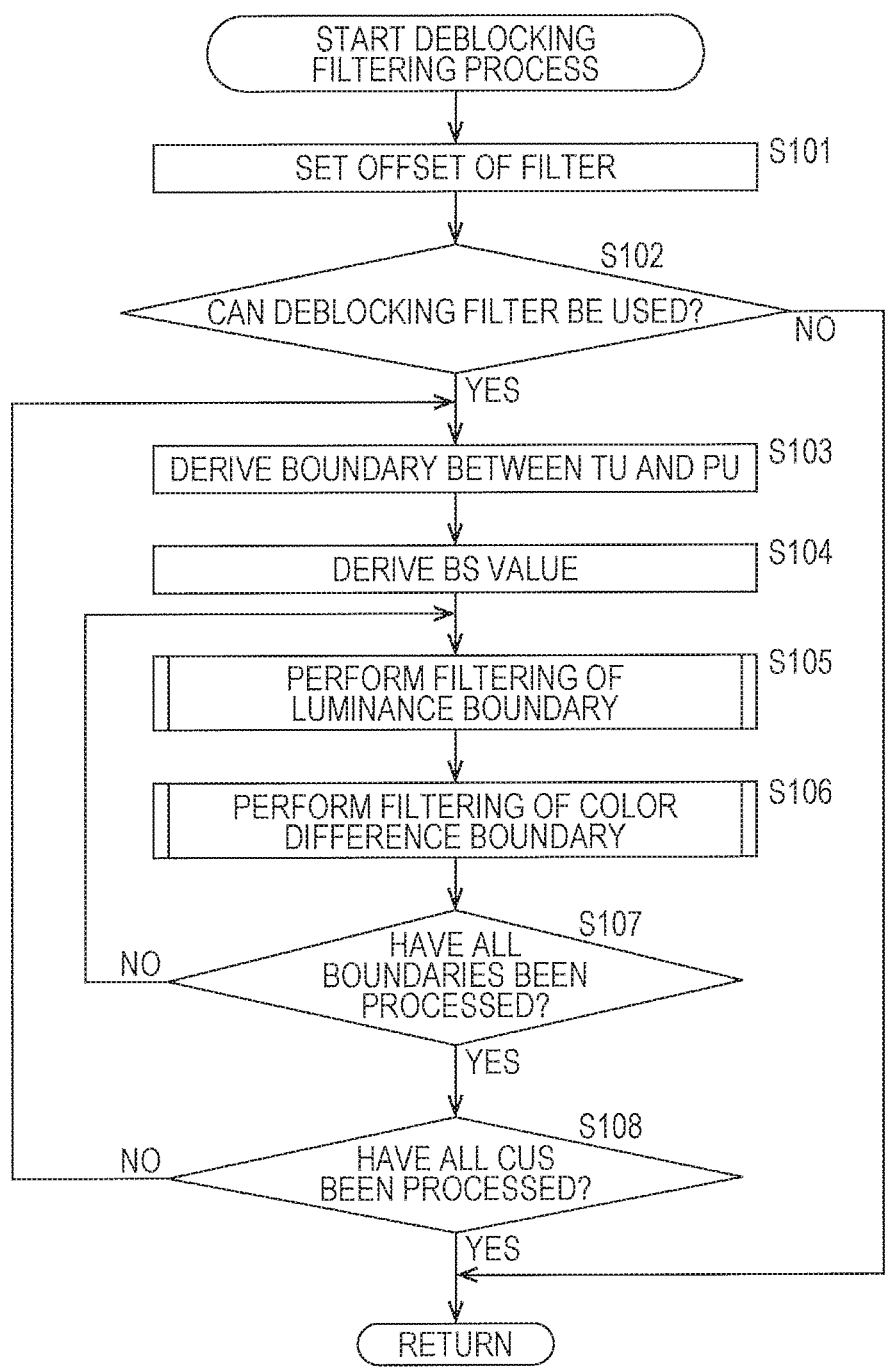
FIG. 23 is a flowchart illustrating the deblocking filtering process.

Next, a deblocking filtering process will be described with reference to the flowchart shown in FIG. 23, in addition, this deblocking filtering process is processing in step S22 of FIG. 2 and step S58 of FIG. 4.

For example, ON/OFF information, the value of the β offset, and the value of the Tc offset are input through an operation unit (or the lossless decoder 62) that is not shown in the diagram.

In step S101, the configuration setting unit 101 sets the offset (β offset and Tc offset) of the filter. The configuration setting unit 101 supplies the set offset information to each of the β generation unit 112 and the Tc generation unit 113 of the filter execution unit 102.

In step S102, the configuration setting unit 101 determines whether or not a deblocking filter can be used based on the ON/OFF information. When it is determined in step S102 that a deblocking filter cannot be used, the deblocking filtering process is ended.

When it is determined in step S102 that a deblocking filter can be used, the process proceeds to step S103.

In step S103, the configuration setting unit 101 derives the boundary between the TU and the PU. In step S104, the configuration setting unit 101 derives a BS (Boundary Filtering Strength) value based on the information of the boundary between the TU and the PU derived in step S103, prediction mode information, and the like. The configuration setting unit 101 supplies the information of the BS value to the QP calculation unit 111 of the filter execution unit 102.

In step S105, the filter execution unit 102 performs filtering of the luminance (LUMA) boundary. Although this processing will be described later with reference to FIG. 24, filtering is performed on the luminance boundary by the processing in step S105.

In step S106, the filter execution unit 102 performs filtering of the color difference (CHROMA) boundary. Although this processing will be described later with reference to FIG. 29, filtering is performed on the color difference boundary by the processing in step S106.

In step S107, the filter execution unit 102 determines whether all boundaries have been processed. When it is determined in step S107 that all boundaries have not been processed, the process returns to step S105 to repeat the subsequent processes.

When it is determined in step S107 that all boundaries have been processed, the process proceeds to step S108.

In step S108, the configuration setting unit 101 determines whether all CUs have been processed. When it is determined in step S108 that all CUs have not been processed, the process returns to step S103 to repeat the subsequent processes.

When it is determined in step S108 that all CUs have been processed, the deblocking filtering process is ended.

[Example of Filtering at the Luminance Boundary]

Next, filtering of the luminance boundary in step S105 of FIG. 23 will be described with reference to the flowchart shown in FIG. 24.

When a Bs value from the configuration setting unit 101 is received, the QP calculation unit 111 determines in step S121 whether or not the Bs value is larger than 0. When it is determined in step S121 that the Bs value is not larger than 0, the filtering of the luminance boundary is ended. That is, in this case, filtering is not performed on the luminance boundary.

When it is determined in step S121 that the Bs value is larger than 0, the process proceeds to step S122. In step S122, the QP calculation unit 111 receives a pixel value before the deblocking filter from the upstream stage and calculates the average QP of two blocks (regions) that share the boundary.

That is, the QP acquisition unit 111*a* acquires quantization parameters p_QP and q_QP of two regions (adjacent to the boundary), which share the boundary to be processed, from the input pixel value before the deblocking filter. The QP acquisition unit 111*a* supplies the acquired quantization parameters p_QP and q_QP to the average QP calculation unit 111*b*.

The average QP calculation unit 111*b* calculates an average of the quantization parameters p_QP and q_QP from the QP acquisition unit 111*a*, and supplies the average to the β generation unit 112 and the Tc generation unit 113 as the quantization parameter QP that is used to generate the parameters β and Tc.

In step S123, the β generation unit 112 generates β. Although the β generation process will be described later with reference to FIG. 25, β is generated by the processing in step S123 and is supplied to the filtering determination unit 114.

In step S124, the Tc generation unit 113 generates Tc. Although the Tc generation process will be described later with reference to FIG. 26, Tc is generated by the processing in step S124 and is supplied to the filtering determination unit 114.

In step S125, the filtering determination unit 114 determines filtering. That is, the filtering determination unit 114 determines whether or not filtering is required using the parameter β from the β generation unit 112 and the like. In addition, the filtering determination unit 114 determines the filter strength using the parameter β from the β generation unit 112, the parameter Tc from the Tc generation unit 113, and the like. The filtering determination unit 114 supplies the determined filtering information to the filtering unit 115.

In step S126, the filtering unit 115 performs filtering on the input pixel value before the deblocking filter with the filter strength determined by the filtering determination unit 114. The filtering unit 115 outputs the pixel value after the deblocking filter to the downstream stage.

In addition, in step S125, when it is determined that filtering is not performed, the processing in step S126 is skipped. In this case, the filtering unit 115 outputs the input pixel value before the d-blocking filter, as a pixel value after the deblocking filter, to the downstream stage at it is (without performing filtering).

[Example of the β Generation Process]

Next, the β generation process in step S123 of FIG. 24 will be described with reference to the flowchart shown in FIG. 25.

The quantization parameter QP from the average QP calculation unit 111*b* is supplied to the β LUT_input calculation unit 121. The value of the β offset of the information set by the configuration setting unit 101 is supplied to the β LUT_input calculation unit 121.

In step S141, the β LUT_input calculation unit 121 calculates βtmp by adding the value of the β offset and the quantization parameter QP from the average QP calculation unit 111*b*, and supplies the calculated βtmp to the clipping unit 122.

In step S142, the clipping unit 122 clips Pimp from the β LUT_input calculation unit 121 in the range [0, $\beta qp_{max}$] of the value set by the configuration setting unit 101. Although the details of this processing will be described later with reference to FIG. 26, the clipping unit 122 supplies βtmp after clipping to the existing β generation unit 123 and the extended β generation unit 124 as β LUT_input qp.

In step S143, the existing β generation unit 123 and the extended β generation unit 124 determine whether or not qp from the clipping unit 122 is larger than 51. When it is determined in step S143 that qp from the clipping unit 122 is equal to or less than 51, the process proceeds to step S144.

In step S144, the existing β generation unit 123 calculates β using the existing LUT 131, and supplies the calculated β to the filtering determination unit 114.

When it is determined in step S143 that qp from the clipping unit 122 is larger than 51, the process proceeds to step S145.

In step S145, the extended β generation unit 124 calculates extended β, and supplies the calculated β to the filtering determination unit 114.

For example, the extended β generation unit 124 (β(qp) calculation unit 141) generates β dynamically using a function expression (a linear function or an exponential function) shown by the dotted line, in which function parameters are set in advance, as described above with reference to FIG. 17.

For example, the extended β generation unit 124 calculates β using the extended LUT 153 that is stored after receiving arbitrary qp of [0, $\beta qp_{max}$] and calculating β in advance using a function expression (a linear function or an exponential function) in which function parameters are set, as described above with reference to FIG. 18.

[Example of Clipping]

Figure 25:
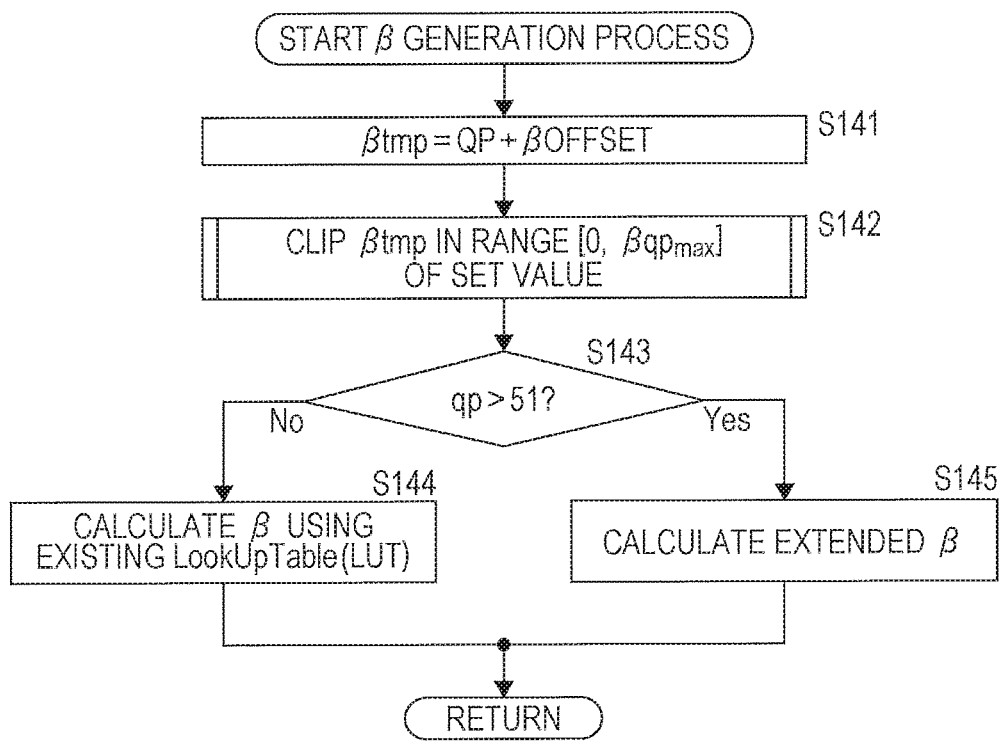
FIG. 25 is a flowchart illustrating the $\beta$ generation process.
Figure 26:
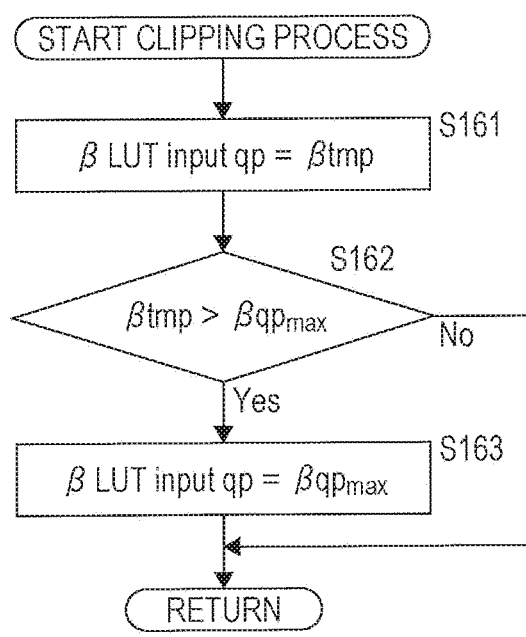
FIG. 26 is a flowchart illustrating clipping.

Next, the clipping in step S142 of FIG. 25 will be described with reference to the flowchart shown in FIG. 26.

In step S161, the clipping unit 122 sets β LUT_input qp=βtmp from the β LUT_input calculation unit 121.

In step S162, the clipping unit 122 determines whether or not βtmp from the β LUT_input calculation unit 121 is larger than $βqp_{max}$. When it is determined in step S162 that βtmp is larger than $βqp_{max}$, the process proceeds to step S163.

In step S163, the clipping unit 122 sets β LUT_input qp=$βqp_{max}$, and supplies β LUT_input qp to the existing β generation unit 123 and the extended β generation unit 124.

When it is determined in step S162 that βtmp is equal to or less than $βqp_{max}$, the processing in step S163 is skipped and the clipping is ended. That is, in this case, β LUT_input qp (βtmp) is supplied to the existing β generation unit 123 and the extended β generation unit 124.

[Example of the Tc Generation Process]

Figure 27:
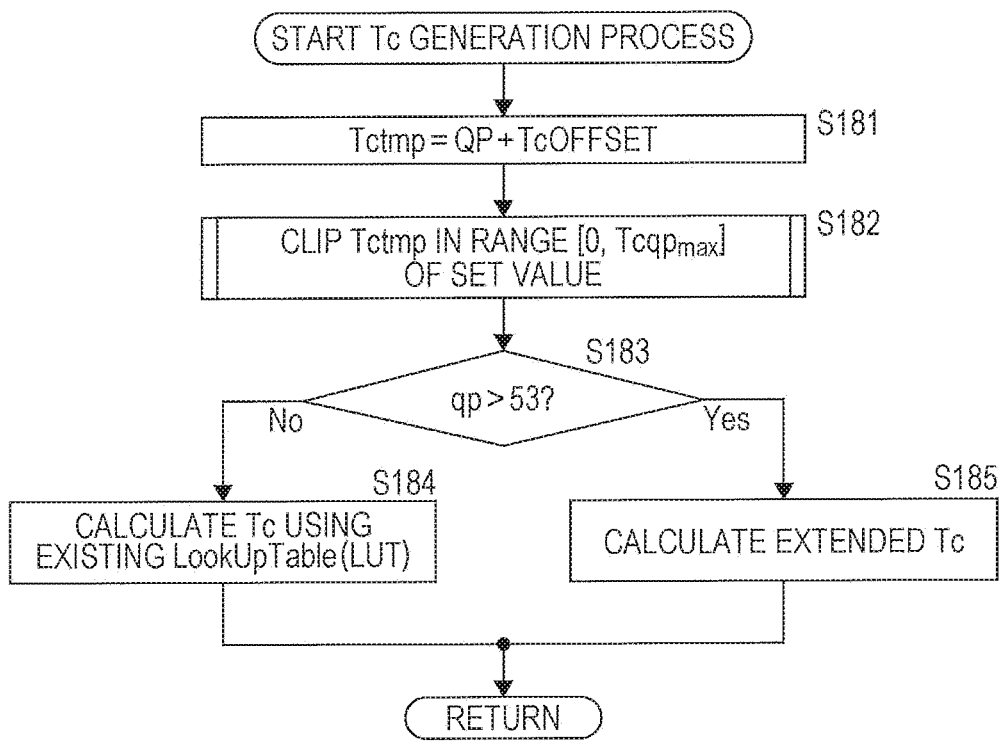
FIG. 27 is a flowchart illustrating the Tc generation process.

Next, the Tc generation process in step S124 of FIG. 24 will be described with reference to the flowchart shown in FIG. 27.

The quantization parameter QP from the average QP calculation unit 111b is supplied to the Tc_LUT_input calculation unit 161. The value of the Tc offset of the information set by the configuration setting unit 101 is supplied to the Tc_LUT_input calculation unit 161.

In step S181, the Tc_LUT_input calculation unit 161 calculates Tctmp by adding the value of the Tc offset and the quantization parameter QP from the average QP calculation unit 111b, and supplies the calculated Tctmp to the clipping unit 162.

In step S182, the clipping unit 162 clips Tctmp from the Tc_LUT_input calculation unit 161 in the range [0, Tc_$qp_{max}$] of the value set by the configuration setting unit 101. Although the details of this processing will be described later with reference to FIG. 28, the clipping unit 162 supplies Tctmp after clipping to the existing Tc generation unit 163 and the extended Tc generation unit 164 as Tc_LUT_input qp.

In step S183, the existing Tc generation unit 163 and the extended Tc generation unit 164 determine whether or not qp from the clipping unit 162 is larger than 53. When it is determined in step S183 that qp from the clipping unit 162 is equal to or less than 53, the process proceeds to step S184.

In step S184, the existing Tc generation unit 163 calculates Tc using the existing LUT 171, and supplies the calculated Tc to the filtering determination unit 114.

When it is determined in step S183 that qp from the clipping unit 162 is larger than 51, the process proceeds to step S185.

In step S185, the extended Tc generation 164 calculates extended Tc, and supplies the calculated Tc to the filtering determination unit 114.

For example, the extended Tc generation unit 164 (Tc(qp) calculation unit 181) generates Tc dynamically using Expression (9) described above, which is obtained by extending the existing function of QP-Tc, as described above with reference to FIG. 20.

For example, the extended Tc generation unit 164 calculates Tc using the extended LUT 193 that is stored after receiving arbitrary qp of [53, $Tcqp_{max}$] and calculating Tc using the extended function, as described above with reference to FIG. 21.

[Example of Clipping]

Figure 28:
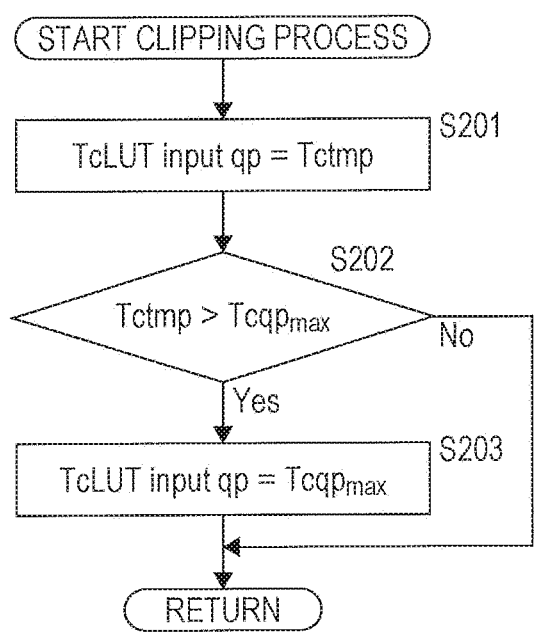
FIG. 28 is a flowchart illustrating another example of clipping.

Next, the clipping in step S182 of FIG. 27 will be described with reference to the flowchart shown in FIG. 28.

In step S201, the clipping unit 162 sets Tc_LUT_input qp=Tctmp from the Tc_LUT_input calculation unit 161.

In step S202, the clipping unit 162 determines whether or not Tctmp from the Tc_LUT_input calculation unit 161 is larger than Tc_$qp_{max}$. When it is determined in step S202 that Tctmp is larger than Tc_$qp_{max}$, the process proceeds to step S203.

In step S203, the clipping unit 162 sets Tc_LUT_input qp=Tc_$qp_{max}$, and supplies Tc_LUT_input qp to the existing Tc generation unit 163 and the extended Tc generation unit 164.

When it is determined in step S202 that Tctmp is equal to or less than Tc_$qp_{max}$, the processing in step S203 is skipped and the clipping is ended. That is, in this case, Tc_LUT_input qp (Tctmp) is supplied to the existing Tc generation unit 163 and the extended Tc generation unit 164.

[Example of Filtering of the Color Difference Boundary]

Next, filtering of the color difference boundary in step S106 of FIG. 23 will be described with reference to the flowchart shown in FIG. 29.

When a Bs value from the configuration setting unit 101 is received, the QP calculation unit 111 determines in step S221 whether or not the Bs value is larger than 1. When it is determined in step S221 that the Bs value is not larger than 1, the filtering of the color difference boundary is ended. That is, in this case, filtering is not performed on the color difference boundary.

When it is determined in step S221 that the Bs value is larger than 1, the process proceeds to step S222. In step S222, the QP calculation unit 111 receives a pixel value before the deblocking filter from the upstream stage and calculates the average QP of two blocks (regions) that share the boundary.

That is, the QP acquisition unit 111a acquires quantization parameters p_QP and q_QP of two regions (adjacent to the boundary), which share the boundary to be processed, from the input pixel value before the deblocking filter. The QP acquisition unit 111a supplies the acquired quantization parameters p_QP and q_QP to the average QP calculation unit 111b.

The average QP calculation unit 111b calculates an average of the quantization parameters p_QP and q_QP from the QP acquisition unit 111a, and supplies the average to the Tc generation unit 113 as the quantization parameter QP that is used to generate the parameter Tc.

In step S223, the Tc generation unit 113 generates Tc. Although the explanation of the Tc generation process will be omitted since the Tc generation process is basically the same as the process described above with reference to FIG. 26, Tc is generated by the processing in step S223 and is supplied to the filtering unit 115.

In step S224, the filtering unit 115 performs filtering on the input pixel value before the deblocking filter using the parameter Tc generated by the Tc generation unit 113 or the like. The filtering unit 115 outputs the pixel value after the deblocking filter to the downstream stage.

In addition, in the above explanation, an example of performing extension by increasing the parameters β and tc in order to increase the filter strength (hereinafter, also referred to as a first extension method) has been described. However, examples of the extension of the parameters β and tc are not limited to the first extension method described above. Next, a second extension method of changing the inclination of the function without increasing the number of parameters will be described,

4. Second Embodiment (Second Extension Method)

[Example of Extension of the Parameter β]

First, extension of the parameter β by the second extension method will be described. In the HEVC method, as shown by the following Expression (10), the parameter β is calculated by three expressions according to the section of QP.

[Mathematical Formula 10]

$$\beta(qp) = \begin{cases} 0, & 0 \le qp \le 15 \\ qp - 10, & 16 \le qp \le 28 \\ qp * 2 - 38, & 29 \le qp \le 51 \end{cases} \quad (10)$$

In the second extension method, the inclination (k0, k1, k2) of these three expressions is transmitted to the decoding side by the syntax. On the decoding side, for each slice, a table shown by the following Expression (11) is updated using the inclination indicated by the syntax of the encoding side.

[Mathematical Formula 11]

$$\beta(qp) = \begin{cases} k0 * qp & 0 \le qp \le 15 \\ k1 * (qp - 15) + \beta(15) & 16 \le qp \le 28 \\ k2 * (qp - 28) + \beta(28) & 29 \le qp \le 51 \end{cases} \quad (11)$$

In addition, Expression (11) becomes the table of Expression (10) described above in the case of k0=0, k1=1, and k2=2. k0=0, k1=1, and k2=2 are defaults, and a value to be changed among these values is transmitted to the decoding side by the syntax.

Figure 30:
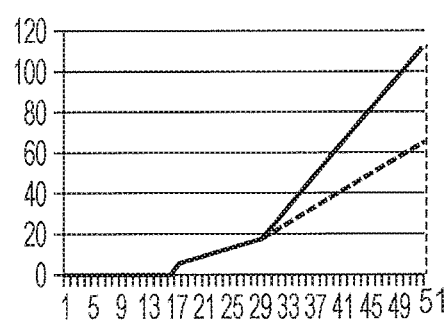
FIG. 30 is a diagram showing the values and graph of the quantization parameter QP and the parameter $\beta$ (new $\beta$) in a second extension method of the present technique.

FIG. 30 is a diagram showing the relationship between the quantization parameter QP and the parameter β in the case of k0=0, k1=1, and k2=2 in Expression (11) and the relationship between the quantization parameter QP and the parameter β (new β) when updating as k2=4 has been made.

In the graph shown in A of FIG. 30, "before updating" is shown by the dotted line, and "after updating as k2=4" is shown by the solid line. In the table shown in B of FIG. 30, values of new β after updating corresponding to 16≤qp≤51 after updating are surrounded by the thick frame. Among them, values of new β corresponding to 29≤qp≤51 updated as k2=4 are hatched.

In the case of the example shown in FIG. 30, the parameter β (new β) can take the values of 0 to 110 for the quantization parameter QP of 0 to 51.

In addition, although β at the time of qp=0 is set to 0 in the example described above, β at the time of qp=0 may be other values without being limited to 0. In addition, in the example described above, an example where β is calculated by three expressions according to the section of QP has been described. However, the number of divisions of expression of β is not limited to 3.

In addition, although the boundary of each section of qp is continuous in the example described above, the boundary of each section of qp may be discontinuous. In addition, although the expression of β is expressed as a linear function in the example described above, the expression of β nay also be expressed as an exponential function, for example, without being limited thereto.

As a method of transmitting the coefficient (k0, k1, k2) to the decoding side, for example, Exponential Golomb or Fix Length Coding can be considered. However, any kind of encoding is possible.

[Example of Extension of the Parameter Tc]

Next, extension of the parameter Tc by the second extension method will be described. Also in the case of the parameter Tc, the second extension method is performed in basically the same concept as the parameter described above.

However, in the case of the parameter Tc, unlike the case of the parameter β, the parameter Tc is not expressed by single expression in the HEVC method. In addition, the parameter Tc in the HEVC method is expressed by the following Expression (12) when approximated.

[Mathematical Formula 12]

$$tc(qp) = \begin{cases} 0, & qp \in [0, 17] \\ \max(\text{round}(0.5 * qp - 13.5), 1), & qp \in [17, 51] \end{cases} \quad (12)$$

Figure 31:
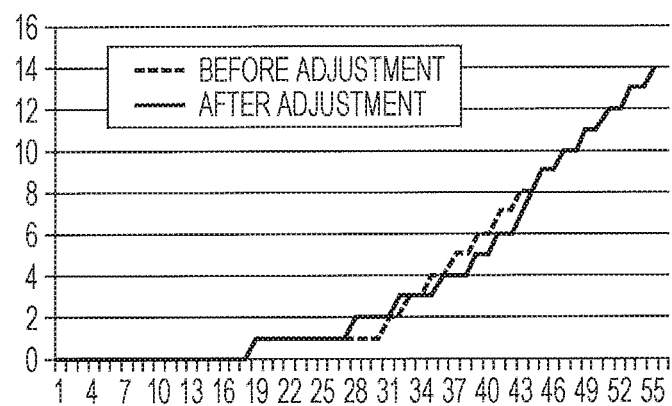
FIG. 31 is a diagram illustrating the relationship between the quantization parameter QP and the parameter $\beta$ and the amount of adjustment for the approximate expression.

That is, as shown in FIG. 31, there is a slight deviation (adjustment amount (Δt)) between the relationship of the actual quantization parameter QP and parameter Tc and Expression (12) obtained by approximating the relationship.

In A of FIG. 31, Expression (12) obtained by approximating the relationship between the quantization parameter QP and the parameter Tc is expressed by the dotted line as "before adjustment", and "after adjustment" of a deviation between the relationship of the quantization parameter QP and the parameter Tc and Expression (12) is expressed by the solid line.

In B of FIG. 31, the relationship of the quantization parameter QP and the parameter Tc and the adjustment amount (Δt) when the relationship is expressed by Expression (12) are shown.

Accordingly, in the case of the parameter Tc, as shown in the following Expression (13), approximated Expression (12) is multiplied by k3 and k4, and then an amount (adjustment amount Δt) of deviation from Expression (12) is adjusted.

[Mathematical Formula 13]

$$tc(qp) = \begin{cases} k3 * qp, & qp \in [0, 17] \\ \max(k4 * (\text{round}(0.5 * qp - 13.5) + \Delta t), 1) & qp \in [17, 51] \end{cases} \quad (13)$$

Then, in the second extension method, the inclination (k3, k4) of these two Expressions is transmitted to the decoding side by the syntax. On the decoding side, for each slice, a table shown by the above-described Expression (13) is updated using the inclination indicated by the syntax of the encoding side. In addition, as a method of transmitting the coefficient (k3, k4) to the decoding side, for example, Exponental Golomb or Fix Length Coding can be considered. However, any kind of encoding is possible.

The adjustment amount is ±k4, and the sign changes according to the value of qp as shown in B of FIG. 31. In B of FIG. 31, when QP is 27 to 29 and 31, the value of the adjustment amount is positive. When QP is 34 and 36 to 42, the value of the adjustment amount is negative. In addition, the adjustment amount may be fixed to 1 shown in B of FIG. 31, for example, regardless of k.

In the case of k3=0 and k4=1, Expression (13) becomes an expression obtained by adding the adjustment amount (Δt) to the table of the approximate expression shown by Expression (12) described above. K3=0 and k4=1 are default values, and a value to be changed among these values is transmitted to the decoding side by the syntax.

In addition, although the adjustment amount is included in Expression (13), it is also possible to use Expression (14) without the adjustment amount on the assumption that the existing parameter Tc is expressed by Expression (12) described above.

[Mathematical Formula 14]

$$tc(qp) = \begin{cases} k3*qp, & qp \in [0, 17] \\ \max(k4*(\text{round}(0.5*qp - 13.5)), 1) & qp \in [17, 51] \end{cases} \quad (14)$$

In addition, the multiplication by k0 to k2 in Expression (11) described above and the multiplication by k3 and k4 in Expression (13) or Expression (14) described above can be preferably realized by bit shift.

In addition, according to the second extension method described above, the meaning of the quantization parameter QP is not changed. The range of the quantization parameter QP is not different from the range in the HEAT method. In addition, it is possible to increase the degree of freedom of a setting depending on how the noise is mixed in the stream. In addition, this can be realized without increasing the memory in use.

5. Third Embodiment (Third Extension Method)

[Example of Extension of the Parameter β]

In addition, extension of the parameter β by the third extension method will be described. The meaning of the offset (β_offset) of the parameter β in the HEVC method is a quantization parameter QP+β_offset. Accordingly, the parameter β is expressed by the following Expression (15).
[Mathematical Formula 15]

$$\beta = \beta[QP+\beta\_offset] \quad (15)$$

That is, in the HEVC method, β_offset was added to the quantization parameter QP, and the β was taken. In contrast, as the third extension method, as shown in the following Expression (16), the β_offset is directly added to the parameter β.
[Mathematical Formula 16]

$$\beta = \beta[QP+\beta\_offset] \quad (16)$$

Here, α0 is a fixed value. For example, α0, 1, 2, 3, 4, ..., and the value of α0 is not limited, it is possible to adjust β using this α0. In addition, α0 may not be a fixed value. For example, α0 may be set on the encoding side and Be transmitted to the decoding side by the syntax.

For example, as described with reference to FIG. 32, in the case of QP=37, β_offset=6, and α0=2, the value (=48) of β=β(37+6)=β(43) is used from the above-described Expression (15) in the HEVC method.

On the other hand, in the case of the third extension method, the value (48) obtained by adding 12 the value (=36) of β=β(37)+6*2=β(37) is used from Expression (16) described above.

As described above, it is also possible to directly extend the range of the value of β using β_offset. This is also the same for the parameter Tc, as will be described below

[Example of Extension of the Parameter Tc]

Next, the extension of the parameter Tc using the third extension method will be described. The meaning of the offset (Tc_offset) of the parameter Tc in the HEVC method is a quantization parameter QP+Tc_offset. Accordingly, the parameter Tc is expressed by the following Expression (17).
[Mathematical Formula 17]

$$tc=tc[QP+tc\_offset] \quad (17)$$

That is, in the HEVC method, Tc_offset was added to the quantization parameter QP, and the Tc was taken. In contrast, as the third extension method, as shown in the following Expression (18), the Tc_offset is directly added to the parameter Tc.
[Mathematical Formula 18]

$$tc=tc[QP]+tc\_offset*\alpha 1 \quad (18)$$

Here, α1 is a fixed value. For example, α1=0, 1, 2, 3, 4, ..., and the value of α1 is not limited. It is possible to adjust Tc using this α1. In addition, α1 is not limited to the fixed value, and may be set on the encoding side and be transmitted to the decoding side by the syntax.

For example, as described with reference to FIG. 33, in the case of QP=37, Tc_offset=6, and α1=1, the value (=8) of Tc=Tc(37+6)=Tc(43) is used from the above-described Expression (17) in the HEVC method.

On the other hand, in the case of the third extension method, the value (10) obtained by adding 6 to the value (=4) of Tc=Tc(37)+6*1=Tc(37) is used from Expression (18) described above.

As described above, it is also possible to directly extend the range of the value of Tc using Tc_offset.

In addition, the multiplication by α0 in Expression (15) described above and the multiplication by α1 in Expression (18) described above can be preferably realized by bit shift.

In addition, according to the third extension method described above, the meaning of the quantization parameter QP is not changed. The range of the quantization parameter QP is not different from the range in the HEVC method. In addition, this can be realized without increasing the memory in use.

In addition, similar to the first extension method, the second and third extension methods described above are also performed by the extended β generation unit 124 shown in FIG. 16 and the extended Tc generation unit 164 shown in FIG. 19, for example.

In addition, the coefficients (k0 to k5) in the second extension method described above and the coefficients α0 and α1 in the third extension method may be transmitted to the decoding side as a header, such as a slice header, for example. In addition, the coefficients (k0 to k5) or the coefficients α0 and α1 may be transmitted to the decoding side as a NAL unit, such as an adaptation parameter set (APS).

As described above, parameters used in determination regarding filtering, that is, parameters for determining the filter strength are extended so as to increase the filter strength. Therefore, since block noise can be suppressed by an increase in the filter strength, it is possible to optimize a decoded image.

In addition, β and Tc were used as filter parameters for increasing the strength of the deblocking filter. In addition, in the range of the parameters under the current conditions, there was a place where noise was left. Therefore, the extension of β and Tc was performed to further increase the strength. Similar considerations can be applied to the adaptive offset filter. That is, also in the adaptive offset filter, it is possible to further increase the strength by extending the range of the parameters of the current standard.

Here, in the first extension method described above, an example of extending the range of the parameters in values after the quantization parameter QP (0 to 51), which is an input of the parameter of the deblocking filter to the LUT, has been described. In this case, the number of tables for holding the parameters is roughly increased, or the calculation cost for new parameters is increased.

In contrast, an example will be described in which the strength of deblocking can be increased as simply as possible.

6. Fourth Embodiment (Fourth Extension Method)

[Extension of the Parameter β]

Figure 34:
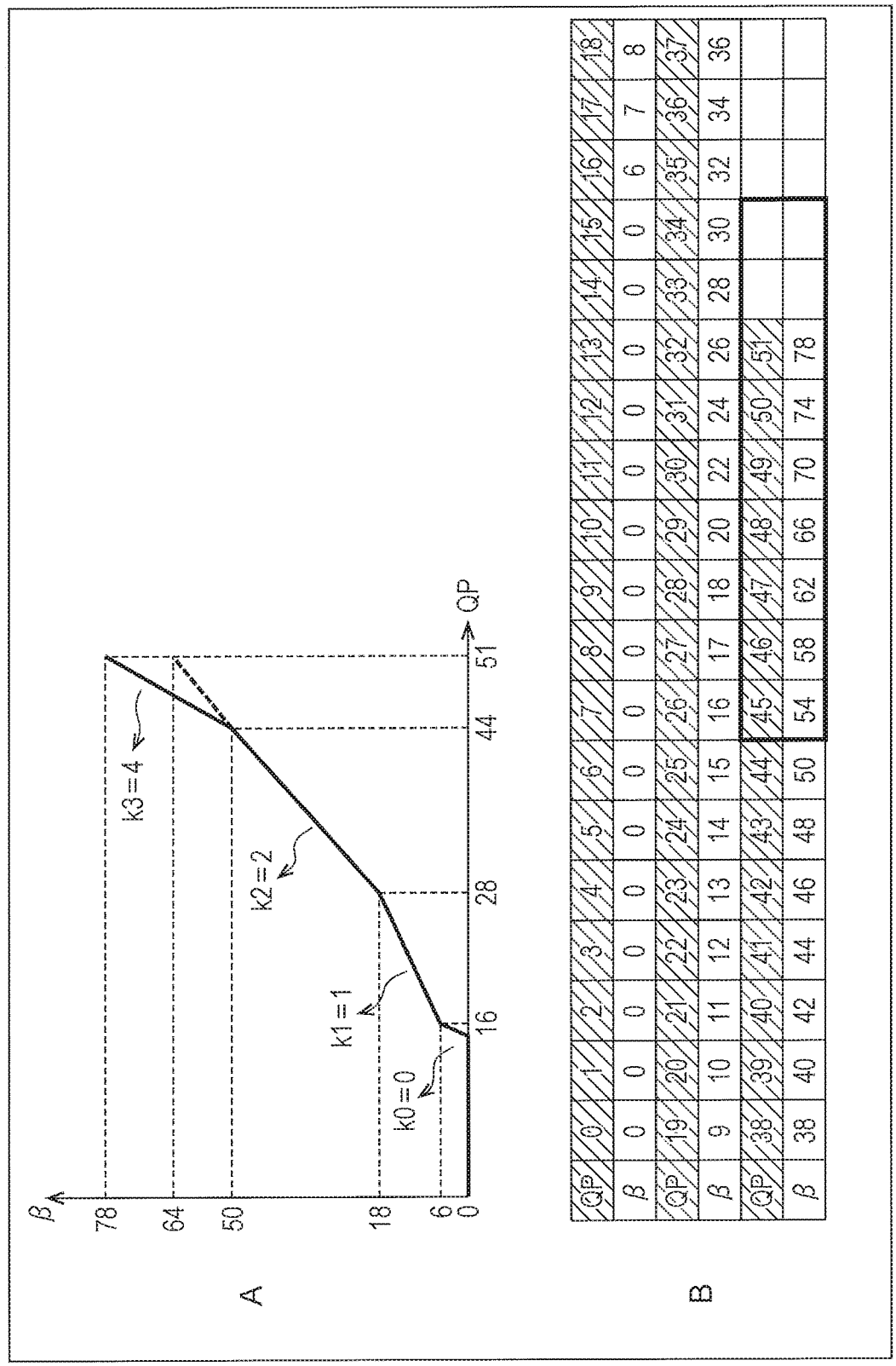
FIG. 34 is a diagram showing the values and graph of the quantization parameter QP and the parameter β in the case of extension within the quantization parameter QP (0 to 51).

First, an example of extending the range of the parameter within the quantization parameter QP (0 to 51) will be described with reference to FIG. 34. A of FIG. 34 is a graph showing the relationship between the quantization parameter QP and the parameter β in the present technique. B of FIG. 34 is a table showing the relationship between the quantization parameter QP and the parameter β in the present technique. In addition, in the graph shown in A of FIG. 34, the dotted line shows the related art. In the table shown in B of FIG. 34, a thick frame portion is an extended portion by the present technique.

As shown within the thick frame of FIG. 34, a portion of High in the quantization parameter QP (0 to 51), that is, the parameter β (β(45) to β(51)) corresponding to the quantization parameter QP (45 to 51) is extended by increasing the inclination of the linear function, which expresses the parameter to the larger inclination. That is, this method of extending 13 is expressed by the following Expression (19).

[Mathematical Formula 19]

$$\beta(qp) = \begin{cases} k0*qp, & k0=0, \quad qp \in [0, 15] \\ k1*qp-10, & k1=1, \quad qp \in [16, 28] \\ k2*qp-38, & k2=2, \quad qp \in [29, 44] \\ k3*qp-126, & k3=4, \quad qp \in [45, 31] \end{cases} \quad (19)$$

In addition, although k3=4 is set herein, k3 is not limited to 4. That is, although 4 is suitable as the value of k3 in consideration of shift operation, the value of k3 may also be 3, 5, 6, or the like.

The deblocking filter 31 in the fourth embodiment is basically the same as the deblocking filter 31 described above with reference to FIG. 14 except for the configuration of the β generation unit 112 shown in FIG. 15. Therefore, an example of the configuration of the β generation unit 112 of FIG. 15 having a different configuration will be described next.

[Example of the Configuration of the β Generation Unit]

Figure 35:
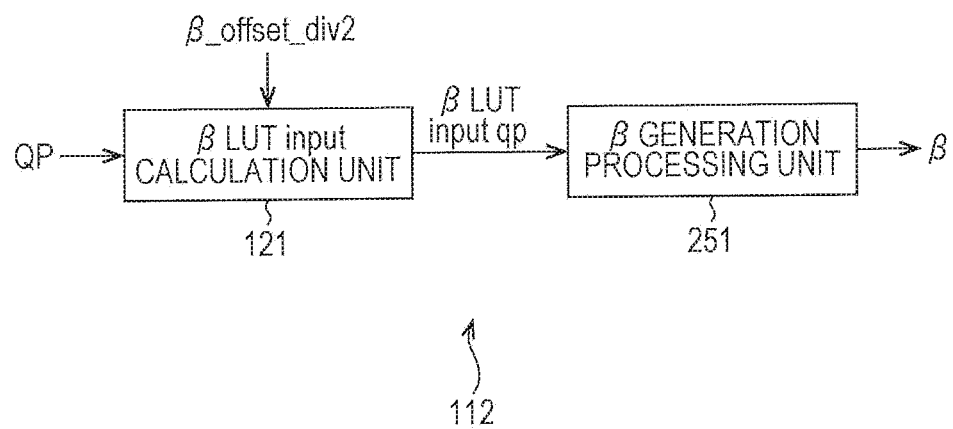
FIG. 35 is a block diagram showing an example of the configuration of a β generation unit.

FIG. 35 is a block diagram showing an example of the configuration of the β generation unit.

In the example shown in FIG. 35, the β generation unit 112 is configured to include the β LUT_input calculation unit 121 shown in FIG. 16 and a β generation processing unit 251.

The quantization parameter QP from the average QP calculation unit 111b is supplied to the β LUT_input calculation unit 121. The value (β_offdset_div2) of the β offset of the information set by the configuration setting unit 101 is supplied to the β LUT_input calculation unit 121.

The β LUT_input calculation unit calculates βtmp that is a value β LUT_input qp input to the β generation processing unit 251. That is, the β LUT_input calculation unit 121 calculates βtmp by adding the value of the β offset and the quantization parameter QP from the average QP calculation unit 111b, and supplies the calculated βtmp to the β generation processing unit 251.

The β generation processing unit 251 has a βLUT (Look Up Table) based on the off-line calculation of Expression (19). The β generation processing unit 251 receives βtmp calculated by the β LUT_input calculation unit 121 as β LUT_input qp, calculates β using βLUT (Expression (19)), and supplies the calculated β to the filtering determination unit 114.

Figure 24:
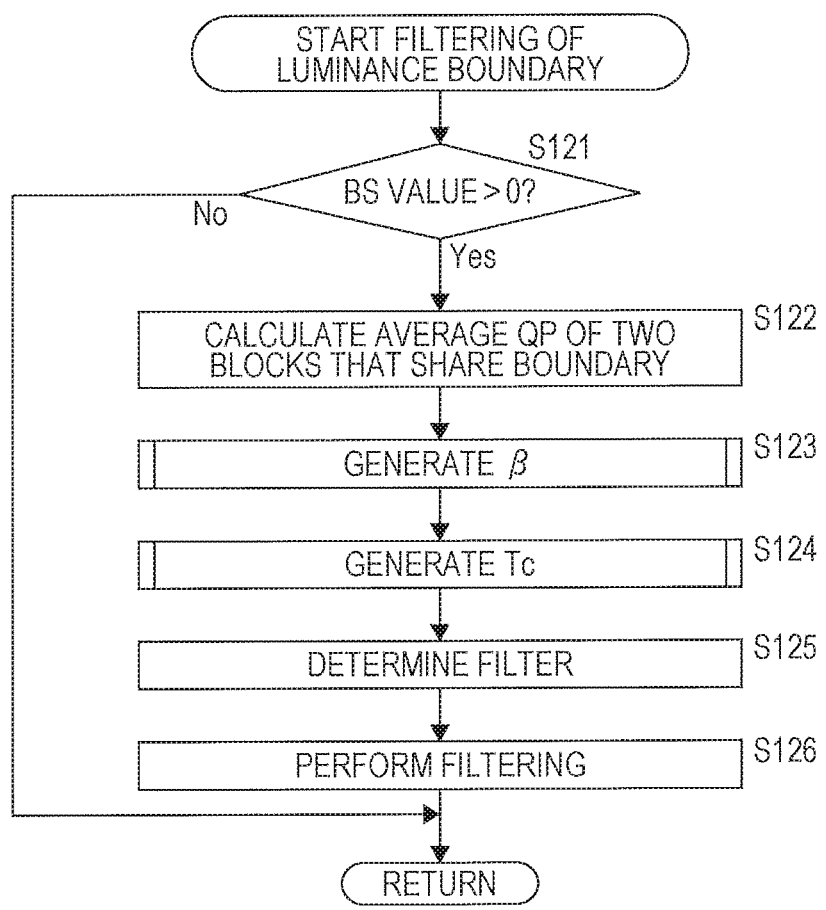
FIG. 24 is a flowchart illustrating the filtering of the luminance boundary.

In addition, the process of the deblocking filter 31 in the fourth embodiment is basically the same as the deblocking filtering process described above with reference to FIG. 23 except for the β generation processing in step S123 of FIG. 24.

Figure 36:
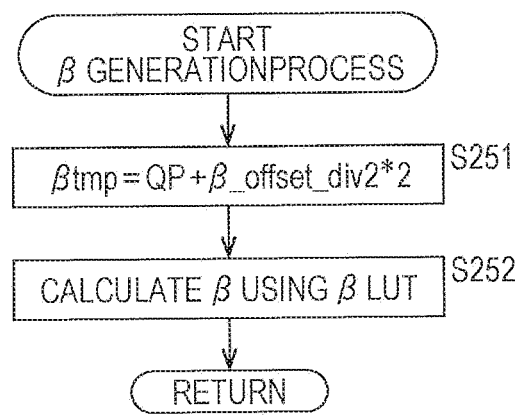
FIG. 36 is a flowchart illustrating the β generation process.

Therefore, a β generation process (step S123 of FIG. 24), which is a different process, will be described next with reference to the flowchart shown in FIG. 36.

In step S251, the β LUT_input calculation unit 121 calculates βtmp=QP+β_offdset_div2*2, which is a value β LUT_input qp that is input to the β generation processing unit 251, and supplies the calculated βtmp to the β generation processing unit 251.

In addition, in practice, the offset value (β_offdset_div2) of β is halved and transmitted, and is doubled and used when calculating β LUT_input qp in step S251.

In step S252, the β generation processing unit 251 receives βtmp calculated by the β LUT_input calculation unit 121 as β LUT_input qp, calculates β using βLUT (Expression (19)), and supplies the calculated β to the filtering determination unit 114.

As described above, the filter strength is increased by increasing the inclination of the linear function of β of the portion of High in the quantization parameter QP (0 to 51). In this case, the strength of deblocking when giving the offset can be easily increased without having little influence on the performance or mounting under the current conditions.

In addition, although the offset of the parameter β and the offset of the parameter Tc are transmitted from the encoding side to the decoding side in the above explanation, an example of sharing the offsets of the parameters β and Tc will be described next.

7. Fifth Embodiment (First Offset Transmission Method)

[Example of the Configuration of the Deblocking Filter]

Figure 37:
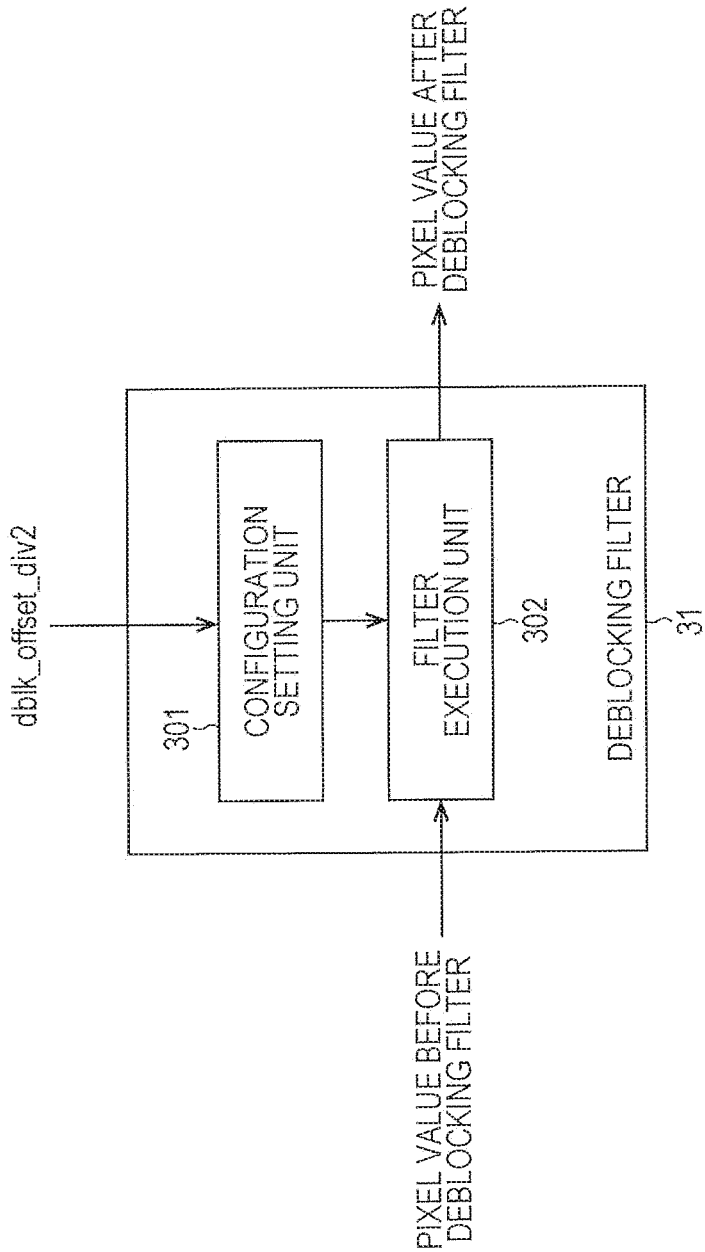
FIG. 37 is a block diagram showing an example of the configuration of a deblocking filter to which the present technique is applied.

FIG. 37 is a block diagram showing an example of the configuration of the deblocking filter when the offsets of the parameters β and Tc are shared.

In the example shown in FIG. 37, the deblocking filter 31 is configured to include a configuration setting unit 301 and a filter execution unit 302.

Unlike the deblocking filter 31 shown in FIG. 14, a value (dblk_offset_div2) of the deblocking offset common in the parameters β and Tc is input to the configuration setting unit 301.

That is, the configuration selling unit 301 receives the value of the deblocking offset and DisableDeblockingFilter flag information (that is, ON/OFF information) input from an operation unit (or the lossless decoder 62) that is not shown in the diagram, for example. The configuration setting unit 301 performs a configuration setting in the deblocking filter 31 based on the input information. That is, in the configuration setting unit 301, as one configuration setting, the value of the deblocking offset is set as the offsets of β and Tc of the deblocking filter. The configuration setting unit 301 supplies the set information to the filter execution unit 302.

A pixel value before the deblocking filter from the arithmetic operation unit 30 (or the arithmetic operation unit 65) is supplied to the filter execution unit 302. The filter execution unit 302 calculates the quantization parameter QP, which is used to generate parameters, based on the information set by the configuration setting unit 301, such as the value of the deblocking offset, generates the parameters β and Tc, and determines whether or not filtering is required or the filter strength. Then, the filter execution unit 302 performs filtering based on the determined filter strength or the determination result regarding whether or not filtering is required. The filter execution unit 302 supplies a pixel value after the deblocking filter to the downstream adaptive offset filter 41 (or the adaptive offset filter 81).

In addition, the filter execution unit 302 performs the above-described processing on each of the luminance boundary d the color difference boundary.

[Example of the Configuration of the Filter Execution Unit at the Luminance Boundary]

Figure 38:
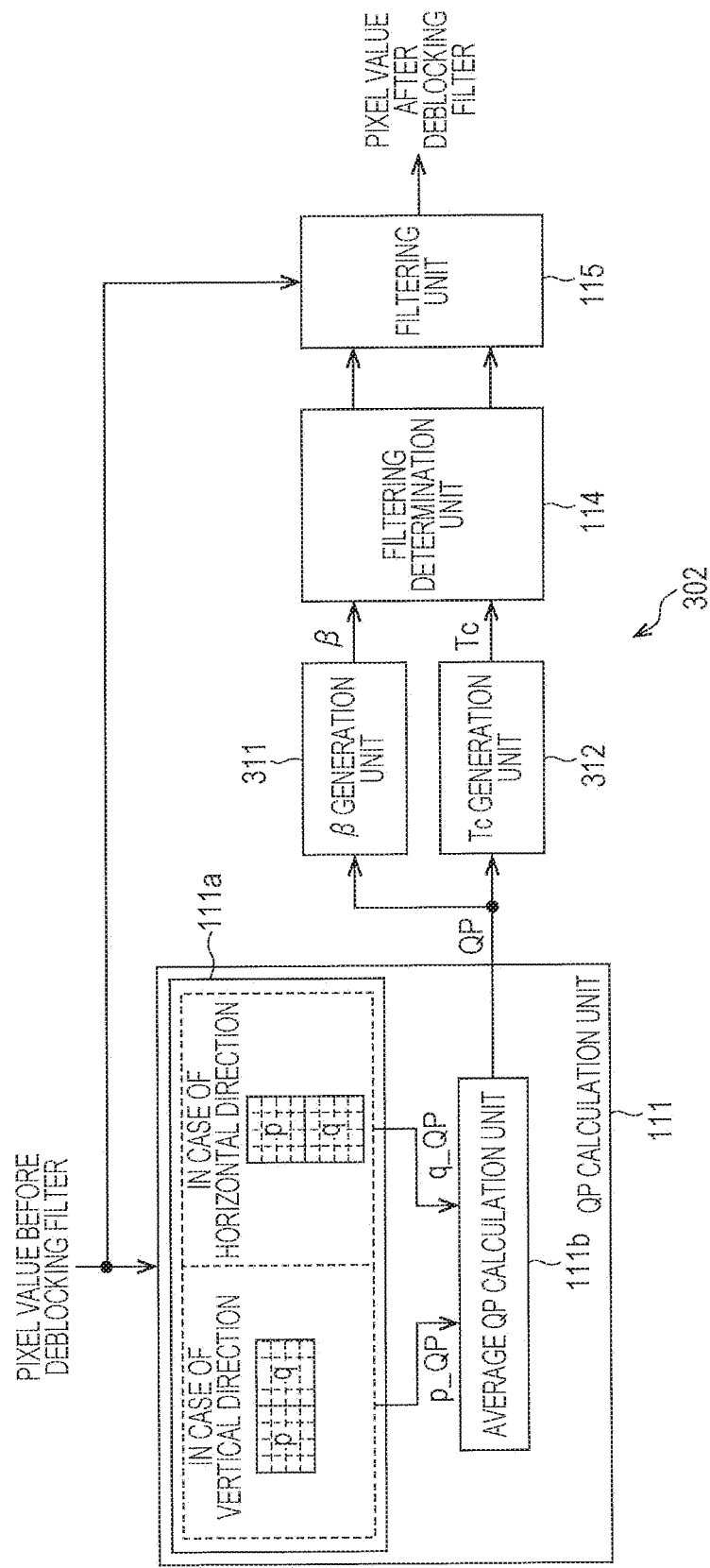
FIG. 38 is a block diagram showing an example of the configuration of a filter execution unit that performs filtering of the luminance boundary.

FIG. 38 is a block diagram showing an example of the configuration of the filter execution unit that performs filtering of the luminance boundary.

In the example shown in FIG. 38, the filter execution unit 302 is configured to include a QP calculation unit 111, a filtering determination unit 114, a filtering unit 115, a β generation unit 311, and a Tc generation unit 312.

In addition, the filter execution unit 302 is the same as the filter execution unit 102 shown in FIG. 15 in that the QP calculation unit 111, the filtering determination unit 114, and the filtering unit 115 are provided. The filter execution unit 302 is different from the filter execution unit 102 shown in FIG. 15 in that the β generation unit 112 is replaced with the β generation unit 311 and the Tc generation unit 113 is replaced with the Tc generation unit 312.

That is, similarly to the β generation unit 112, the β generation unit 311 generates the parameter β according to the quantization parameter QP from the average QP calculation unit 111b. In this case, in the β generation unit 311, the value (dblk_offset_div2) of the deblocking offset from the configuration setting unit 301 is used as a value of the offset. The β generation unit 311 supplies the generated parameter β to the filtering determination unit 114.

Similarly to the Tc generation unit 113, the Tc generation unit 312 generates the parameter Tc according to the quantization parameter QP from the average QP calculation unit 111b. In this case, in the Tc generation unit 312, the value (dblk_offset_div2) of the deblocking offset from the configuration setting unit 301 is used as a value of the offset. The Tc generation unit 312 supplies the generated parameter Tc to the filtering determination unit 114.

[Example of the Configuration of the β Generation Unit]

Figure 39:
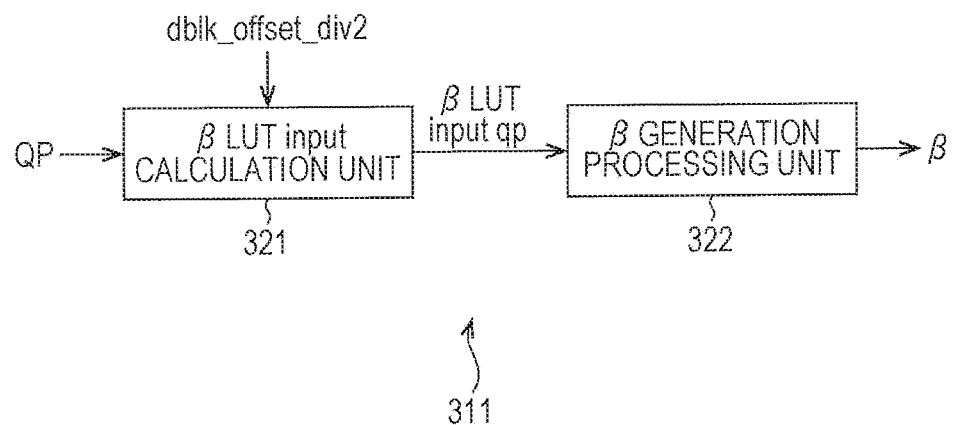
FIG. 39 is a block diagram showing an example of the configuration of a β generation unit.

FIG. 39 is a block diagram showing an example of the configuration of the β generation unit.

In the example shown in FIG. 39, the β generation unit 311 is configured to include a β LUT_input calculation unit 321 and a β generation processing unit 322.

The quantization parameter QP from the average QP calculation unit 111b is supplied to the β LUT_input calculation unit 321. The value (dblk_offset_div2) of the deblocking offset of the information set by the configuration setting unit 301 is supplied to the β LUT_input calculation unit 321.

The β LUT_input calculation unit 321 calculates βtmp by adding the quantization parameter QP from the average QP calculation unit 111b and the value of the deblocking offset, and supplies the calculated βtmp to the β generation processing unit 322.

The β generation processing unit 322 has a βLUT (Look Up Table) defined in the HEVC method, for example. The β generation processing unit 322 receives βtmp from the β LUT_input calculation unit 321 as β LUT_input qp, calculates β using βLUT, and supplies the calculated β to the filtering determination unit 114.

[Example of the Configuration of the IC Generation Unit]

Figure 40:
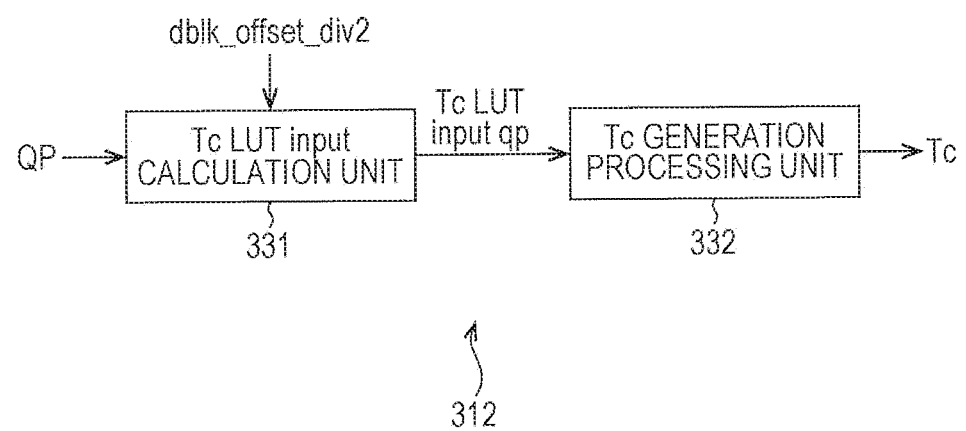
FIG. 40 is a block diagram showing an example of the configuration of a Tc generation unit.

FIG. 40 is a block diagram showing an example of the configuration of the Tc generation unit.

In the example shown in FIG. 40, the Tc generation unit 312 is configured to include a TcLUT_input calculation unit 331 and a Tc generation processing unit 332.

The quantization parameter QP from the average QP calculation unit 111b is supplied to the TcLUT_input calculation unit 331. The value (dblk_offset_div2) of the deblocking offset of the information set by the configuration setting unit 301 is supplied to the TcLUT_input calculation unit 331.

The TcLUT_input calculation unit 331 calculates Tamp by adding the quantization parameter QP from h average QP calculation unit 111b and the value of the deblocking offset, and supplies the calculated Tctmp to the Tc generation processing unit 332.

The Tc generation processing unit 332 has a TcLUT (Look Up Table) defined in the HEVC method, for example. The Tc generation processing unit 332 receives Tctmp from the TcLUT_input calculation unit 331 as TcLUT_input qp, calculates Tc using TcLUT, and supplies the calculated Tc to the filtering determination unit 114.

In addition, for the example of the configuration of the filter execution unit that performs filtering of the color difference boundary, the Tc generation unit 113 in the filter execution unit 102 described above with reference to FIG. 22 is just replaced with the Tc generation unit 312 shown in FIG. 38. Accordingly, the explanation will be omitted.

[Operation of the Deblocking Filter]

Figure 41:
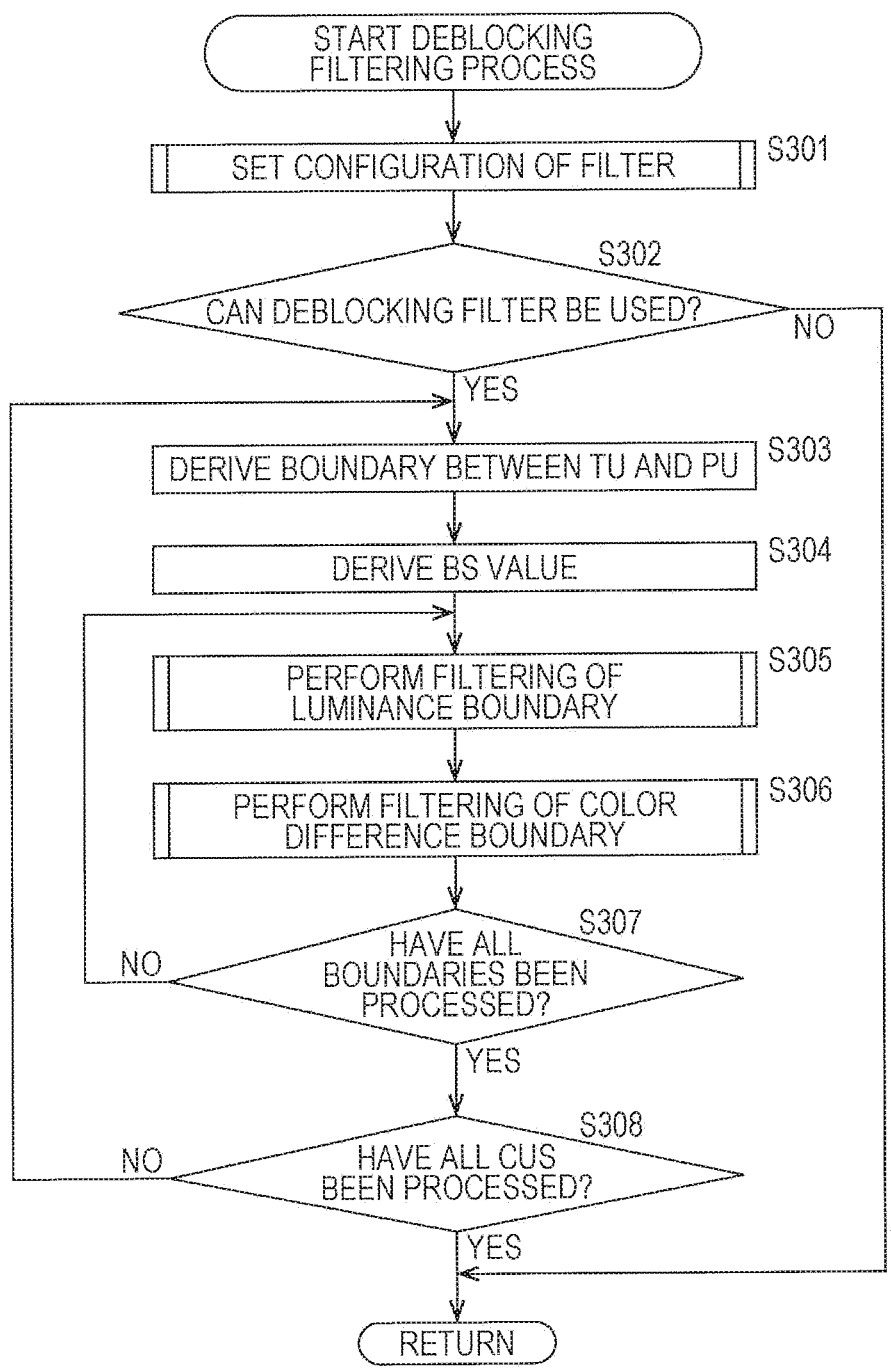
FIG. 41 is a flowchart illustrating the deblocking filtering process.

Next, a deblocking filtering process will be described with reference to the flowchart shown in FIG. 41. In addition, processing in steps S302 to S308 of FIG. 41 is basically the same as the process in steps S102 to 108 of FIG. 23. However, in the filtering of each boundary in steps S305 and S306, the β generation processing in step S123 and Tc generation processing in step S124 of FIG. 24 are different. Therefore, the details will be described later with reference to FIGS. 43 and 44.

For example, DisableDeblockingFilter flag information (that is, ON/OFF information) and the value of the deblocking offset are input through an operation unit (or the lossless decoder 62) that is not shown in the diagram.

In step S301, the configuration setting unit 301 sets the configuration of a filter. The details of the configuration setting process will be described later with reference to FIG. 42. A configuration is set in step S301. In this case, DisableDeblockingFilter flag information is set and the value (dblk_offset_div2) of the deblocking offset is set.

Figure 29:
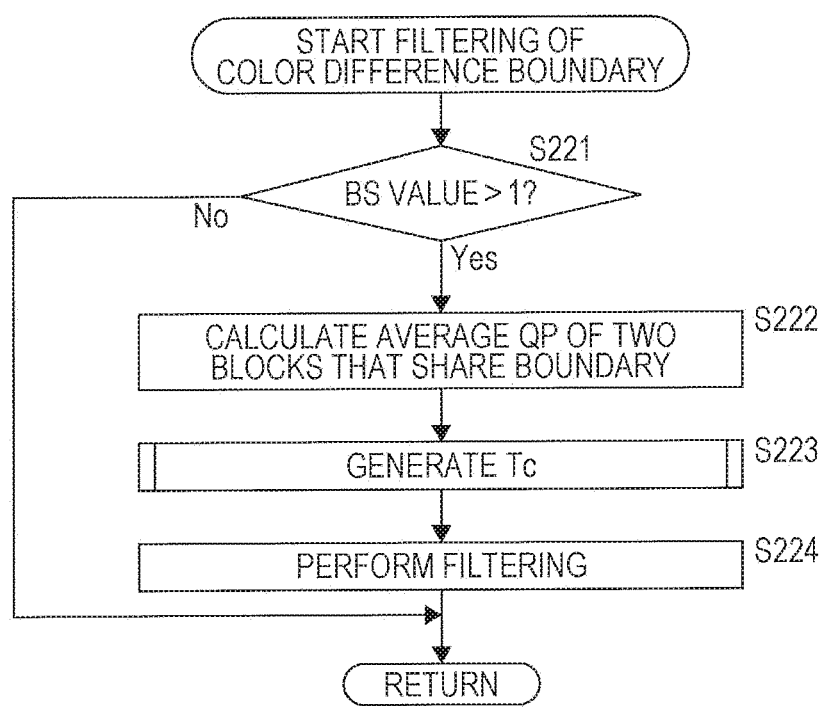
FIG. 29 is a flowchart illustrating the filtering of the color difference boundary.

The value of the deblocking offset set herein is used in the β generation processing in step S123 and the Tc generation processing in step S124 of FIG. 24 and the Tc generation processing in step S223 of FIG. 29, which describe the processing in step S305.

In step S302, the configuration setting unit 301 determines whether or not a deblocking filter can be used based on the DisableDeblockingFilter flag information. When it is determined in step S302 that a deblocking filter cannot be used, the deblocking filtering process is ended.

When it is determined in step S302 that a deblocking filter can be used, the process proceeds to step S303.

In step S303, the configuration setting unit 301 derives the boundary between the TU and the PU. In step S304, the configuration setting unit 301 derives a BS value based on the information of the boundary between the TU and the PU derived in step S303, prediction mode information, and the like. The configuration setting unit 301 supplies the information of the BS value to the QP calculation unit 111 of the filter execution unit 302.

In step S305, the filter execution unit 302 performs filtering of the luminance (LUMA) boundary. Although the explanation of this processing will be omitted since it was described above with reference to FIG. 24, filtering is performed on the luminance boundary by the processing in step S105.

In step S306, the filter execution unit 302 performs filtering of the color difference (CHROMA) boundary. Although the explanation of this processing will be omitted since it was described above with reference to FIG. 29, filtering is performed on the color difference boundary: by the processing in step S106.

In step S307, the filter execution unit 302 determines whether all boundaries have been processed. When it is determined in step S307 that all boundaries have not been processed, the process returns to step S305 to repeat the subsequent processes.

When it is determined in step S307 that all boundaries have been processed, the process proceeds to step S108.

In step S308, the configuration setting unit 301 determines whether all CUs have been processed. When it is determined in step S308 that all CUs have not been processed, the process returns to step S303 to repeat the subsequent processes.

When it is determined in step S308 that all CUs have been processed, the deblocking filtering process is ended.

[Configuration Process of a Filter]

Figure 42:
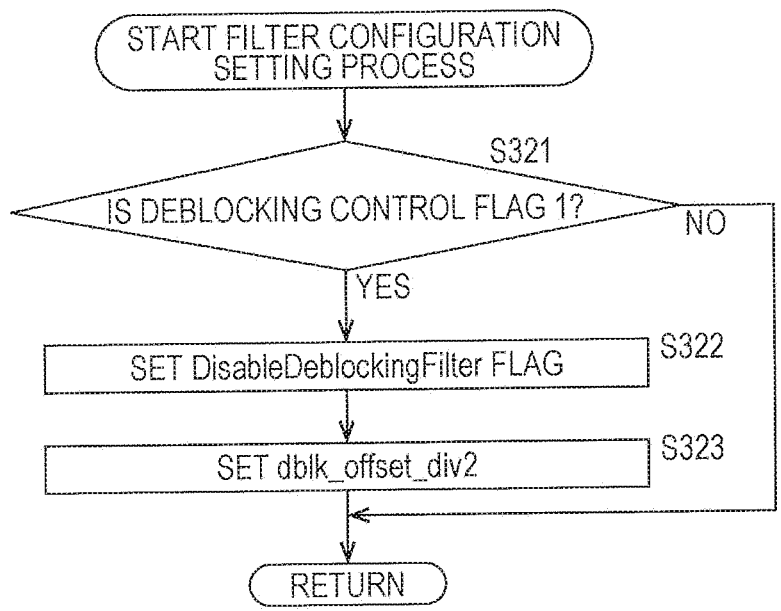
FIG. 42 is a flowchart illustrating the configuration setting process of a filter.

Next, the configuration setting process of a filter in step S301 of FIG. 41 will be described with reference to the flowchart shown in FIG. 42.

Information of the deblocking control flag, DisableDeblockingFilter flag information (that is, ON/OFF information), and the value of the deblocking offset are input through an operation unit (or the lossless decoder 62) that is not shown in the diagram.

In step S321, the configuration setting unit 301 determines whether or not the deblocking control flag is 1. When it is determined in step S321 that the deblocking control flag is 1, the process proceeds to step S322.

When the deblocking control flag is 1, the DisableDeblockingFilter flag and the deblocking offset can be transmitted. Accordingly, in step S322, the configuration setting unit 301 reads and sets the DisableDeblockingFilter flag.

In step S323, the configuration setting unit 301 reads and sets the value (dblk_offset_div2) of the deblocking offset.

On the other hand, when it is determined in step S321 that the deblocking control flag is 0, the configuration setting process is ended. That is, when it s determined in step S321 that the deblocking control flag is 0, the DisableDeblockingFilter flag and the deblocking offset are not transmitted. Accordingly, the DisableDeblockingFilter flag and the deblocking offset are not set and the default values are used.

[β Generation Process]

Figure 43:
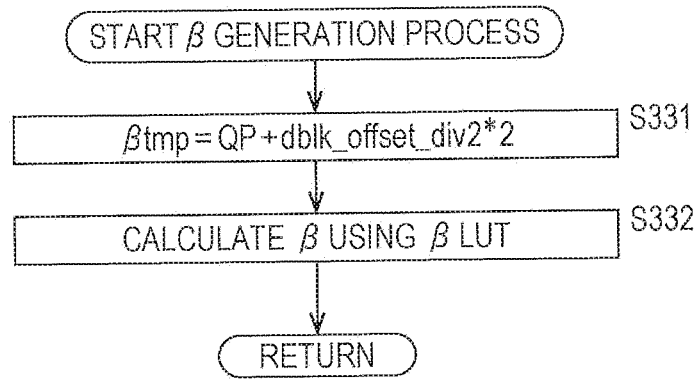
FIG. 43 is a flowchart illustrating the β generation process.

Next, the β generation process in step S123 of FIG. 24 will be described with reference to the flowchart shown in FIG. 43.

The value (dblk_offset_div2) of the deblocking offset is input to the β LUT_input calculation unit 321 from the configuration setting unit 301. In step S331, the β LUT_input calculation unit 321 calculates βtmp=QP+dblk_offset_div2*2, which is a value β LUT_input qp that is input to the β generation processing unit 322, and supplies the calculated βtmp to the β generation processing unit 322.

In addition, similarly to the β offset value described above, in practice, the deblocking offset value (dblk_offset_div2) is halved and transmitted, and is doubled and used when calculating β LUT_input qp in step S331.

In step S332, the β generation processing unit 322 receives 13 tmp calculated by the β LUT_input calculation unit 321 as β LUT_input qp, calculates β using βLUT, and supplies the calculated β to the filtering determination unit 114.

[Tc Generation Process]

Figure 44:
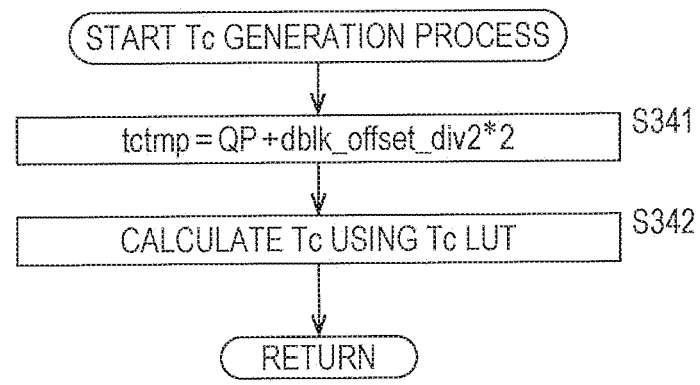
FIG. 44 is a flowchart illustrating the Tc generation process.

Next, the Tc generation process in step S124 of FIG. 24 will be described with reference to the flowchart shown in FIG. 44.

The value (dblk_offset_div2) of the deblocking offset is input to the TcLUT_input calculation unit 331 from the configuration setting unit 301. In step S341, the TcLUT_input calculation unit 331 calculates Tctmp=QP+dblk_offset_div2*2, which is a value TcLUT_input qp that is input to the Tc generation processing unit 332, and supplies the calculated Tamp to the Tc generation processing unit 332.

In addition, similarly to the β offset value described above, in practice, the deblocking offset value (dblk_offset_div2) is halved and transmitted, and is doubled and used when calculating TcLUT_input qp in step S341.

In step S342, the Tc generation processing unit 332 receives Tctmp calculated by the TcLUT_input calculation unit 331 as TcLUT_input qp, calculates Tc using TcLUT, and supplies the calculated Tc to the filtering determination unit 114.

[Transmission of the Value (dblk_offset_div2) of the Deblocking Offset]

Figure 45:
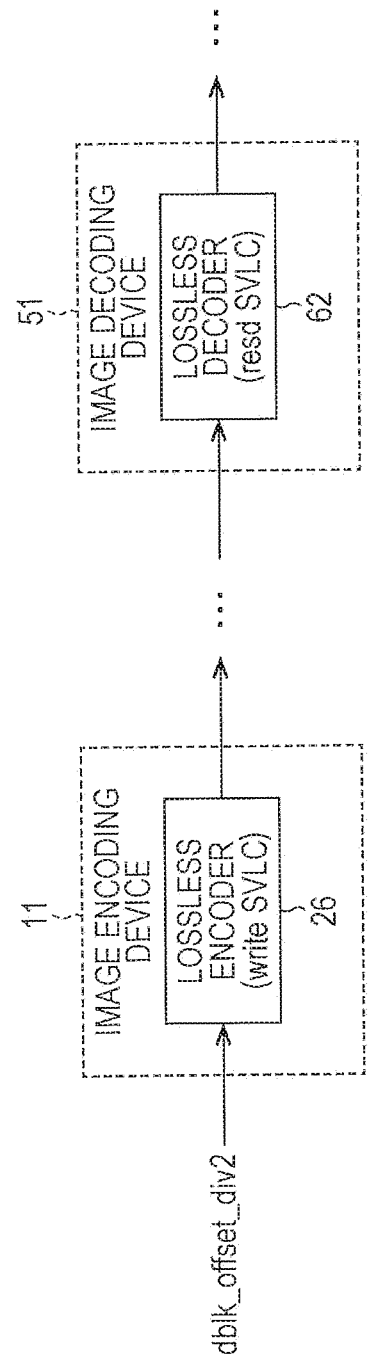
FIG. 45 is a diagram illustrating the transmission of the offset.

Next, transmission of the value (dblk_offset_div2) of the deblocking offset will be described with reference to FIG. 45.

In the image encoding device 11, the value (dblk_offset_div2) of the deblocking offset is input to the deblocking filter 31a and the lossless encoder 26 through an operation unit (not shown). The value (dblk_offset_div2) of the deblocking offset is used for filtering in the deblocking filter 31a, and is encoded by writing SVLC (Sin VLC) in the lossless encoder 26. The encoded value (dblk_offset_div2) of the deblocking offset is transmitted to the image decoding device 51 as a parameter of the deblocking filter.

The value (dblk_offset_div2) of the deblocking offset transmitted from the image encoding device 11 is decoded by reading SVLC (Sin VLC) in the lossless decoder 62 of the image decoding device 51, and is used for filtering in the deblocking filter 31b.

[Example of the Syntax of the Value of the Deblocking Offset]

FIG. 46 is a diagram showing an example of the syntax of the value of the deblocking offset.

In the example shown in FIG. 46, the value (dblk_offset_div2) of the deblocking offset is described in the if statement of disaeble_deblocking_filter_flag, and the value of dblk_offset_div2 is used if disaeble_deblocking_filter_flag is not 0.

In addition, this syntax is described in a slice header and a PPS (picture parameter set).

As described above, by using the offset value common in the parameters β and Tc, one element of the syntax can be reduced, and the deblocking filter strength can be easily controlled.

Next, an example will be described in which, when encoding the offsets of the parameters β and Tc, the offset of the parameter β and the difference between the offset of the parameter β and the offset of the parameter Tc are encoded and transmitted.

8. Sixth Embodiment (Second Offset Transmission Method)

[Example of the Configuration of the Deblocking Filter]

Figure 47:
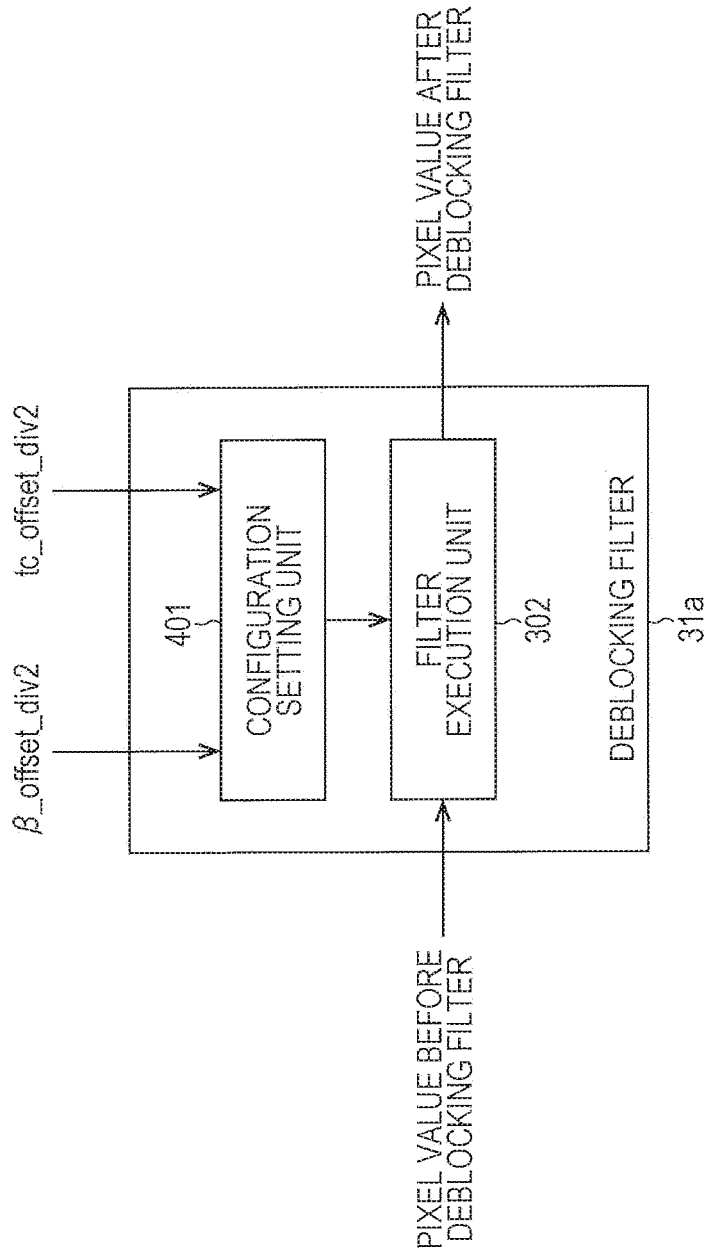
FIG. 47 is a block diagram showing an example of the configuration of a deblocking filter to which the present technique is applied.

FIG. 47 is a block diagram showing an example of the configuration of the deblocking filter in the image encoding device.

In the example shown in FIG. 47, the deblocking filter 31a is configured to include a configuration setting unit 401 and a filter execution unit 302.

The offset value (β_offset_div2) of the parameter β and the offset value (tc_offset_div2) of the parameter tc are input to the configuration setting unit 401.

The configuration setting unit 401 receives DisableDeblockingFilter flag information (that is, ON/OFF information), the offset value of the parameter and the offset value of the parameter tc that are input from an operation unit (not show for example. The configuration setting unit 401 performs a configuration setting in the deblocking filter 31a based on the input information. That is, in the configuration setting unit 401, the offset values of β and tc of the deblocking filter are set. The configuration setting unit 401 supplies the set information to the filter execution unit 302.

In addition, in this case, the configuration setting unit 401 generates difference information (diff_β_tc_div2) between the offset value (β_offset_div2) of the parameter β and the offset value (tc_offset_div2) of the parameter tc. The configuration setting unit 401 supplies the generated difference information and the offset value of the parameter β to the lossless encoder 26.

The filter execution unit 302 is basically the same as the filter execution unit 302 shown in FIG. 37. The filter execution unit 302 calculates the quantization parameter QP, which is used to generate parameters, based on the information set by the configuration setting unit 401, such as the value of the deblocking offset, generates the parameters β and Tc, and determines whether or not filtering is required or the filter strength.

In this case, in the filter execution unit 302 shown in FIG. 37, the value (dblk_offset_div2) of the deblocking offset is used. On the other hand, in the filter execution unit 302 shown in FIG. 47, the difference is that the offset value (β_offset_div2) of the parameter β and the offset value (tc_offset_div2) of the parameter tc are used. Therefore, an example of the configuration of the filter execution unit 302 in the example of FIG. 47 and an example of the configuration of each unit, which forms the filter execution unit 302, will be omitted.

In addition, the deblocking filtering process of the deblocking filter 31a shown in FIG. 47 is basically the same as the process described above with reference to FIG. 41 except for the configuration setting process of the filter in step S301. Therefore, the configuration setting process of the filter in step S301 of FIG. 41, which is a different process, will be described with reference to FIG. 48.

[Configuration Process of a Filter]

Figure 48:
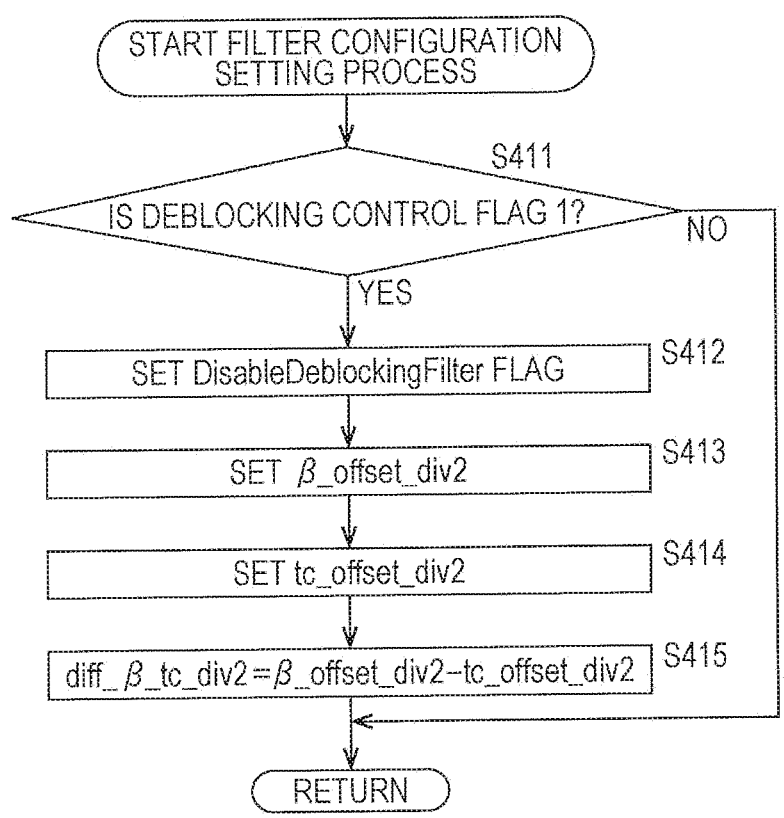
FIG. 48 is a flowchart illustrating the configuration setting process of a filter.

Next, the configuration setting process of a filter in step S301 of FIG. 41 will be described with reference to the flowchart shown in FIG. 48.

Information of the deblocking control flag, DisableDeblockingFilter flag information (that is, ON/OFF information), and the offset values of the parameters β and tc are input through an operation unit (not shown).

In step S411, the configuration setting unit 401 determines whether or not the deblocking control flag is 1. When it is determined in step S411 that the deblocking control flag is 1, the process proceeds to step S412.

When the deblocking control flag is 1, the DisableDeblockingFilter flag and the offset can be transmitted. Accordingly, in step S412, the configuration setting unit 401 reads and sets the DisableDeblockingFilter flag.

In step S413, the configuration setting unit 401 reads and sets the offset value (β_offset_div2) of the parameter β.

In step S414, the configuration setting 401 reads and sets the offset value (tc_offset_div2) of the parameter tc.

In step S415, the configuration setting unit 401 generates diff_βtc_div2 that is a difference between the offset value of the parameter η and the offset value of the parameter Tc. The configuration setting unit 401 supplies the generated difference information diff_β_tc_div2 to the lossless encoder 26 together with the offset value of the parameter β.

On the other hand, when it is determined in step S411 that the deblocking control flag is 0, the configuration setting process is ended. That is, when it is determined in step S411 that the deblocking control flag is 0, the DisableDeblockingFilter flag and the offset are not transmitted. Accordingly, the DisableDeblockingFilter flag and the offset are not set and the default values are used.

[Example of the Configuration of the Deblocking Filter]

Figure 49:
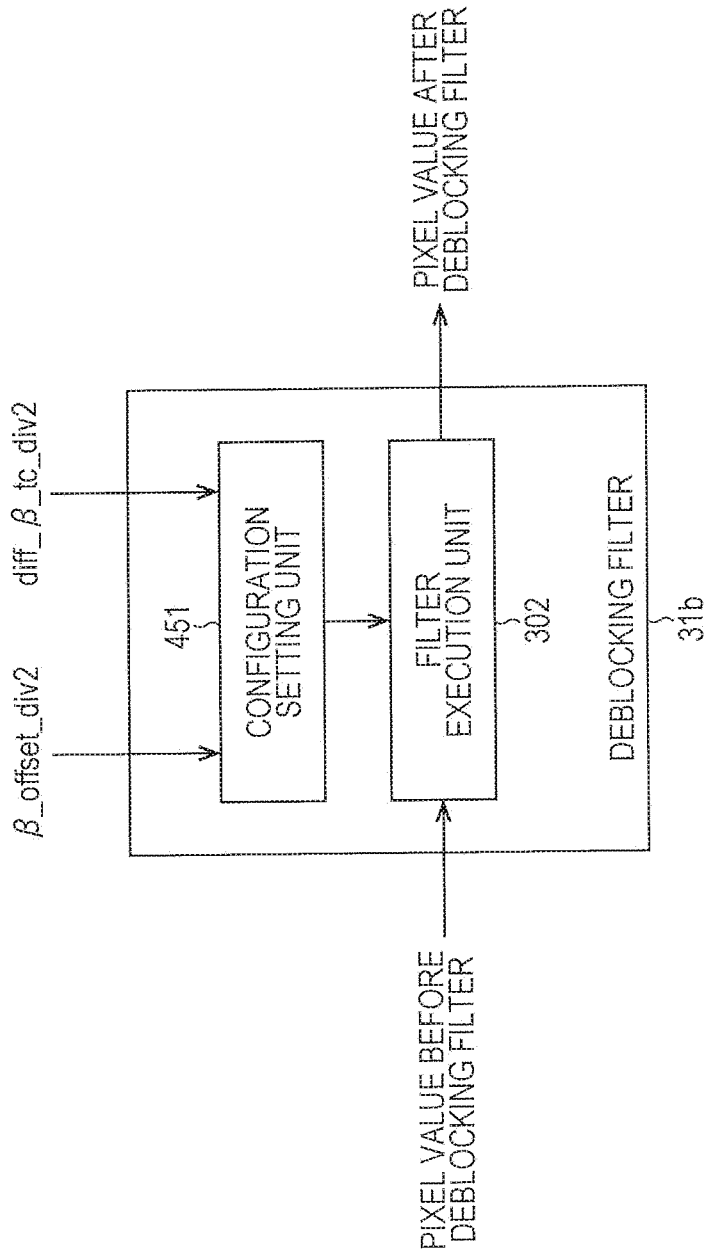
FIG. 49 is a block diagram showing an example of the configuration of a deblocking filter to which the present technique is applied.

FIG. 49 is a block diagram showing an example of the configuration of the deblocking filter in the image decoding device.

In the example shown in FIG. 49, the deblocking filter 31b is configured to include a configuration setting unit 451 and a filter execution unit 302.

The offset value (β_offset_div2) of the parameter β and the difference information (diff_β_tc_div2) between the offset value of the parameter β and the offset value of the parameter Tc are input to the configuration setting unit 451.

The configuration setting unit 451 receives DisableDeblockingFilter flag information (that is, ON/OFF information), the offset value of the parameter β, and the difference information that are input from the lossless decoder 62, for example. The configuration setting unit 451 performs a configuration setting in the deblocking filter 31b based on the input information. That is, in the configuration setting unit 451, the offset values of β and tc of the deblocking filter are set. In addition, in this case, the offset value of Tc is calculated and set by adding the difference information and the offset value of β. The configuration setting unit 451 supplies the set information to the filter execution unit 302.

The filter execution unit 302 is basically the same as the filter execution unit 302 shown in FIG. 37. The filter execution unit 302 calculates the quantization parameter QP, which is used to generate parameters, based on the information set by the configuration setting unit 301, such as the value of the deblocking offset, generates the parameters β and Tc, and determines whether or not filtering is required or the filter strength.

In this case, in the filter execution unit 302 shown in FIG. 37, the value (dblk_offset_div2) of the deblocking offset is used. On the other hand, in the filter execution unit 302 shown in FIG. 49, the difference is that the offset value (β_offset_div2) of the parameter β and the offset value (tc_offset_div2) of the parameter Tc are used. Therefore, an example of the configuration of the filter execution unit 302 in the example of FIG. 49 and an example of the configuration of each unit, which forms the filter execution unit 302, will be omitted.

In addition, the deblocking filtering process of the deblocking filter 31b shown in FIG. 49 is basically the same as the process described above with reference to FIG. 41 except for the configuration setting process of the filter in step S301. Therefore, the configuration setting process of the filter in step S301 of FIG. 41, which is a different process, will be described with reference to FIG. 50.

[Configuration Process of a Filter]

Figure 50:
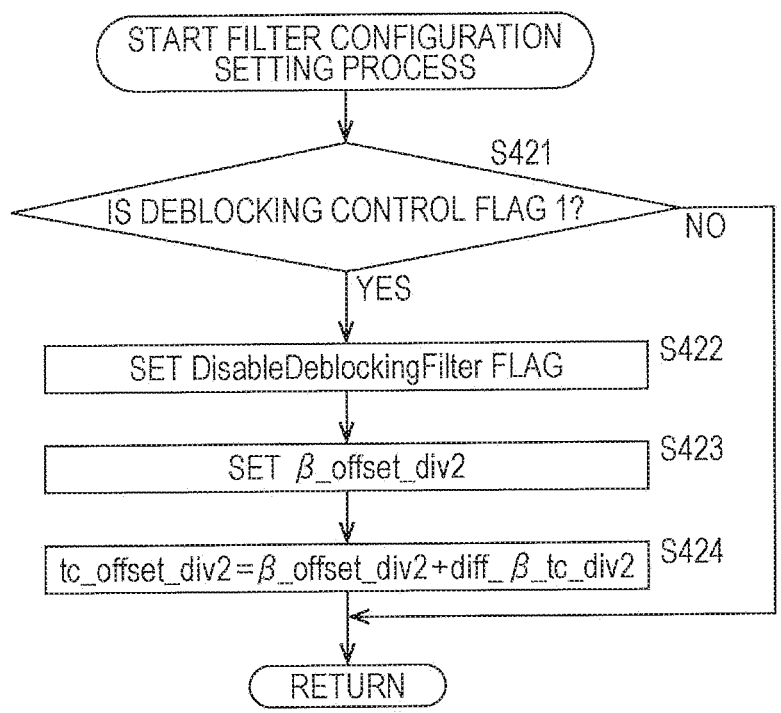
FIG. 50 is a flowchart illustrating the configuration setting process of a filter.

Next, the configuration setting process of a filter in step S301 of FIG. 41 will be described with reference to the flowchart shown in FIG. 50.

Information of the deblocking control flag, DisableDeblockingFilter flag information (that is, ON/OFF information), the offset value (β_offset_div2) of the parameter β, and the difference information (diff_βtc_div2) are input through the lossless decoder 62.

In step S421, the configuration setting unit 451 determines whether or not the deblocking control flag is 1. When it is determined in step S421 that the deblocking control flag is 1, the process proceeds to step S422.

When the deblocking control flag is 1, the DisableDeblockingFilter flag and the offset can be transmitted. Accordingly, in step S422, the configuration setting unit 451 reads and sets the DisableDeblockingFilter flag.

In step S423, the configuration setting unit 451 reads and sets the offset value (β_offset_div2) of the parameter β.

In step S424, the configuration setting unit 451 calculates and sets the offset value (tc_offset_div2) of the parameter Tc by adding the offset value (β_offset_div2) of the parameter β to the difference information diff_β_tc_div2.

On the other hand, when it is determined in step S421 that the deblocking control flag is 0, the configuration setting process is ended. That is, when it is determined in step S421 that the deblocking control flag is 0, the DisableDeblockingFilter flag and the offset are not transmitted. Accordingly, the DisableDeblockingFilter flag and the offset are not set and the default values are used.

[Transmission of an Offset Value and Difference Information]

Figure 51:
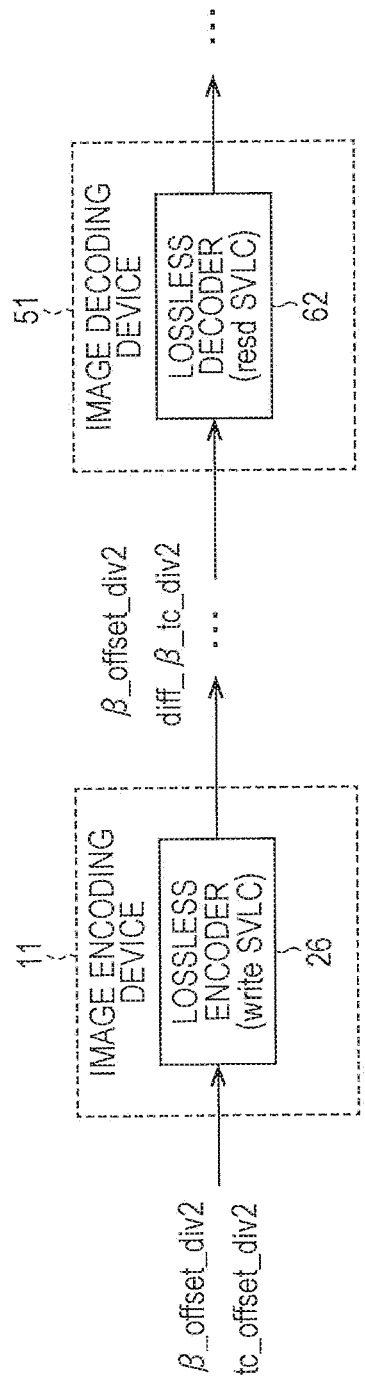
FIG. 51 is a diagram illustrating the transmission of the offset.

Next, transmission of the offset value (β_offset_div2) and the difference information (diff_β_tc_div2) will be described with reference to FIG. 51.

In the image encoding device 11, the offset value (β_offset_div2) of β and the offset value (tc_offset_div2) of Tc are input to the deblocking filter 31a through an operation unit (not shown). In the deblocking filter 31a, filtering is performed by using the offset value (β_offset_div2) of β and the offset value (tc_offset_div2) of tc.

In addition, in the deblocking filter 31a, difference information (diff_βtc_div2) is generated, and the offset value (β_offset_div2) of β and the difference information (diff_β_tc_div2) are supplied to the lossless encoder 26. Then, the offset value (β_offset_div2) of β and the difference information (diff_β_tc_div2) are encoded by writing SVLC (Sin VLC) in the lossless encoder 26, and is transmitted to the image decoding device 51 as a parameter of the deblocking filter.

The offset value (β_offset_div2) of β and the difference information (diff_β_tc_div2) transmitted from the image encoding device 11 is decoded by reading SVLC (Sin VLC) in the lossless decoder 62 of the image decoding device 51, and these are used in the deblocking filter 31b and the offset value (tc_offset_div2) of Tc is calculated. Then, in the deblocking filter 31b, the offset value (β_offset_div2) of β and the calculated offset value (tc_offset_div2) of Tc are used for filtering.

In addition, although the example where difference information between the offset values of two parameters is generated in the configuration setting unit 401 and is supplied to the lossless encoder 26 has been described above, the difference information may be generated in the lossless encoder 26.

[Example of the Syntax of the Value of the Deblocking Offset]

FIG. 52 is a diagram showing an example of the syntax of the value of the deblocking offset.

In the example shown in FIG. 52, the value (beta_offset_div2) of the β offset and the difference information (diff_beta_tc_div2) are described in the if statement of disaeble_deblocking_filter_flag. Accordingly, if disaeble_deblocking_filter_flag is not 0, the value (beta_offset_div2) of the β offset and the difference information (diff_beta_tc_div2) are used.

In addition, this syntax is described in a slice header and a PPS (picture parameter set).

In addition, although the offset of β is transmitted together with difference information in the above explanation, it is also possible to transmit the offset of Tc. In this case, on the decoding side, the offset of β is calculated from the difference information and the offset of tc.

As described above, instead of transmitting the offsets of two parameters, it is also possible to transmit the offset value of one of the parameters and the difference information between the offsets of the one parameter and the other parameter.

Since there is a correlation between the value of the offset of the parameter β and the value of the offset of the parameter Tc, these values are interlocked in many cases. In this case, since the difference information is a small value, it is possible to reduce the number of bits during encoding.

In the above, the HEVC method has been used as a basis of the encoding method. However, the present disclosure is not limited thereto, and other encoding methods/decoding methods including at least a deblocking filter can be applied as an in-loop filter.

The present disclosure can be applied to image encoding devices and image decoding devices used for receiving image information (bit stream) compressed using orthogonal transform such as discrete cosine transform and motion compensation as in the HEVC method, for example, via network media such as satellite broadcasting, cable television, the Internet, or portable telephone devices. The present disclosure can also be applied to image encoding devices and image decoding devices that are used when compressed image information is processed on a storage medium such as an optical or magnetic disk or a flash memory.

9. Seventh Embodiment (Multi-View Image Encoding/Multi-View Image Decoding Device)

[Applications to Multi-View Image Encoding and Multi-View Image Decoding]

Figure 53:
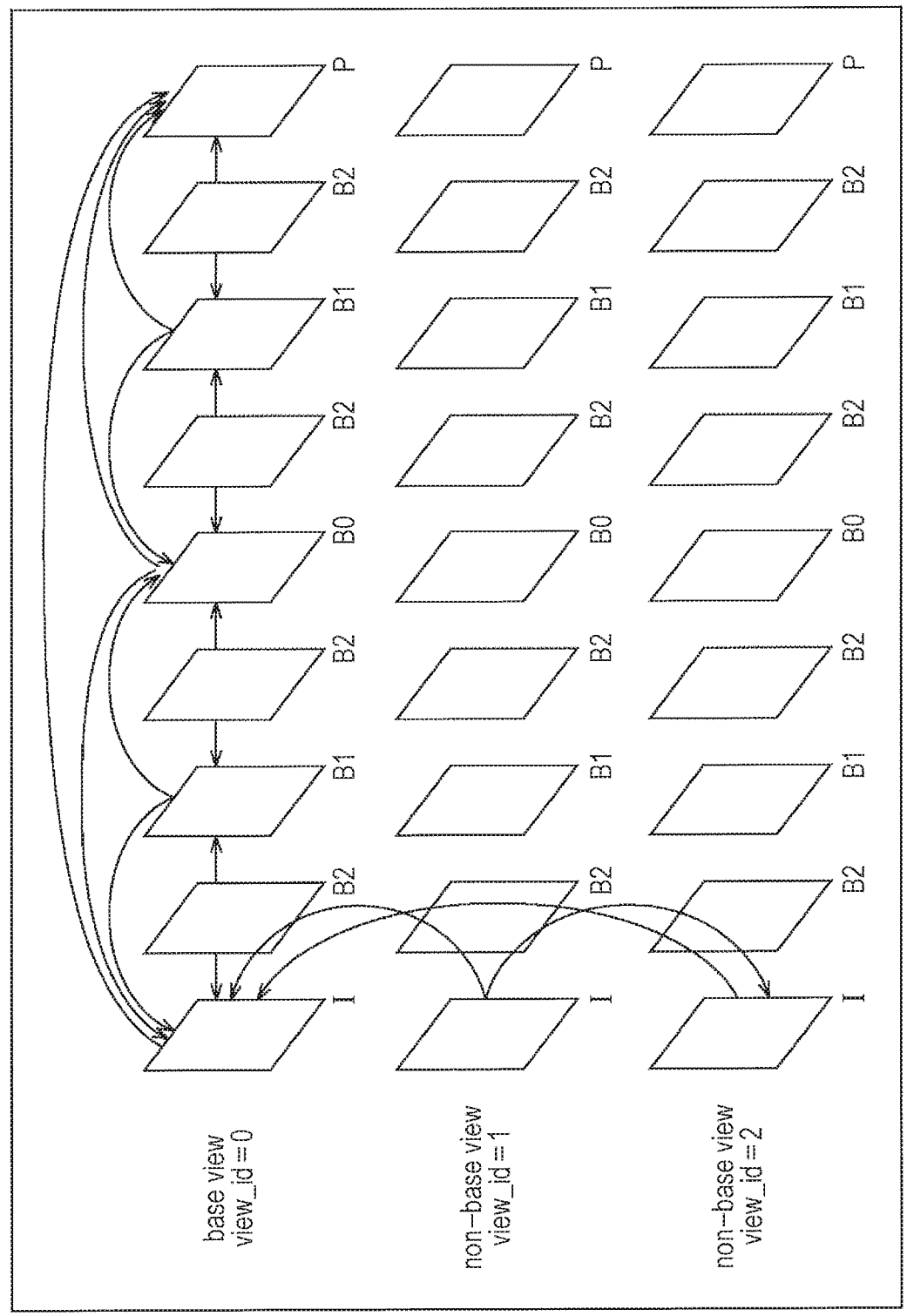
FIG. 53 is a diagram showing an example of a multi-view image encoding method.

The series of processes described above can be applied to multi-view image encoding and multi-view image decoding. FIG. 53 shows an example of a multi-view image encoding method.

As shown in FIG. 53, a multi-view image includes images of a plurality of views, and an image of one predetermined view of the plurality of views is designated as an image of a base view. An image of each view other than the image of the base view is treated as an image of a non-base view.

When performing multi-view image encoding as shown in FIG. 53, deblocking filter parameters (a flag, an offset value of a parameter, difference information, and the like) can be set in each view (the same view). In addition, in each view (different views), it is also possible to share deblocking filter parameters set in other views.

In this case, a deblocking filter parameter set in the base view is used in at least one non-base view. Alternatively, for example, a deblocking filter parameter set in the non-base view (view_id=i) is used in at least one of the base view and the non-base view (view_id=j).

Therefore, in deblocking filtering, the filtering process can be appropriately applied. That is, it is possible to suppress block noise.

[Multi-View Image Encoding Device]

Figure 54:
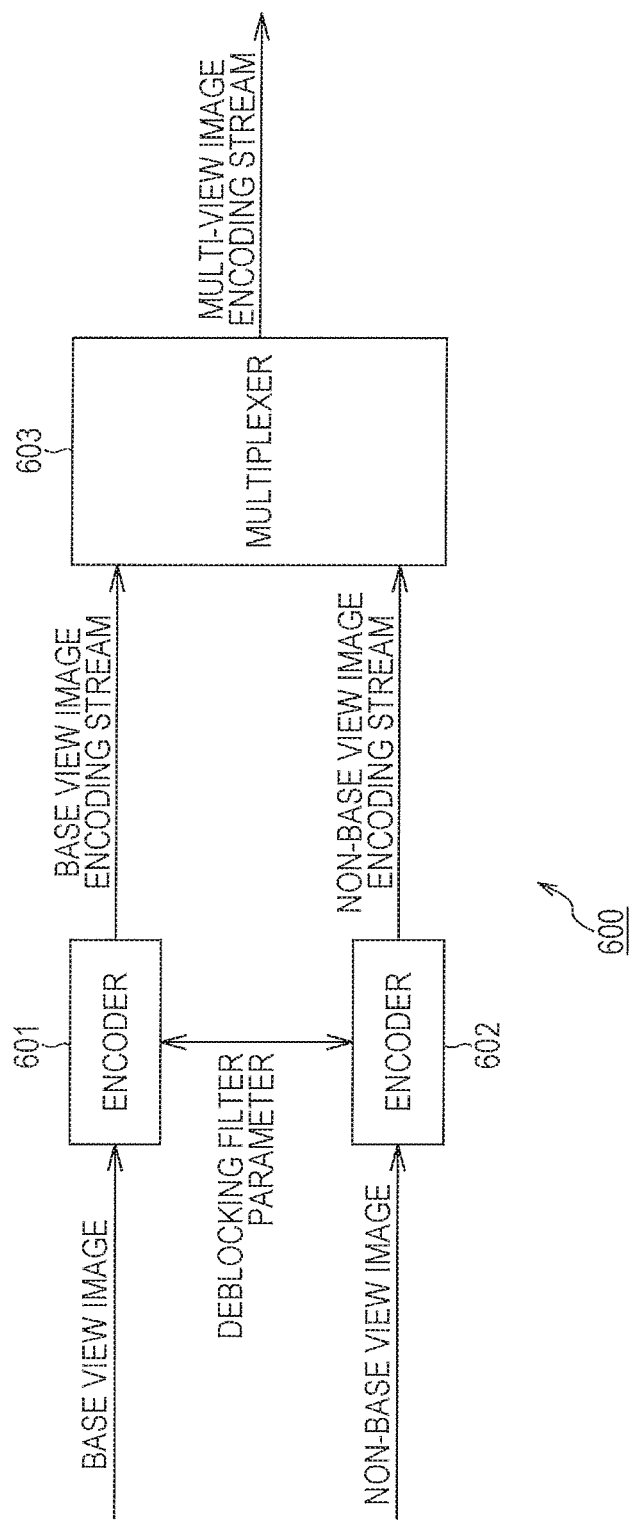
FIG. 54 is a diagram showing an example of the main configuration of a multi-view image encoding device to which the present technique is applied.

FIG. 54 is a diagram showing a multi-view image encoding device that performs the multi-view image encoding described above. As shown in FIG. 54, a multi-view image encoding device 600 includes encoders 601 and 602 and a multiplexer 603.

The encoder 601 encodes a base view image to generate a base view image encoding stream. The encoder 602 encodes a non-base view image to generate a non-base view image encoding stream. The multiplexer 603 generates a multi-view image encoding stream by multiplexing the base view image encoding stream generated by the encoder 601 and the non-base view image encoding stream generated by the encoder 602.

For the encoders 601 and 602 of the multi-view image encoding device 600, the image encoding device 11 (FIG. 1) can be applied. In this case, the multi-view image encoding device 600 sets and transmits a deblocking filter parameter set by the encoder 601 and a deblocking filter parameter set by the encoder 602.

In addition, the deblocking filter parameter set by the encoder 601 as described above may be set and transmitted so as to be shared between the encoders 601 and 602. Conversely, the deblocking filter parameter set together by the encoder 602 may be set and transmitted so as to be shared between the encoders 601 and 602.

[Multi-View Image Decoding Device]

Figure 55:
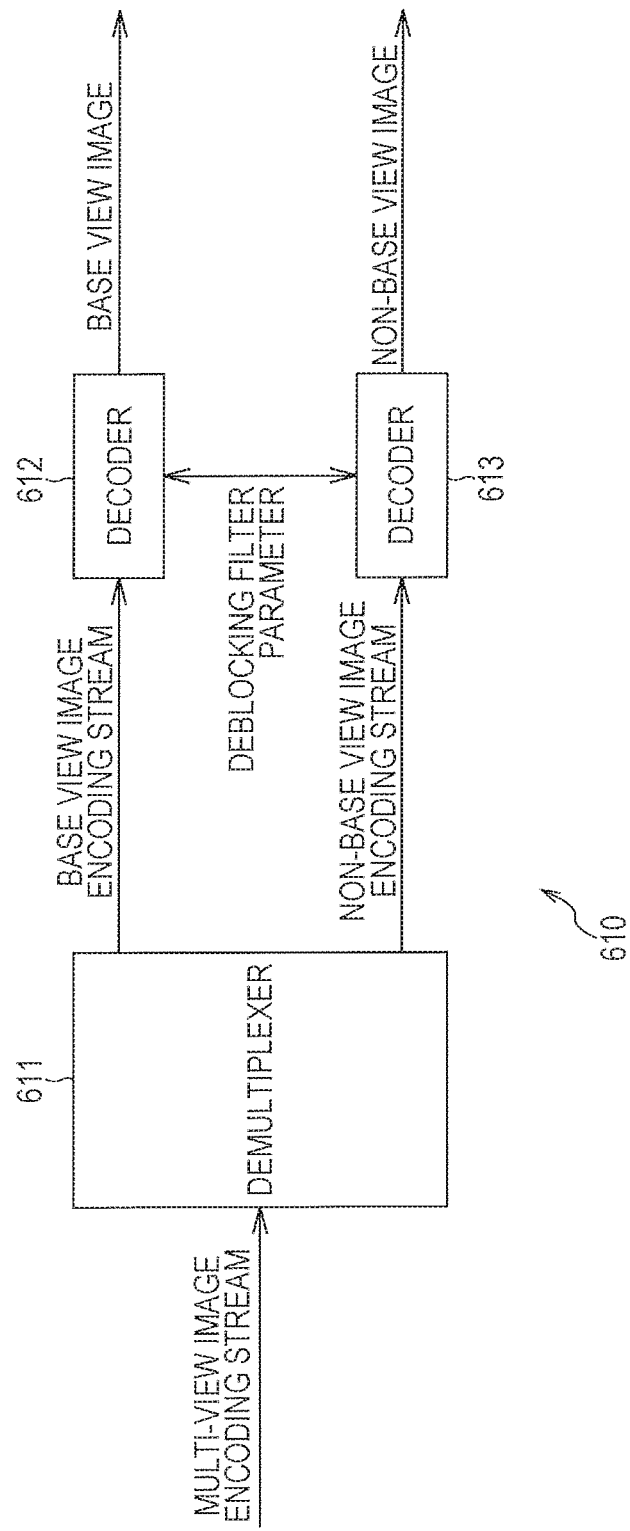
FIG. 55 is a diagram showing an example of the main configuration of a multi-view image decoding device to which the present technique is applied.

FIG. 55 is a diagram showing a multi-view image decoding device that performs the multi-view image decoding described above. As shown in FIG. 55, a multi-view image decoding device 610 includes a demultiplexer 611 and decoders 612 and 613.

The demultiplexer 611 demultiplexer a multi-view image encoding stream, in which a base view image encoding stream and a non-base view image encoding stream are multiplexed, to extract the base view image encoding stream and the non-base view image encoding stream. The decoder 612 obtains a base view image by decoding the base view image encoding stream extracted by the demultiplexer 611.

The decoder 613 obtains a non-base view image by decoding the non-base view image encoding stream extracted by the demultiplexer 611.

For the decoders 612 and 613 of the multi-view image decoding device 610, the image decoding device 51 (FIG. 3) can be applied. In this case, the multi-view image decoding device 610 performs a process using the deblocking filter parameter, which is set by the encoder 601 and decoded by the decoder 612, and the deblocking filter parameter, which is set by the encoder 602 and decoded by the decoder 613.

In addition, the deblocking filter parameter set by the encoder 601 (or encoder 602) as described above may be set and transmitted so as to be shared between the encoders 601 and 602. In this case, the multi-view image decoding device 610 performs a process using the deblocking filter parameter set by the encoder 601 (or the encoder 602) and decoded by the decoder 612 (or the decoder 613).

10. Eighth Embodiment (Hierarchical Image Encoding/Hierarchical Image Decoding Device)

[Applications to Hierarchical Image Encoding and Hierarchical Image Decoding]

Figure 56:
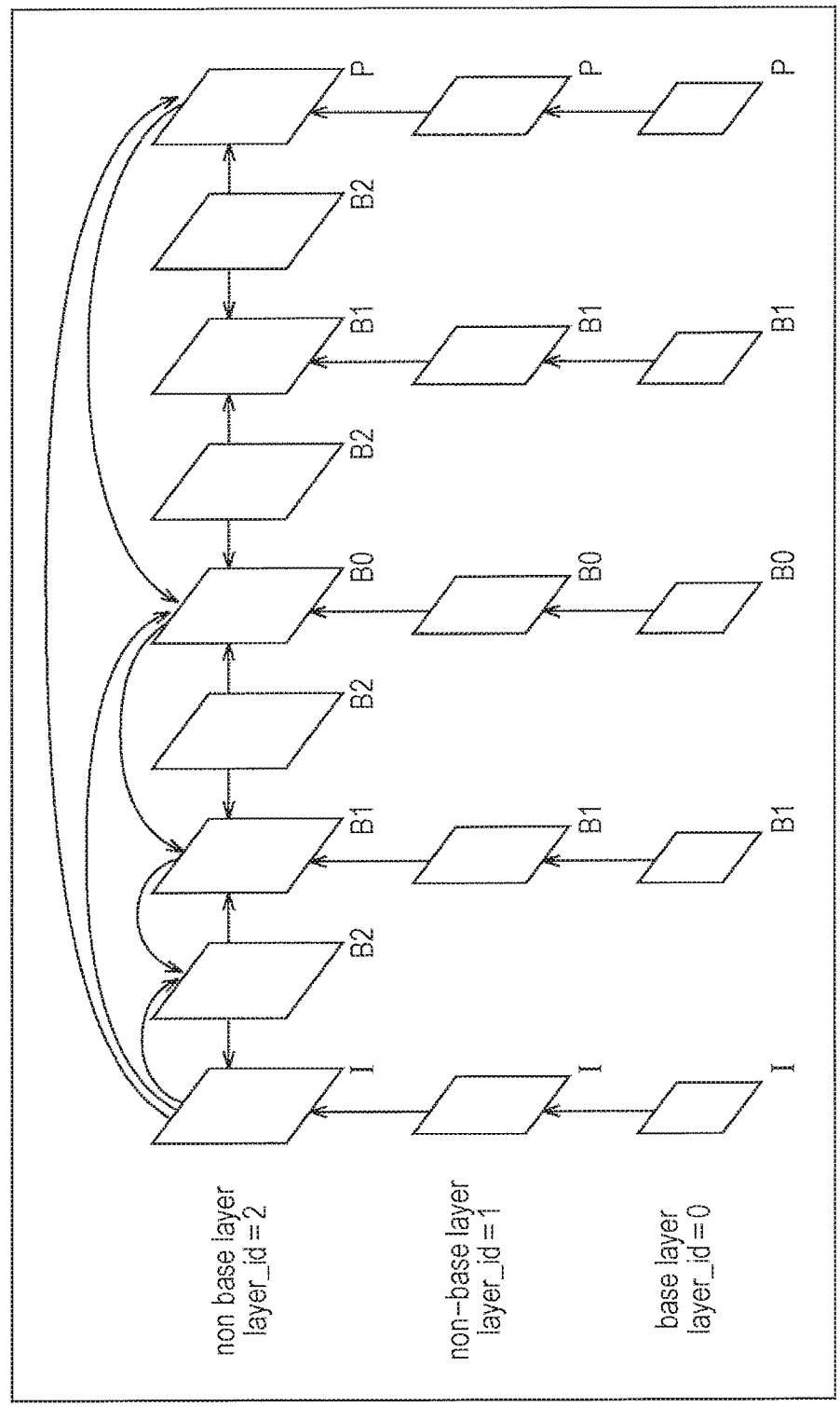
FIG. 56 is a diagram showing an example of a hierarchical image encoding method.

The series of processes described above can be applied to hierarchical image encoding and hierarchical image decoding. FIG. 56 shows an example of a multi-view image encoding method.

As shown in FIG. 56, a hierarchical image includes images of a plurality of hierarchies (resolutions), and an image of one predetermined hierarchy of the plurality of resolutions is designated as an image of a base layer. An image of each hierarchy other than the image of the base layer is treated as an image of a non-base layer.

When performing hierarchical image encoding (spatial scalability) as shown in FIG. 56 a deblocking filter parameter can be set in each layer (the same layer). In addition, in each layer (different layers), it is also possible to share deblocking filter parameters set in other layers.

In this case, a deblocking filter parameter set in the base layer is used in at least one non-base layer. Alternatively, for example, a deblocking filter parameter set in the non-base layer (layer_id=i) is used in at least one of the base layer and the non-base layer (layer_id=j).

Therefore, in the deblocking process, filtering can be appropriately applied. That is, it is possible to suppress block noise.

[Hierarchical Image Encoding Device]

Figure 57:
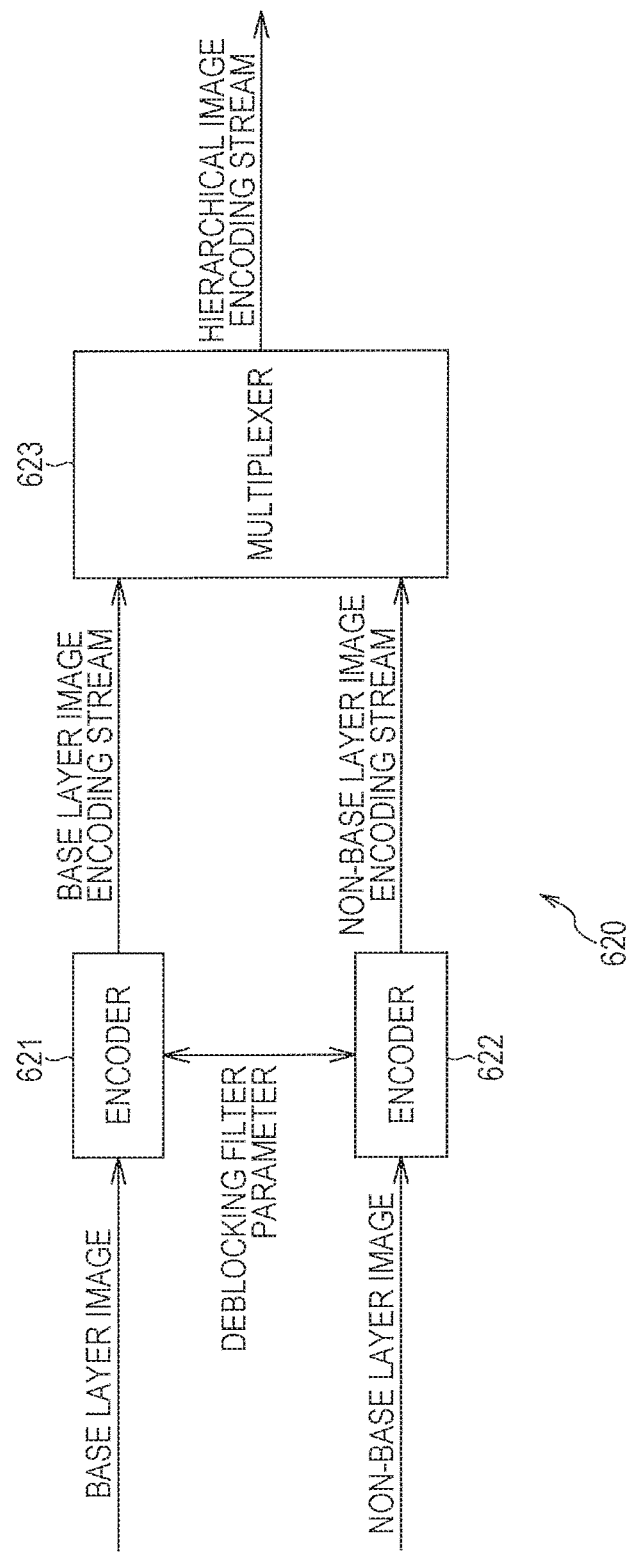
FIG. 57 is a diagram showing an example of the main configuration of a hierarchical image encoding device to which the present technique is applied.

FIG. 57 is a diagram showing a hierarchical image encoding device that performs the hierarchical image encoding described above. As shown in FIG. 57, a hierarchical image encoding device 620 includes encoders 621 and 622 and a multiplexer 623.

The encoder 621 encodes a base layer image to generate a base layer image encoding stream. The encoder 622 encodes a non-base layer image to generate a non-base layer image encoding stream. The multiplexer 623 generates a hierarchical image encoding stream by multiplexing the base layer image encoding stream generated by the encoder 621 and the non-base layer image encoding stream generated by the encoder 622.

For the encoders 621 and 622 of the hierarchical image encoding device 620, the image encoding device 11 (FIG. 1) can be applied, in this case, the hierarchical image encoding device 620 sets and transmits a deblocking filter parameter set by the encoder 621 and a deblocking filter parameter set by the encoder 602.

In addition, the deblocking filter parameter set by the encoder 621 as described above may be set and transmitted so as to be shared between the encoders 621 and 622. Conversely, the deblocking filter parameter set by the encoder 622 may be set and transmitted so as to be shared between the encoders 621 and 622.

[Hierarchical Image Decoding Device]

Figure 58:
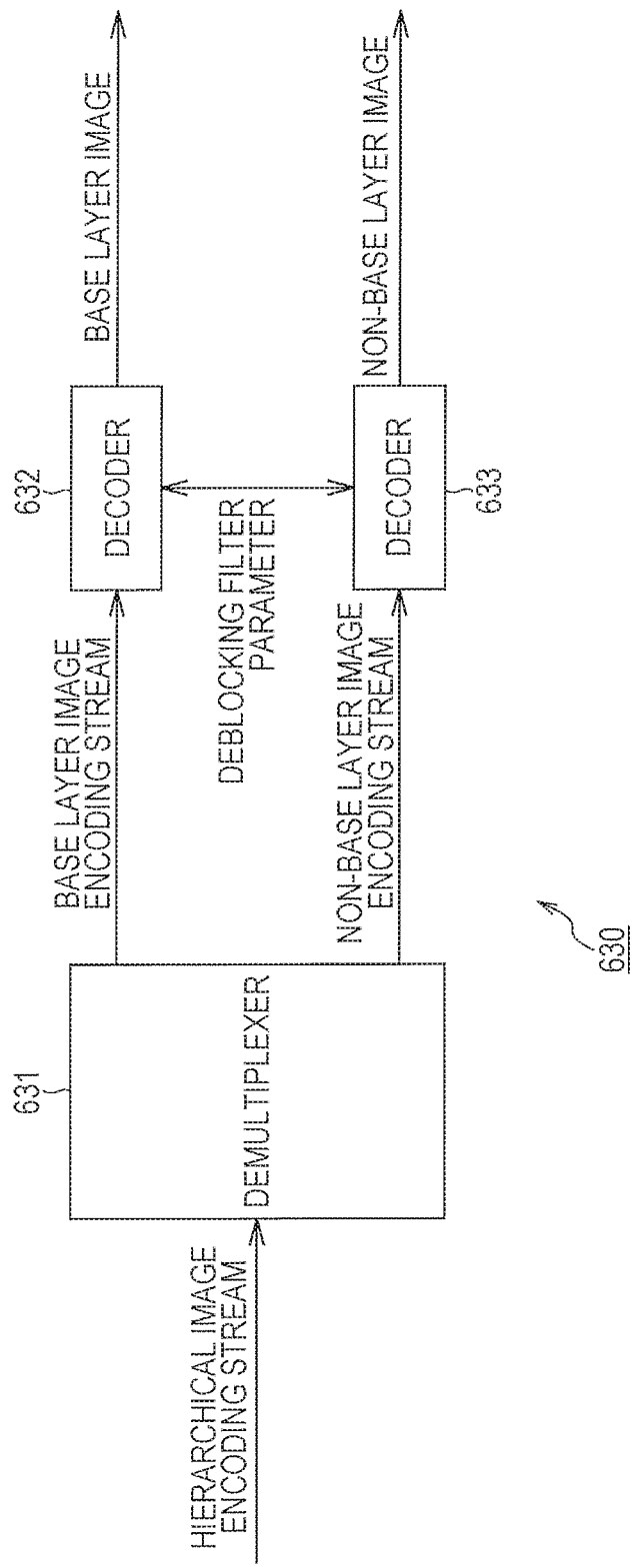
FIG. 58 is a diagram showing an example of the main configuration of a hierarchical image decoding device to which the present technique is applied.

FIG. 58 is a diagram showing a hierarchical image decoding device that performs the hierarchical image decoding described above. As shown in FIG. 58, a hierarchical image decoding device 630 includes a demultiplexer 631 and decoders 632 and 633.

The demultiplexer 631 demultiplexes a hierarchical image encoding stream, in which a base layer image encoding stream and a non-base layer image encoding stream are multiplexed, to extract the base layer image encoding stream and the non-base layer image encoding stream. The decoder 632 obtains a base layer image by decoding the base layer image encoding stream extracted by the demultiplexer 631. The decoder 633 obtains a non-base layer image by decoding the non-base layer image encoding stream extracted by the demultiplexer 631.

For the decoders 632 and 633 of the hierarchical image decoding device 630, the image decoding device 51 (FIG. 3) can be applied. In this case, the hierarchical image decoding device 630 performs a process using the deblocking filter parameter, which is set by the encoder 621 and decoded by the decoder 632, and the deblocking filter parameter, which is set by the encoder 622 and decoded by the decoder 633.

In addition, the deblocking filter parameter set by the encoder 621 (or the encoder 622) as described above may be set and transmitted so as to be shared between the encoders 621 and 622. In this case, the hierarchical image decoding device 630 performs a process using the deblocking filter parameter set by the encoder 621 (or the encoder 622) and decoded by the decoder 632 (or the decoder 633).

11. Ninth Embodiment

[Configuration Example of a Computer]

The series of processes described above can be performed either by hardware or by software. When the series of processes described above is performed by software, programs constituting the software are installed in a computer. Note that examples of the computer include a computer embedded in dedicated hardware and a general-purpose personal computer capable of executing various functions by installing various programs therein.

Figure 59:
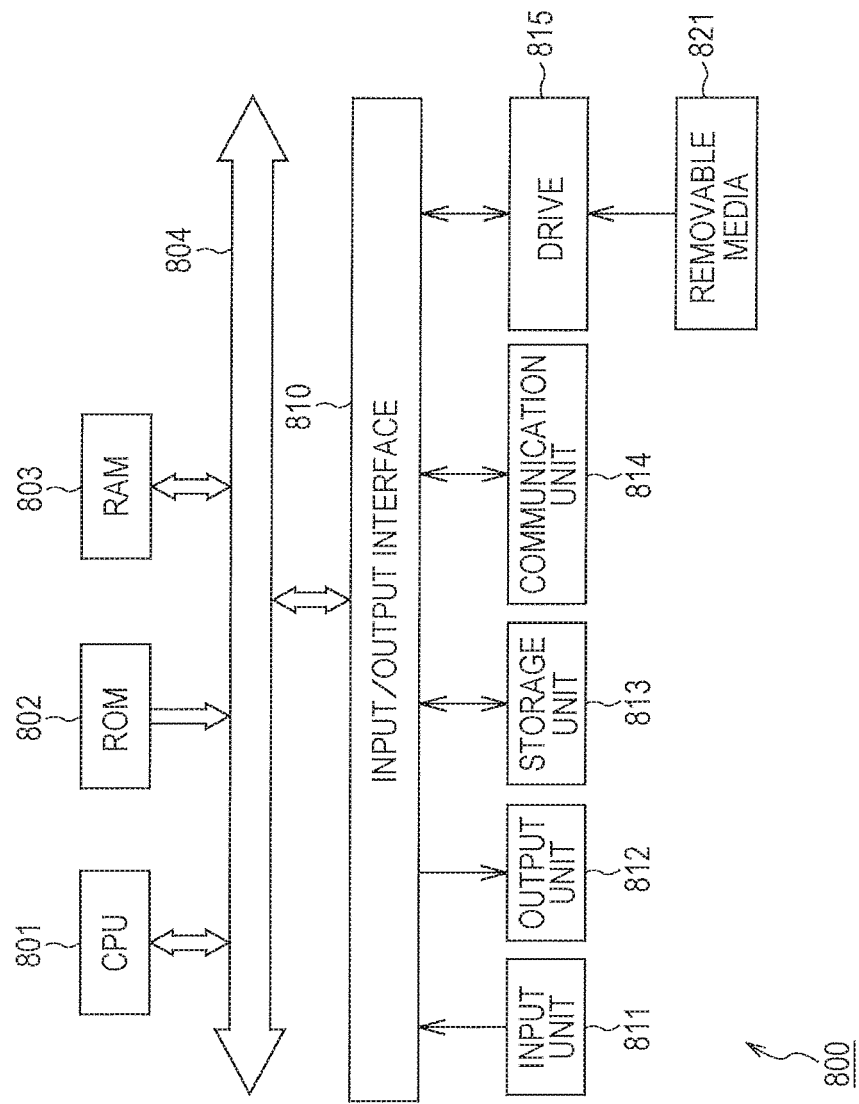
FIG. 59 is a block diagram showing a typical example structure of a computer.

FIG. 59 is a block diagram showing an example of the hardware configuration of a computer that executes the series of processes described above using a program.

In a computer 800, a CPU (Central Processing Unit) 801, a ROM (Read Only Memory) 802, and a RAM (Random Access Memory) 803 are connected to each other by a bus 804.

In addition, an input/output interface 805 is connected to the bus 804. An input unit 806, an output unit 807, a storage unit 808, a communication unit 809, and a drive 810 are connected to the input/output interface 805.

The input unit 806 includes a keyboard, a mouse, a microphone, and the like. The output unit 807 includes a display, a speaker, and the like. The storage unit 808 includes a hard disk, a nonvolatile memory, and the like. The communication unit 809 includes a network interface and the like. The drive 810 drives removable media 821, such as a magnetic disk, an optical disc, a magneto-optical disc, or a semiconductor memory.

In the computer configured as described above, the CPU 801 loads, for example, a program stored in the storage unit 808 onto the RAM 803 through the input/output interface 805 and the bus 804 and executes the program, thereby performing the series of processes described above.

The program executed by the computer 800 (CPU 801) can be recorded on the removable media 821 as package media or the like and be provided, for example. In addition, the program can be provided through a cable or wireless transmission medium, such as a local area network, the Internet, and digital satellite broadcasting.

In the computer, the program can be installed in the storage unit 808 through the input/output interface 805 by mounting the removable media 821 on the drive 810. In addition, the program can be received by the communication unit 809 through a cable or wireless transmission medium and be installed in the storage unit 808. In addition, the program may be installed in the ROM 802 or the storage unit 808 in advance.

Programs to be executed by the computer may be programs for carrying out processes in chronological order in accordance with the sequence described in this specification, or programs for carrying out processes in parallel or at necessary timing such as in response to a call.

In this specification, steps describing programs to be recorded in a recording medium include processes to be performed in parallel or independently of one another if not necessarily in chronological order, as well as processes to be performed in chronological order in accordance with the sequence described herein.

In this specification, a system refers to the entirety of equipment including more than one device.

Furthermore, any structure described above as one device (or one processing unit) may be divided into two or more devices (or processing units). Conversely, any structure described above as two or more devices (or processing units) may be combined into one device (or processing unit). Furthermore, it is of course possible to add components other than those described above to the structure of any of the devices (or processing units). Furthermore, some components of a device (or processing unit) may be incorporated into the structure of another device (or processing unit) as long as the structure and the function of the system as a whole are substantially the same. That is, the present technique is not limited to the embodiments described above, but various modifications may be made thereto without departing from the scope of the technique.

The image encoding devices and the image decoding devices according to the embodiments described above can be applied to various electronic devices such as transmitters and receivers in satellite broadcasting, cable broadcasting such as cable TV, distribution via the Internet, distribution to terminals via cellular communication, or the like, recording devices configured to record images in media such as magnetic discs and flash memory, and reproduction devices configured to reproduce images from the storage media. Four examples of applications will be described below

12. Applications

[First Application: Television Receiver]

Figure 60:
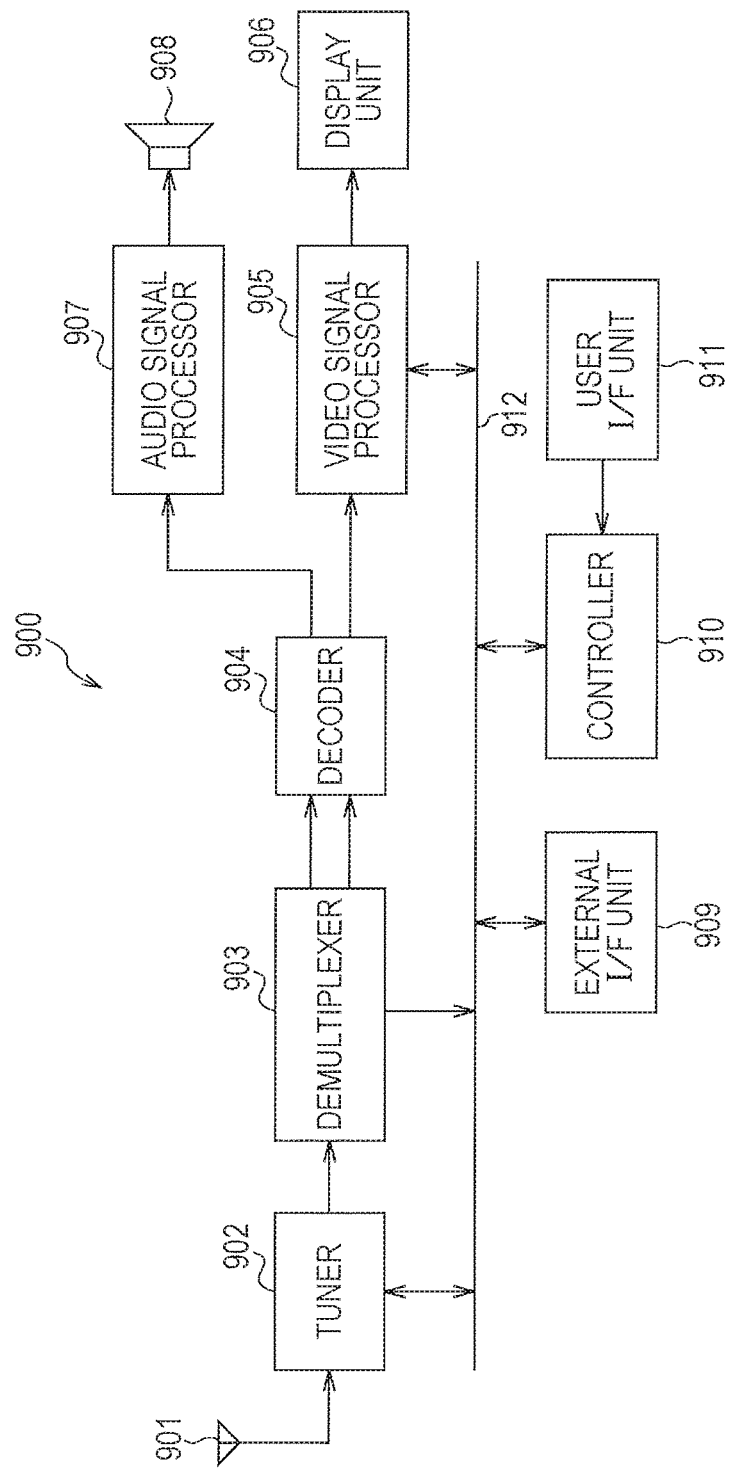
FIG. 60 is a block diagram showing one example of a schematic structure of a television apparatus.

FIG. 60 shows an example of a schematic structure of a television apparatus to which the embodiments described above are applied. The television apparatus 900 includes an antenna 901, a tuner 902, a demultiplexer 903, a decoder 904, a video signal processor 905, a display unit 906, an audio signal processor 907, a speaker 908, an external interface 909, a controller 910, a user interface 911, and a bus 912.

The tuner 902 extracts a signal of a desired channel from broadcast signals received via the antenna 901, and demodulates the extracted signal. The tuner 902 then outputs an encoded bit stream obtained by the demodulation to the demultiplexer 903. That is, the tuner 902 serves as transmitting means in the television apparatus 900 that receives an encoded stream of encoded images.

The demultiplexer 903 separates a video stream and an audio stream of a program to be viewed from the encoded bit stream, and outputs the separated streams to the decoder 904. The demultiplexer 903 also extracts auxiliary data such as an EPG (electronic program guide) from the encoded bit stream, and supplies the extracted data to the controller 910. If the encoded bit stream is scrambled, the demultiplexer 903 may descramble the encoded bit stream.

The decoder 904 decodes the video stream and the audio stream input from the demultiplexer 903. The decoder 904 then outputs video data generated by the decoding to the video signal processor 905. The decoder 904 also outputs audio data generated by the decoding to the audio signal processor 907.

The video signal processor 905 reproduces video data input from the decoder 904, and displays the video data on the display unit 906. The video signal processor 905 may also display an application screen supplied via the network on the display unit 906. Furthermore, the video signal processor 905 may perform additional processing such as noise removal (suppression) on the video data depending on settings. The video signal processor 905 may further generate an image of a GUI (graphical user interface) such as a menu, a button or a cursor and superimpose the generated image on the output images.

The display unit 906 is driven by a drive signal supplied from the video signal processor 905, and displays video or images on a video screen of a display device(such as a liquid crystal display, a plasma display, or an OELD (organic electroluminescence display)(organic EL display)).

The audio signal processor 907 performs reproduction processing such as D/A conversion and amplification on the audio data input from the decoder 904, and outputs audio through the speaker 908. Furthermore, the audio signal processor 907 may perform additional processing such as noise removal (suppression) on the audio data.

The external interface 909 is an interface for connecting the television apparatus 900 with an external device or a network. For example, a video stream or an audio stream received via the external interface 909 may be decoded by the decoder 904. That is, the external interface 909 also serves as transmitting means in the television apparatus 900 that receives an encoded stream of encoded images.

The controller 910 includes a processor such as a CPU, and a memory such as a RAM and a ROM. The memory stores programs to be executed by the CPU, program data, EPG data, data acquired via the network, and the like. Programs stored in the memory are read and executed by the CPU when the television apparatus 900 is activated, for example. The CPU controls the operation of the television apparatus 900 according to control signals input from the user interface 911, for example, by executing the programs.

The user interface 911 is connected to the controller 910. The user interface 911 includes buttons and switches for users to operate the television apparatus 900 and a receiving unit for receiving remote control signals, for example. The user interface 911 detects operation by a user via these components, generates a control signal, and outputs the generated control signal to the controller 910.

The bus 912 connects the tuner 902, the demultiplexer 903, the decoder 904, the video signal processor 905, the audio signal processor 907, the external interface 909, and the controller 910 to one another.

In the television apparatus 900 having such a structure, the decoder 904 has the functions of the image decoding devices according to the embodiments described above. As a result, the block noise can be suppressed in decoding of images in the television apparatus 900.

[Second Application: Portable Telephone Device]

Figure 61:
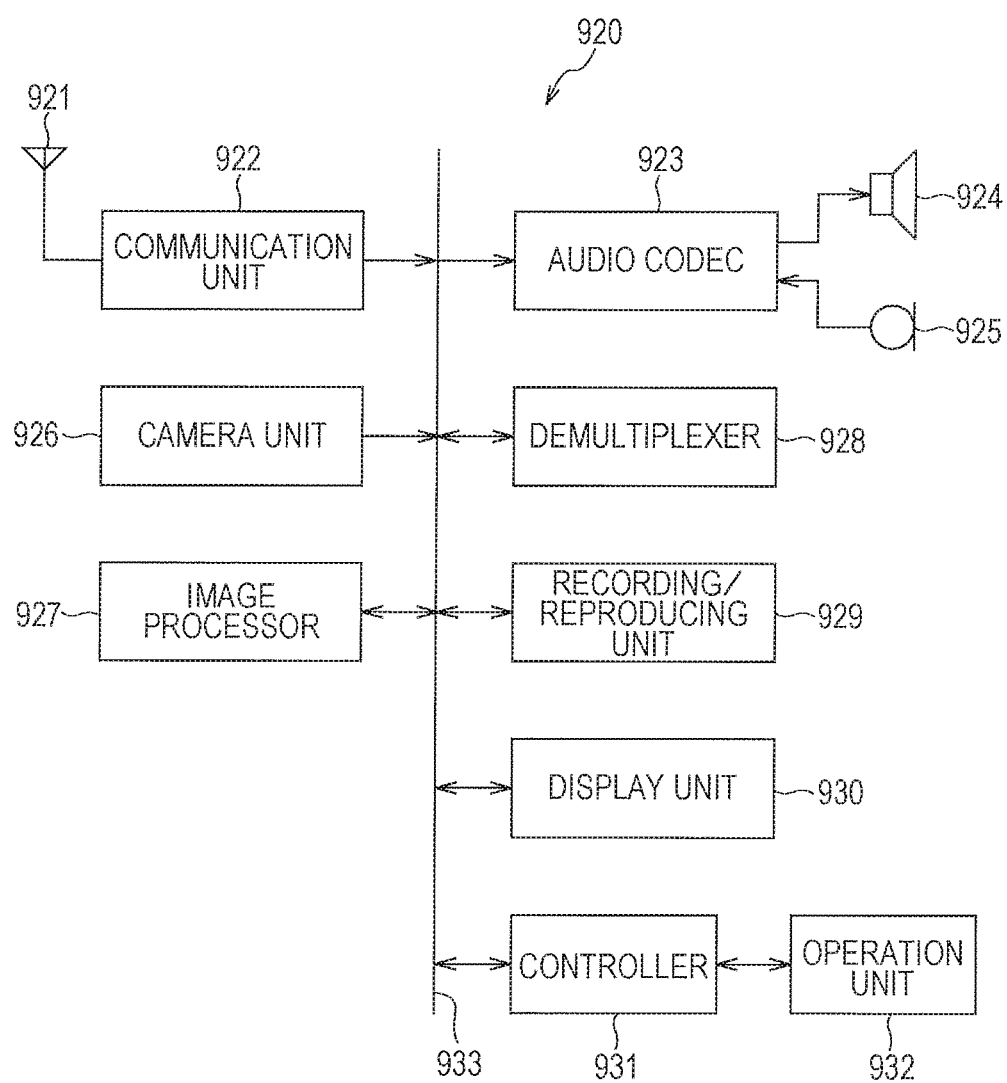
FIG. 61 is a block diagram showing one example of a schematic structure of a portable telephone device.

FIG. 61 shows an example of a schematic structure of a portable telephone device to which the embodiments described above are applied. The portable telephone device 920 includes an antenna 921, a communication unit 922, an audio codec 923, a speaker 924, a microphone 925, a camera unit 926, an image processor 927, a demultiplexer 928, a recording/reproducing unit 929, a display unit 930, a controller 931, an operation unit 932, and a bus 933.

The antenna 921 is connected to the communication unit 922. The speaker 924 and the microphone 925 are connected to the audio codec 923. The operation unit 932 is connected to the controller 931. The bus 933 connects the communication unit 922, the audio codec 923, the camera unit 926, the image processor 927, the demultiplexer 928, the recording/reproducing unit 929, the display unit 930, and the controller 931 to one another.

The portable telephone device 920 performs operation such as transmission/reception of audio signals, transmission/reception of electronic mails and image data, capturing of images, recording of data, and the like in various operation modes including a voice call mode, a data communication mode, an imaging mode, and a video telephone mode.

In the voice call mode, an analog audio signal generated by the microphone 925 is supplied to the audio codec 923. The audio codec 923 converts the analog audio signal to audio data, performs A/D conversion on the converted audio data, and compresses the audio data. The audio codec 923 then outputs the audio data resulting from the compression to the communication unit 922. The communication unit 922 encodes and modulates the audio data to generate a signal to be transmitted. The communication unit 922 then transmits the generated signal to be transmitted to a base station (not shown) via the antenna 921. The communication unit 922 also amplifies and performs frequency conversion on a radio signal received via the antenna 921 to obtain a received signal. The communication unit 922 then demodulates and decodes the received signal to generate audio data, and outputs the generated audio data to the audio codec 923. The audio codec 923 decompresses and performs D/A conversion on the audio data to generate an analog audio signal. The audio codec 923 then supplies the generated audio signal to the speaker 924 to output audio therefrom.

In the data communication mode, the controller 931 generates text data to be included in an electronic mail according to operation by a user via the operation unit 932, for example. The controller 931 also displays the text on the display unit 930. The controller 931 also generates electronic mail data in response to an instruction for transmission from a user via the operation unit 932, and outputs the generated electronic mail data to the communication unit 922. The communication unit 922 encodes and modulates the electronic mail data to generate a signal to be transmitted. The communication unit 922 then transmits the generated signal to be transmitted to a base station (not shown) via the antenna 921. The communication unit 922 also amplifies and performs frequency conversion on a radio signal received via the antenna 921 to obtain a received signal. The communication unit 922 then demodulates and decodes the received signal to restore electronic mail data, and outputs the restored electronic mail data to the controller 931. The controller 931 displays the content of the electronic mail on the display unit 930 and stores the electronic mail data into a storage medium of the recording/reproducing unit 929.

The recording/reproducing unit 929 includes a readable/writable storage medium. For example, the storage medium may be an internal storage medium such as a RAM or flash memory, or may be an externally mounted storage medium such as a hard disk, a magnetic disk, a magnetooptical disk, a USB (universal serial bus) memory, or a memory card.

In the imaging mode, the camera unit 926 images a subject to generate image data, and outputs the generated image data to the image processor 927, for example. The image processor 927 encodes the image data input from the camera unit 926, and stores an encoded stream in the storage medium of the storage/reproducing unit 929.

In the video telephone mode, the demultiplexer 928 multiplexes a video stream encoded by the image processor 927 and an audio stream input from the audio codec 923, and outputs the multiplexed stream to the communication unit 922, for example. The communication unit 922 encodes and modulates the stream to generate a signal to be transmitted. The communication unit 922 then transmits the generated signal to be transmitted to a base station (not shown) via the antenna 921. The communication unit 922 also amplifies and performs frequency conversion on a radio signal received via the antenna 921 to obtain a received signal. The signal to be transmitted and the received signal may include encoded bit streams. The communication unit 922 then demodulates and decodes the received signal to restore the stream and outputs the restored stream to the demultiplexer 928. The demultiplexer 928 separates a video stream and an audio stream from the input stream, and outputs the video stream to the image processor 927 and the audio stream to the audio codec 923. The image processor 927 decodes the video stream to generate video data. The video data is supplied to the display unit 930, and a series of images is displayed by the display unit 930. The audio codec 923 decompresses and performs DLA conversion on the audio stream to generate an analog audio signal. The audio codec 923 then supplies the generated audio signal to the speaker 924 to output audio therefrom.

In the portable telephone device 920 having such a structure, the image processor 927 has the functions of the image encoding devices and the image decoding devices according to the embodiments described above. As a result, the block noise can be suppressed in encoding and decoding of images in the portable telephone device 920.

[Third Application: Recording/Reproducing Device]

Figure 62:
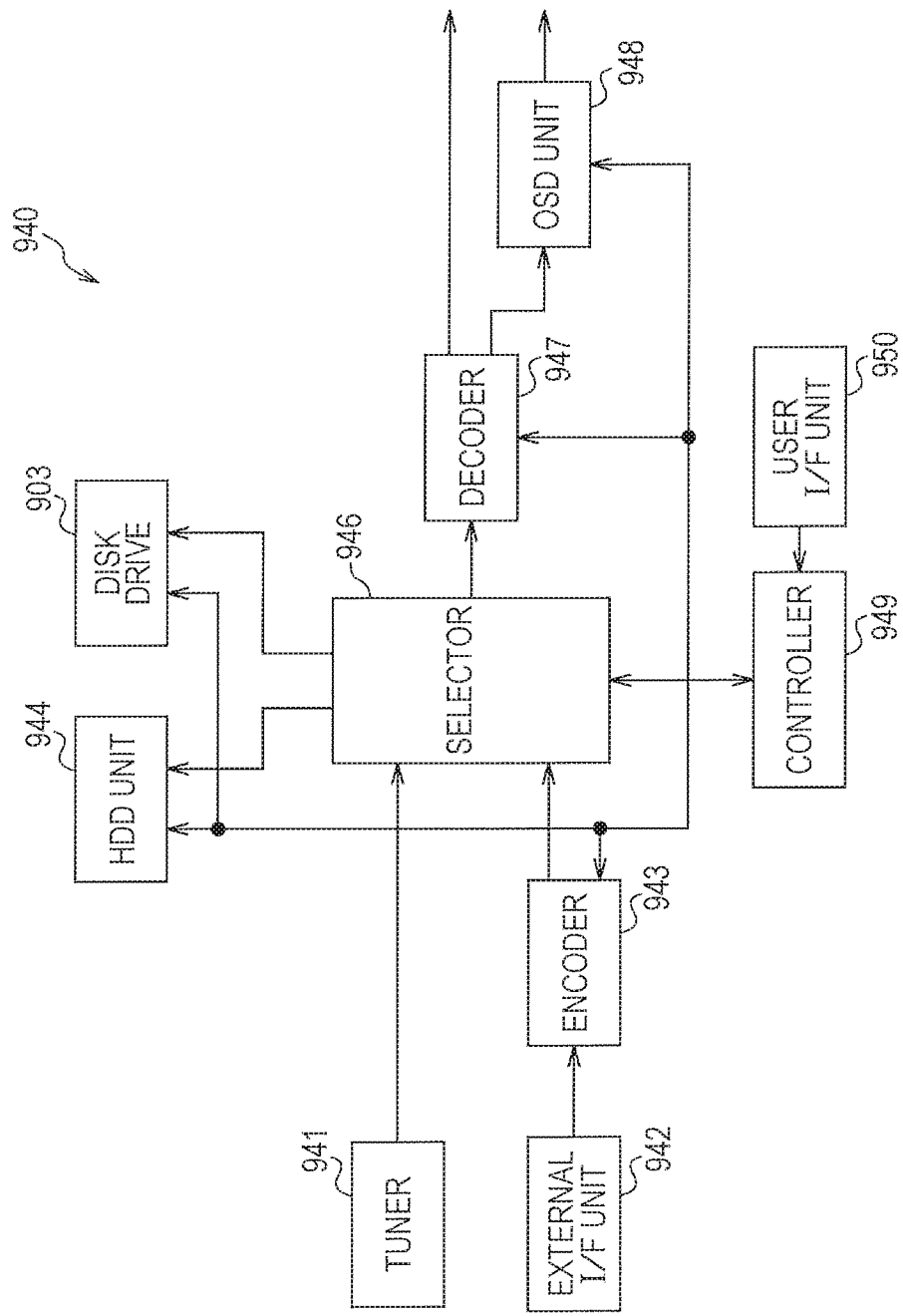
FIG. 62 is a block diagram showing one example of a schematic structure of a recording reproducing device.

FIG. 62 shows an example of a schematic structure of a recording/reproducing device to which the embodiments described above are applied.

The recording/reproducing device 940 encodes audio data and video data of a received broadcast program and records the encoded data into a recording medium, for example. The recording/reproducing device 940 may also encode audio data and video data acquired from another device and record the encoded data into a recording medium, for example. The recording/reproducing device 940 also reproduces data recorded in the recording medium on a monitor and through a speaker in response to an instruction from a user, for example. In this case, the recording/reproducing device 940 decodes audio data and video data.

The recording/reproducing device 940 includes a tuner 941, an external interface 942, an encoder 943, an HDD (hard disk drive) 944, a disk drive 945, a selector 946, a decoder 947, an OSD (on-screen display) 948, a controller 949, and a user interface 950.

The tuner 941 extracts a signal of a desired channel from broadcast signals received via an antenna (not shown), and demodulates the extracted signal. The tuner 941 then outputs an encoded bit stream obtained by the demodulation to the selector 946. That is, the tuner 941 has a role as transmission means in the recording/reproducing device 940.

The external interface 942 is an interface for connecting the recording/reproducing device 940 with an external device or a network. The external interface 942 may be an IEEE 1394 interface, a network interface, a USB interface, or a flash memory interface, for example. For example, video data and audio data received via the external interface 942 are input to the encoder 943. That is, the external interface 942 has a role as transmission means in the recording/reproducing device 940.

The encoder 943 encodes the video data and the audio data if the video data and the audio data input from the external interface 942 are not encoded. The encoder 943 then outputs the encoded bit stream to the selector 946.

The HDD 944 records an encoded bit stream of compressed content data such as video and audio, various programs and other data in an internal hard disk. The HDD 944 also reads out the data from the hard disk for reproduction of video and audio.

The disk drive 945 records and reads out data into/from a recording medium mounted thereon. The recording medium mounted on the disk drive 945 may be a DVD disk (such as a DVD-Video, a DVD-RAM, a DVD-R, a DVD-RW, a DVD+R, or a DVD+RW) or a Blu-ray (registered trademark) disc, for example.

For recording video and audio, the selector 946 selects an encoded bit stream input from the tuner 941 or the encoder 943 and outputs the selected encoded bit stream to the HDD 944 or the disk drive 945. For reproducing video and audio, the selector 946 selects an encoded bit stream input from the HDD 944 or the disk drive 945 to the decoder 947.

The decoder 947 decodes the encoded bit stream to generate video data and audio data. The decoder 947 then outputs the generated video data to the OSD 948. The decoder 904 also outputs the generated audio data to an external speaker.

The OSD 948 reproduces the video data input from the decoder 947 and displays the video. The OSD 948 may also superimpose a GUI image such as a menu, a button or a cursor on the video to be displayed.

The controller 949 includes a processor such as a CPU, and a memory such as a RAM and a ROM. The memory stores programs to be executed by the CPU, program data, and the like. Programs stored in the memory are read and executed by the CPU when the recording/reproducing device 940 is activated, for example. The CPU controls the operation of the recording/reproducing device 940 according to control signals input from the user interface 950, for example, by executing the programs.

The user interface 950 is connected to the controller 949. The user interface 950 includes buttons and switches for users to operate the recording/reproducing device 940 and a receiving unit for receiving remote control signals, for example. The user interface 950 detects operation by a user via these components, generates a control signal, and outputs the generated control signal to the controller 949.

In the recording/reproducing device 940 having such a structure, the encoder 943 has the functions of the image encoding devices according to the embodiments described above. Furthermore, the decoder 947 has the functions of the image decoding devices according to the embodiments described above. As a result, the block noise can be suppressed in encoding and decoding of images in the recording/reproducing device 940.

[Fourth Application: Imaging Device]

Figure 63:
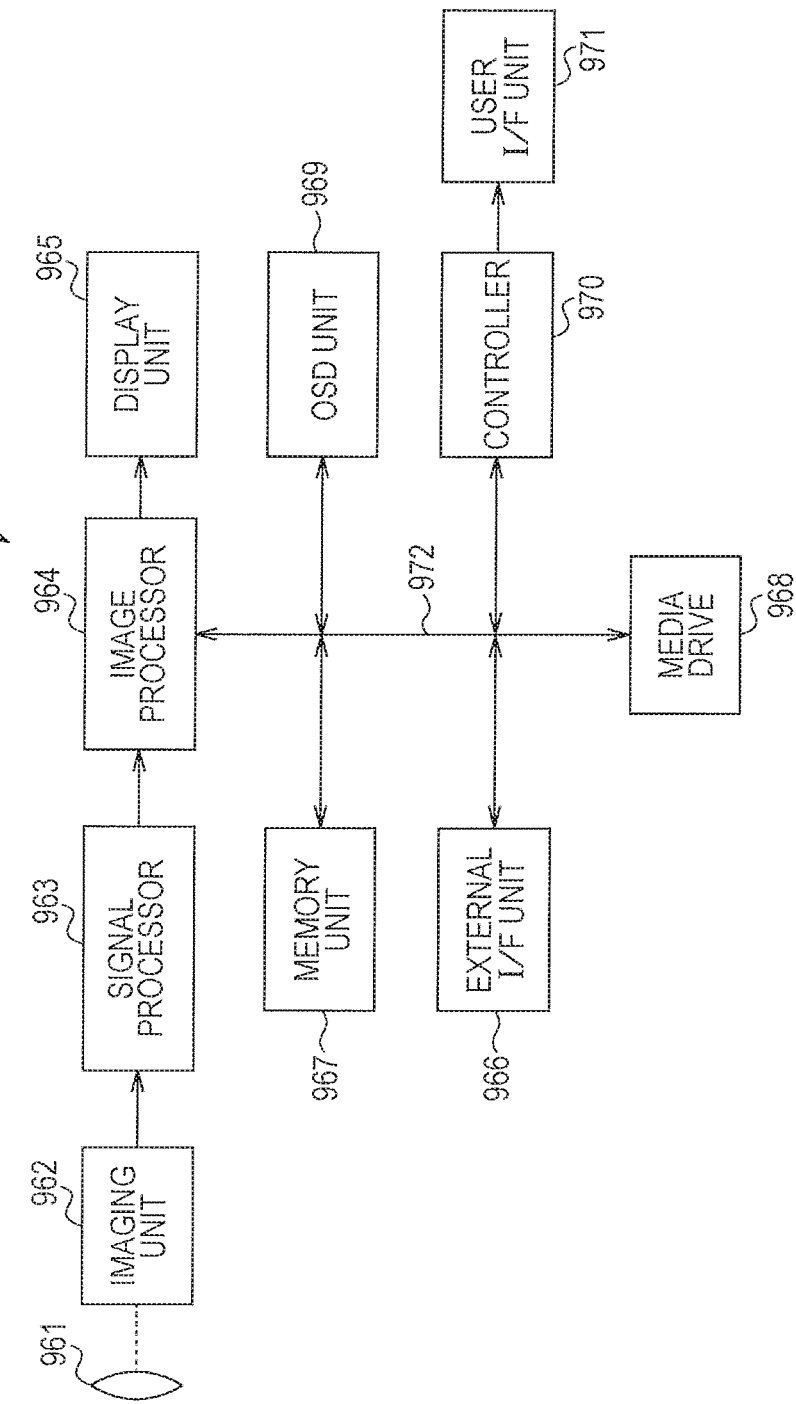
FIG. 63 is a block diagram showing an example of the schematic configuration of an imaging device.

FIG. 63 shows one example of a schematic structure of an imaging device to which the embodiments described above are applied. The imaging device 960 images a subject to generate an image, encodes the image data, and records the encoded image data in a recording medium.

The imaging device 960 includes an optical block 961, an imaging unit 962, a signal processor 963, an image processor 964, a display unit 965, an external interface 966, a memory 967, a media drive 968, an OSD 969, a controller 970, a user interface 971, and a bus 972.

The optical block 961 is connected to the imaging unit 962. The imaging unit 962 is connected to the signal processor 963. The display unit 965 is connected to the image processor 964. The user interface 971 is connected to the controller 970. The bus 972 connects the image processor 964, the external interface 966, the memory 967, the media drive 968, the OSD 969, and the controller 970 to one another.

The optical block 961 includes a focus lens, a diaphragm, and the like. The optical block 961 forms an optical image of a subject on the imaging surface of the imaging unit 962. The imaging unit 962 includes an image sensor such as a CCD (charge coupled device) or a CMOS (complementary metal oxide semiconductor), and converts the optical image formed on the imaging surface into an image signal that is an electric signal through photoelectric conversion. The imaging unit 962 then outputs the image signal to the signal processor 963.

The signal processor 963 performs various kinds of camera signal processing such as knee correction, gamma correction, and color correction on the image signal input from the imaging unit 962. The signal processor 963 outputs image data subjected to the camera signal processing to the image processor 964.

The image processor 964 encodes the image data input from the signal processor 963 to generate encoded data. The image processor 964 then outputs the generated encoded data to the external interlace 966 or the media drive 968. The image processor 964 also decodes encoded data input from the external interface 966 or the media drive 968 to generate image data. The image processor 964 then outputs the generated image data to the display unit 965. The image processor 964 may output image data input from the signal processor 963 to the display unit 965 to display images. The image processor 964 may also superimpose data for display acquired from the OSD 969 on the images to be output to the display unit 965.

The OSD 969 may generate a GUI image such as a menu, a button or a cursor and output the generated image to the image processor 964, for example.

The external interface 966 is a USB input/output terminal, for example. The external interface 966 connects the imaging device 960 and a printer for printing of an image, for example. In addition, a drive is connected to the external interface 966 as necessary. A removable medium such as a magnetic disk or an optical disk is mounted to the drive, for example, and a program read out from the removable medium can be installed in the imaging device 960. Furthermore, the external interface 966 may be a network interface connected to a network such as a LAN or the Internet. That is, the external interface 966 has a role as transmission means in the imaging device 960.

The recording medium to be mounted on the media drive 968 may be a readable/writable removable medium such as a magnetic disk, a magnetooptical disk, an optical disk or a semiconductor memory. Alternatively, a recording medium may be mounted on the media drive 968 in a fixed manner to form an immobile storage unit such as an internal hard disk drive or an SSD (solid state drive), for example.

The controller 970 includes a processor such as a CPU, and a memory such as a RAM and a ROM. The memory stores programs to be executed by the CPU, program data, and the like. Programs stored in the memory are read and executed by the CPU when the imaging device 960 is activated, for example. The CPU controls the operation of the imaging device 960 according to control signals input from the user interface 971, for example, by executing the programs.

The user interface 971 is connected with the controller 970. The user interface 971 includes buttons and switches for users to operate the imaging device 960, for example. The user interface 971 detects operation by a user via these components, generates a control signal, and outputs the generated control signal to the controller 970.

In the imaging device 960 having such a structure, the image processor 964 has the functions of the image encoding devices and the image decoding devices according to the embodiments described above. As a result, the block noise can be suppressed in encoding and decoding of images in the imaging device 960.

13. Applications of Scalable Encoding

[First System]

Next, a specific use example of scalable encoded data, which is obtained by scalable encoding (hierarchical encoding) described above with reference to FIGS. 56 to 58, will be described. For example, the scalable encoding is used for the selection of data to be transmitted, as in an example shown in FIG. 64.

Figure 64:
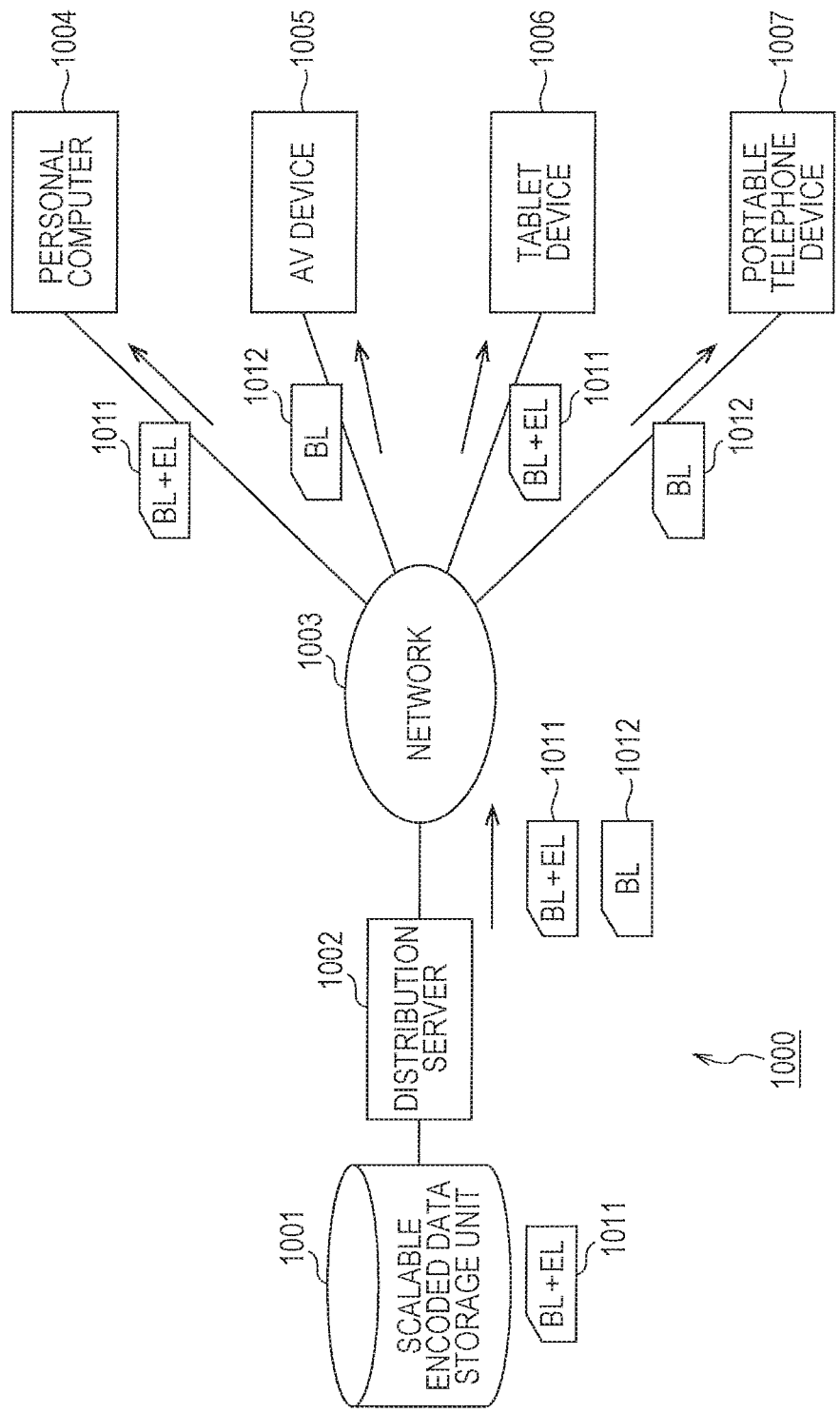
FIG. 64 is a block diagram showing an example of the use of scalable encoding.

In a data transmission system 1000 shown in FIG. 64, a distribution server 1002 reads scalable encoded data stored in a scalable encoded data storage unit 1001, and distributes the scalable encoded data to terminal devices, such as a personal computer 1004, an AV device 1005, a tablet device 1006, and a portable telephone device 1007, through a network 1003.

In this case, the distribution server 1002 selects and transmits encoded data of appropriate quality according to the ability of the terminal device, communication environment, or the like. Even if the distribution server 1002 transmits high-quality data unnecessarily, a high-quality image is not necessarily obtained in the terminal device, and this may be the cause of delay or overflow. In addition, this may occupy a communication band unnecessarily or may increase the load of the terminal device unnecessarily. Conversely, even if the distribution server 1002 transmits low-quality data unnecessarily, an image of sufficient image quality may not be able to be obtained in the terminal device. Therefore, the distribution server 1002 appropriately reads and transmits the scalable encoded data, which is stored in the scalable encoded data storage unit 1001, as encoded data of appropriate quality according to the ability of the terminal device, communication environment, or the like.

For example, it is assumed that the scalable encoded data storage unit 1001 stores scalable encoded data. (BL+EL) 1011 that is encoded in a scalable manner. The scalable encoded data. (BL+EL) 1011 is encoded data including both a base layer and an enhancement layer, and is data that can be decoded to obtain both an image of the base layer and an image of the enhancement layer.

The distribution server 1002 selects an appropriate layer according to the ability of a terminal device to which data is to be transmitted, communication environment, or the like, and reads data of the layer. For example, for the personal computer 1004 or the tablet device 1006 with high processing capacity, the distribution server 1002 reads the high-quality scalable encoded data (BL+EL) 1011 from the scalable encoded data storage unit 1001 and transmits it as it is. In contrast, for example, for the AV device 1005 or the portable telephone device 1007 with low processing capacity, the distribution server 1002 extracts data of a base layer from the scalable encoded data (BL+EL) 1011, and transmits the data as scalable encoded data (BL) 1012 that is data of the same content as the scalable encoded data (BL+EL) 1011 but has lower quality than the scalable encoded data (BL+EL) 1011.

Thus, by using the scalable encoded data, the amount of data can be easily adjusted. Accordingly, it is possible to suppress the occurrence of delay or overflow, or it is possible to suppress an unnecessary increase in the load of the terminal device or the communication medium. In addition, in the scalable encoded data (BL+EL) 1011, redundancy between layers is reduced. In this case, it is possible to reduce the amount of data compared with a case where encoded data of each layer is used as individual data. Therefore, it is possible to use the storage region of the scalable encoded data storage unit 1001 more efficiently.

In addition, as the personal computer 1004 through the portable telephone device 1007, various devices can be applied as terminal devices. Accordingly, the hardware performance of the terminal device differs depending on a device. In addition, since there are also various applications that are executed by the terminal device, the ability of the software also varies. In addition, as the network 1003 that is a communication medium, it is possible to apply a cable or wireless transmission medium, such as the Internet or an LAN (Local Area Network), or any communication network including both, for example. Accordingly, the data transmission capacity varies. In addition, this may also change due to other communications or the like.

Therefore, the distribution server 1002 may communicate with a terminal device as a transmission destination of data before the start of data transmission to obtain information regarding the ability of the terminal device, such as the hardware performance of the terminal device or the performance of an application (software) executed by the terminal device, and information regarding the communication environment, such as the available bandwidth of the network 1003. Then, the distribution server 1002 may select an appropriate layer based on the information obtained herein.

In addition, the extraction of a layer may be performed by the terminal device. For example, the personal computer 1004 may decode the transmitted scalable encoded data (BL+EL) 1011, and may display an image of the base layer or display an image of the enhancement layer. In addition, the personal computer 1004 may extract the scalable encoded data (BL) 1012 of the base layer from the transmitted scalable encoded data (BL+EL) 1011, and may store the scalable encoded data (BL) 1012, or transmit the scalable encoded data (BL) 1012 to another device, or decode the scalable encoded data (BL) 1012 and display the image of the base layer.

Undoubtedly, it is possible to use any number of scalable encoded data storage units 1001, distribution servers 1002, networks 1003, and terminal devices. In addition, although the example where the distribution server 1002 transmits data to the terminal device has been described in the above, examples of the use are not limited thereto. The data transmission system 1000 can be applied to any system as long as it is a system that selects and transmits an appropriate layer according to the ability of the terminal device, communication environment, or the like when transmitting to the terminal device the encoded data that is encoded in a scalable manner.

In addition, also in the data transmission system 1000 shown FIG. 64 described above, the same effect as the effect described above with reference to FIGS. 56 to 58 can be obtained by applying the present technique in the same manner as in the applications to hierarchical encoding and hierarchical decoding described above with reference to FIGS. 56 to 58.

[Second System]

Figure 65:
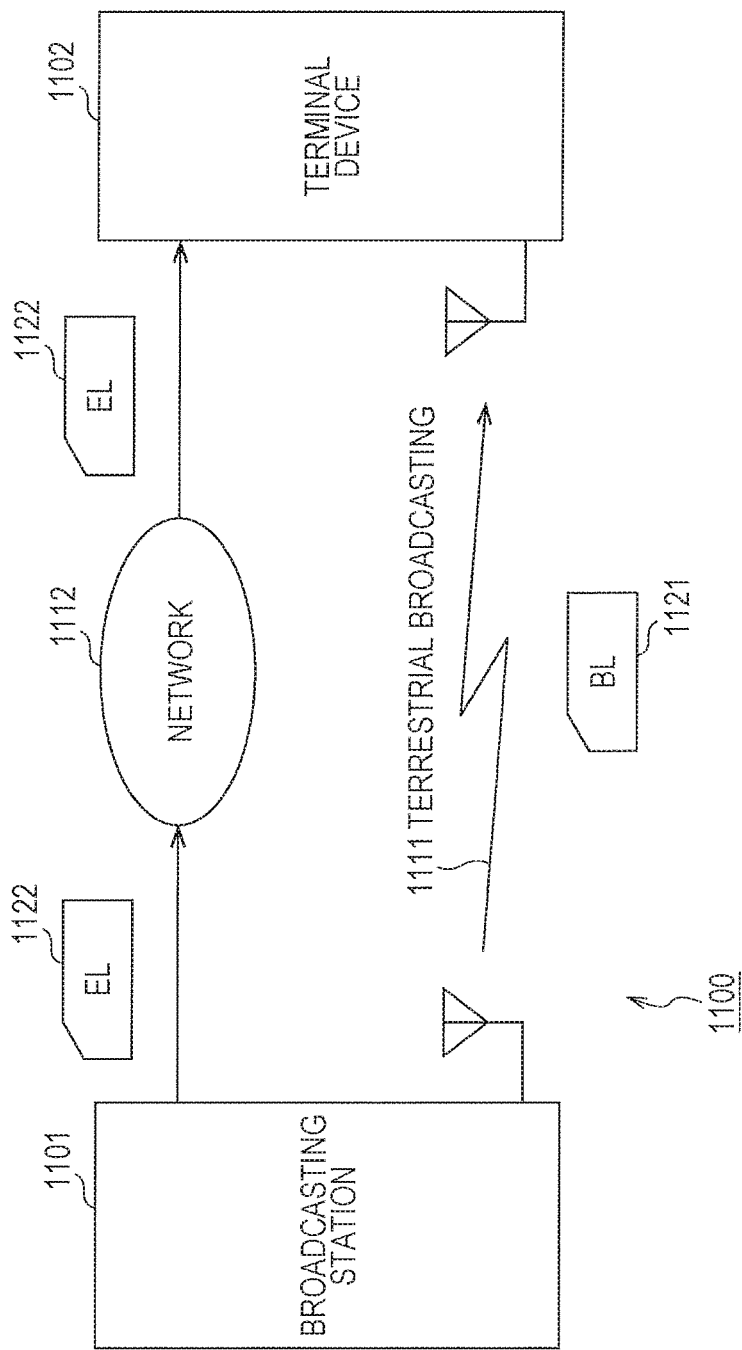
FIG. 65 is a block diagram showing another example of the use of scalable encoding.

For example, the scalable encoding is used for transmission through a plurality of communication media, as in an example shown in FIG. 65.

In a data transmission system 1100 shown in FIG. 65, a broadcasting station 1101 transmits scalable encoded data (BL) 1121 of the base layer by terrestrial broadcasting 1111. In addition, the broadcasting station 1101 transmits (for example, packetizes and transmits) scalable encoded data (EL) 1122 of the enhancement layer through an arbitrary network 1112 that is a cable or wireless communication network or a communication network including both.

A terminal device 1102 has a function of receiving the terrestrial broadcasting 1111 that the broadcasting station 1101 broadcasts, and receives the scalable encoded data (BL) 1121 of the base layer transmitted through the terrestrial broadcasting 1111. In addition, the terminal device 1102 further has a communication function of performing communication through the network 1112, and receives the scalable encoded data (EL) 1122 of the enhancement layer transmitted through the network 1112.

The terminal device 1102 obtains an image of the base layer by decoding the scalable encoded data (BL) 1121 of the base layer acquired through the terrestrial broadcasting 1111, or stores the scalable encoded data (BL) 1121, or transmits the scalable encoded data (BL) 1121 to another device, for example, in response to a user instruction or the like.

In addition, the terminal device 1102 obtains scalable encoded data (BL+EL) by combining the scalable encoded data (BL) 1121 of the base layer acquired through the terrestrial broadcasting 1111 and the scalable encoded data (EL) 1122 of the enhancement layer acquired through the network 1112, or obtains an image of the enhancement layer by decoding the scalable encoded data (BL+EL), or stores the scalable encoded data (BL+EL), or transmits the scalable encoded data (BL+EL) to another device, for example, in response to a user instruction or the like.

As described above, scalable encoded data can be transmitted through a communication medium that differs according to each layer, for example. Therefore, since it is possible to disperse the load, it is possible to suppress the occurrence of delay or overflow.

In addition, a communication medium used for transmission may be selected for each layer depending on the situation. For example, the scalable encoded data (BL) 1121 of the base layer with a relatively large data amount may be transmitted through a communication medium of wide bandwidth, and the scalable encoded data (EL) 1122 of the enhancement layer with a relatively small data amount may be transmitted through a communication medium of narrow bandwidth. In addition, for example, whether the communication medium to transmit scalable encoded data (EL) 1122 of the enhancement layer is to be the network 1112 or the terrestrial broadcasting 1111 may be changed according to the available bandwidth of the network 1112. Undoubtedly, this is the same for the data of any layer.

By such control, it is possible to further suppress an increase in the load in data transmission.

Undoubtedly, the number of layers is arbitrary, and the number of communication media used for transmission is also arbitrary. In addition, the number of terminal devices 1102 that are data distribution destinations is also arbitrary. In addition, although a broadcast from the broadcasting station 1101 has been described as an example in the above, examples of the use are not limited thereto. The data transmission system 1100 can be applied to any system as long as it is a system that divides encoded data, which is encoded in a scalable manner, into a plurality of units with a layer as a unit and transmits the data through a plurality of lines.

In addition, also in the data transmission system 1100 shown in FIG. 65 described above, the same effect as the effect described above with reference to FIGS. 56 to 58 can be obtained by applying the present technique in the same manner as in the applications to hierarchical encoding and hierarchical decoding described above with reference to FIGS. 56 to 58.

[Third System]

Figure 66:
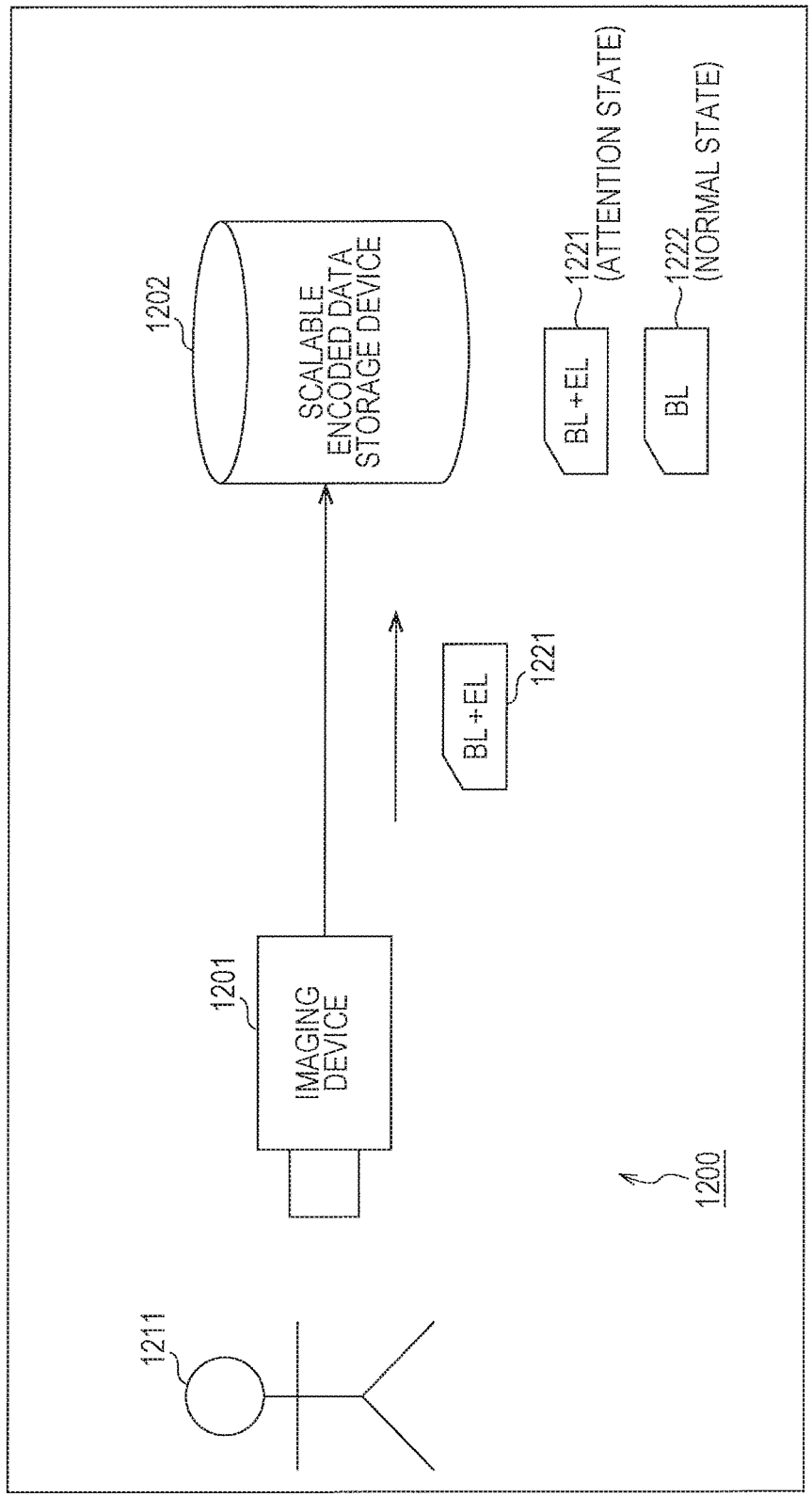
FIG. 66 is a block diagram showing still another example of the use of scalable encoding.

In addition, for example, the scalable encoding is used for storage of encoded data, as in an example shown in FIG. 66.

In an imaging system 1200 shown in FIG. 66, an imaging device 1201 performs scalable encoding of image data obtained by imaging a subject 1211, and supplies the result to a scalable encoded data storage device 1202 as scalable encoded data (BL+EL) 1221.

The scalable encoded data storage device 1202 stores the scalable encoded data (BL+EL) 1221 supplied from the imaging device 1201 with quality according to the situation. For example, in a normal state, the scalable encoded data storage device 1202 extracts data of a base layer from the scalable encoded data (BL+EL) 1221, and stores the data, as scalable encoded data (BL) 1222 of the base layer having a small data amount, with low quality. In contrast, for example, in an attention state, the scalable encoded data storage device 1202 stores the scalable encoded data (BL+EL) 1221 having a large data amount as it is with high quality.

In this manner, the scalable encoded data storage device 1202 can store a high-quality image only when necessary. Therefore, it is possible to suppress an increase in the amount of data while suppressing a reduction in the value of the image due to image quality deterioration. As a result, it is possible to improve the use efficiency of the storage region.

For example, it is assumed that the imaging device 1201 is a surveillance camera. When a monitoring target (for example, an intruder) is not reflected on a captured image (in a normal state), a possibility that the content of the captured image will not be important is high. In this case, priority is given to reducing the amount of data, and the image data (scalable encoded data) is stored with low quality. In contrast, when a monitoring target is reflected on a captured image as the subject 1211 (in an attention state), a possibility that the content of the captured image will be important is high. In this case, priority is given to the quality of image, and the image data (scalable encoded data) is stored with high quality.

In addition, determination of a normal state or an attention state may be performed by image analysis of the scalable encoded data storage device 1202, for example. In addition, the imaging device 1201 may perform determination and transmit the determination result to the scalable encoded data storage device 1202.

In addition, the criterion of a normal state or an attention state is arbitrary, and the content of an image to be a criterion is arbitrary. Undoubtedly, conditions other than the content of an image can also be criteria. For example, conditions may be changed according to the magnitude, waveform, or the like of recorded sound, or may be changed at predetermined time intervals, or may be changed in response to an external instruction, such as a user instruction.

In addition, an example of switching between two states of the normal state and the attention state has been described in the above. However, the number of states is arbitrary, and switching among three or more states (for example, a normal state, a little attention state, an attention state, an emergency attention state, and the like) may be set to be possible. Here, the maximum number of switching states depends on the number of layers of scalable encoded data.

In addition, the imaging device 1201 may determine the number of layers of scalable encoding according to the state. For example, in a normal state, the imaging device 1201 may generate the scalable encoded data (BL) 1222 of the base layer having a small data amount with low quality, and supply the scalable encoded data (BL) 1222 to the scalable encoded data storage device 1202. In addition, for example, in an attention state, the imaging device 1201 may generate the scalable encoded data (BL+EL) 1221 of the base layer having a large data amount with high quality, and supply the scalable encoded data (BL+EL) 1221 to the scalable encoded data storage device 1202.

Although the surveillance camera has been described as an example in the above, the application of this imaging system 1200 is arbitrary and is not limited to the surveillance camera.

In addition, also in the imaging system 1200 shown in FIG. 66 described above, the same effect as the effect described above with reference to FIGS. 56 to 58 can be obtained by applying the present technique in the same manner as in the applications to hierarchical encoding and hierarchical decoding described above with reference to FIGS. 56 to 58.

In addition, in this specification, an example has been described in which various kinds of information, such as a parameter of a deblocking filter and a parameter of an adaptive offset filter, are multiplexed into the encoding stream and are transmitted from the encoding side to the decoding side. However, the method in which the information pieces are transmitted, however is not limited to these examples. For example, the information pieces may be transmitted or recorded as separate data associated with the encoded bit stream without being multiplexed with the encoded bit stream. Note that the term "associate" means to allow images (which may be part of images such as slices or blocks) contained in a bit stream to be linked with information on the images in decoding. That is, the information may be transmitted via a transmission path different from that for the images (or bit stream). Alternatively, the information may be recorded in a recording medium other than that for the images (or bit stream) (or on a different area of the same recording medium). Furthermore, the information and the images (or bit stream) may be associated with each other in any units such as in units of some frames, one frame or part of a frame.

While preferred embodiments of the present disclosure have been described above with reference to the accompanying drawings, the present disclosure is not limited to these examples. It is apparent that a person ordinary skilled in the art to which the present disclosure belongs can conceive various variations and modifications within the technical idea described in the claims, and it is naturally appreciated that these variations and modification belongs within the technical scope of the present disclosure.

In addition, the present technique can also have the following structures.

(1) An image processing device including: a decoding unit that generates an image by decoding an encoded stream; and a filter unit that performs filtering of a filter using a parameter, which is obtained by extending a range of a filter parameter for controlling the filter so as to increase a filter strength, with a block boundary of the image generated by the decoding unit as a target.

(2) The image processing device of (1), wherein the range of the filter parameter is extended so as to increase the filter strength of the filter in a state of being consistent with an existing range.

(3) The image processing device of (1) or (2), wherein the range of the filter parameter is adjusted so as to be continuous in an existing portion and an extended portion.

(4) The image processing device of (1), wherein the range of the filter parameter is extended by adding a new filter parameter.

(5) The image processing device of any one of (1) to (4), wherein the filter parameter is a threshold value used when determining whether or not to perform the filtering.

(6) The image processing device of any one of (1) to (5), wherein the filter is a deblocking filter, and the filter parameter is a parameter used when determining whether or not the deblocking filter is required or when determining strength selection.

(7) The image processing device of (6), wherein the range of the filter parameter is extended in a linear shape.

(8) The image processing device of (7), wherein an inclination of the linear shape is adjustable.

(9) The image processing device of any one of (1) to (6), wherein the range of the filter parameter is extended in a curved line.

(10) The image processing device of any one of (1) to (5), wherein the filter is a deblocking filter, and the filter parameter is a parameter used when determining strength selection of the deblocking filter or used in clipping when performing filtering of the filter.

(11) The image processing device of any one of (1) to (5), wherein the filter unit performs filtering of the filter using a parameter, which is extended by updating a table using an inclination of a computational expression that expresses the filter parameter, with a block boundary of the image generated by the decoding unit as a target.

(12) The image processing device of any one of (1) to (5), wherein the filter unit performs filtering of the filter using a parameter, which is extended by adding an offset of the filter parameter to the filter parameter, with a block boundary of the image generated by the decoding unit as a target.

(13) The image processing device of any one of (1) to (5), wherein the filter parameter includes two types of parameters that use a common offset, and a parameter calculation unit that calculates the two types of parameters using the common offset is further provided.

(14) The image processing device of any one of (1) to (5), wherein the filter parameter includes two types of parameters, and a first parameter calculation unit, which calculates a first filter parameter using an offset of a first parameter, and a second parameter calculation unit, which calculates a second filter parameter using the offset of the first parameter, a difference between the first and second filter parameters, and an offset of the second filter parameter, are further provided.

(15) The image processing device of any one of (1) to (14), wherein the filter is a deblocking filter.

(16) The image processing device (1), wherein the filter is an adaptive offset filter.

(17) The image processing device of any one of (1) to (16), wherein the decoding unit decodes the encoded stream in a processing unit having a hierarchical structure.

(18) An image processing method of an image processing device including: generating an image by decoding an encoded stream; and performing filtering of a filter using a parameter, which is obtained by extending a range of a filter parameter for controlling the filter so as to increase a filter strength, with a block boundary of the generated image as a target.

(19) An image processing device including: a filter unit that performs filtering of a filter using a parameter, which is obtained by extending a range of a filter parameter for controlling the filter so as to increase a filter strength, with a block boundary of a locally decoded image as a target; an encoding unit that generates an encoded stream by encoding the image using the image subjected to the filtering of the filter by the filter unit; and a transmission unit that transmits the encoded stream generated by the encoding unit.

(20) An image processing method of an image processing device including: performing filtering of a filter using a parameter, which is obtained by extending a range of a filter parameter for controlling the filter so as to increase a filter strength, with a locally decoded image as a target; generating an encoded stream by encoding the image using the image subjected to the filtering of the filter; and transmitting the generated encoded stream.

REFERENCE SIGNS LIST

11 Image encoding device
31, 31a, 31b Deblocking filter
51 Image decoding device
62 Lossless decoder
101 Configuration setting unit
102 Filter execution unit
111 QP calculation unit
111a QP acquisition unit
111b Average QP calculation unit
112 β generation unit
113 Tc generation unit
114 Filtering determination unit
115 Filtering unit
121 β LUT_input calculation unit
122 Clipping unit
123 Existing β generation unit
124 Extended β generation unit
131 LUT
141 β (qp) calculation unit
153 Extended LUT
161 Tc_LUT_input calculation unit 162 Clipping unit
163 Existing Tc generation unit
164 Extended Tc generation unit
171 LUT
181 Tc (qp) calculation unit
193 Extended LUT
201 Filtering determination unit
251 β generation processing unit
301 Configuration setting unit
302 Filter execution unit
311 β generation unit
312 Tc generation unit
321 β LUT_input calculation unit
372 β generation processing unit
331 Tc_LUT_input calculation unit
332 Tc generation processing unit
401 Configuration setting unit
451 Configuration setting unit

The invention claimed is:

1. An image processing device, comprising:
a filter configured to apply a deblocking filter to pixels neighboring a block boundary within a locally decoded image using a filter parameter set based on a quantization parameter, the filter parameter being set to be greater than 12 in case that the quantization parameter is equal to 47; and
an encoder configured to encode an image using the locally decoded image filtered by the deblocking filter to generate an encoded stream,
wherein
the filter parameter is used during clipping of filtered pixels output by the deblocking filter, and
the filter parameter being set by a look-up table based on a value of the quantization parameter when the value of the quantization parameter is equal to or less than 53.

2. The image processing device according to claim 1, wherein the quantization parameter is an average of a first quantization parameter and a second quantization parameter between a first block and a second block at the block boundary.

3. The image processing device according to claim 1, wherein the filter is configured to apply the deblocking filter to the pixels within the locally decoded image using the filter parameter set according to an extended range, a range of 12 to 47 being within the extended range.

4. The image processing device according to claim 3, wherein
the deblocking filter comprises a weak filter with a first strength and a strong filter with a second strength stronger than the first strength, and
the filter parameter is a parameter used during selection of either one of the weak filter and the strong filter or during dipping of the filtered pixels after application of the strong filter.

5. The image processing device according to claim 1, wherein the block boundary is a boundary of a transformer unit or of a prediction unit.

6. The image processing device according to claim 1, wherein the encoder comprises:
an orthogonal transformation circuit configured to perform an orthogonal transformation process on the image to generate transformation coefficient data;
a quantization circuit configured to perform a quantization process on the transformation coefficient data to generate quantized data; and
an arithmetic encoding circuit configured to perform an arithmetic encoding process on the quantized data to generate the encoded stream.

7. The image processing device according to claim 6, wherein the encoder is configured to encode the image according to coding units derived from dividing a largest coding unit recursively.

8. The image processing device according to claim 7, wherein the coding units are derived from dividing the largest coding unit in accordance with a quad-tree structure.

9. The image processing device according to claim 8, wherein the largest coding unit is a coding unit in the top level of the quad-tree structure.

10. The image processing device according to claim 9, wherein
the largest coding unit is a block of fixed size under sequence level, and
the coding unit is a block of variable size.

11. An image processing method, comprising:
applying a deblocking filter to pixels neighboring a block boundary within a locally decoded image using a filter parameter set based on a quantization parameter, the filter parameter being set to be greater than 12 in case that the quantization parameter is equal to 47; and
encoding an image using the locally decoded image filtered by the deblocking filter to generate an encoded stream,
wherein
the filter parameter is used during dipping of filtered pixels output by the deblocking filter, and
the filter parameter being set by a look-up table based on a value of the quantization parameter when the value of the quantization parameter is equal to or less than 53.

12. The image processing method according to claim 11, wherein the quantization parameter is an average of a first quantization parameter and a second quantization parameter between a first block and a second block at the block boundary.

13. The image processing method according to claim 12, wherein the deblocking filter is applied to the pixels within the locally decoded image using the filter parameter set according to an extended range, the range being within the extended range.

14. The image processing method according to claim 13, wherein
the deblocking filter comprises a weak filter with a first strength and a strong filter with a second strength stronger than the first strength, and
the filter parameter is a parameter used during selection of either one of the weak filter and the strong filter or during clipping of the filtered pixels after application of the strong filter.

15. The image processing method according to claim 11, wherein the block boundary is a boundary of a transformer unit or of a prediction unit.

16. The image processing method according to claim 11, wherein the encoding the image comprises:
performing an orthogonal transformation process on the image to generate transformation coefficient data;
performing a quantization process on the transformation coefficient data to generate quantized data; and
performing an arithmetic encoding process on the quantized data to generate the encoded stream.

17. The image processing method according to claim 16, wherein the encoding further includes encoding the image according to coding units derived from dividing a largest coding unit recursively.

18. An image processing device, comprising:
circuitry configured to:
apply a deblocking filter to pixels neighboring a block boundary within a locally decoded image using a filter parameter set based on a quantization parameter, the filter parameter being set to be greater than 12 in case that the quantization parameter is equal to 47; and
encode an image using the locally decoded image filtered by the deblocking filter to generate an encoded image, wherein
the filter parameter is used during clipping of filtered pixels output by the deblocking filter, and
the filter parameter being set by a look-up table based on a value of the quantization parameter when the value of the quantization parameter is equal to or less than 53.

* * * * *